(12) United States Patent
Hamze et al.

(10) Patent No.: US 11,238,131 B2
(45) Date of Patent: Feb. 1, 2022

(54) SAMPLING FROM AN ANALOG PROCESSOR

(71) Applicant: D-Wave Systems Inc., Burnaby (CA)

(72) Inventors: Firas Hamze, Vancouver (CA); James King, Vancouver (CA); Evgeny Andriyash, Vancouver (CA); Catherine McGeoch, Amherst, MA (US); Jack Raymond, Vancouver (CA); Jason Rolfe, Vancouver (CA); William G. Macready, West Vancouver (CA); Aaron Lott, Fremont, CA (US); Murray C. Thom, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 1306 days.

(21) Appl. No.: 15/399,461

(22) Filed: Jan. 5, 2017

(65) Prior Publication Data

US 2017/0116159 A1 Apr. 27, 2017

Related U.S. Application Data

(63) Continuation of application No. 14/676,605, filed on Apr. 1, 2015, now Pat. No. 9,588,940, which is a
(Continued)

(51) Int. Cl.
*G06F 15/18* (2006.01)
*G06F 17/18* (2006.01)
(Continued)

(52) U.S. Cl.
CPC .............. *G06F 17/18* (2013.01); *G06N 10/00* (2019.01); *G06N 20/00* (2019.01)

(58) Field of Classification Search
CPC ......... G06F 17/18; G06N 10/00; G06N 20/00
See application file for complete search history.

(56) References Cited

U.S. PATENT DOCUMENTS 7,135,701 B2 11/2006 Amin et al.
7,418,283 B2 8/2008 Amin
(Continued)

OTHER PUBLICATIONS

"Fluctuation theorems for quantum processes" Albash et al (Year: 2013).*
(Continued)

*Primary Examiner* — Luis A Sitiriche
(74) *Attorney, Agent, or Firm* — Cozen O'Connor

(57) ABSTRACT

The systems, devices, articles, and methods generally relate to sampling from an available probability distribution. The samples maybe used to create a desirable probability distribution, for instance for use in computing values used in computational techniques including: Importance Sampling and Markov chain Monte Carlo systems. An analog processor may operate as a sample generator, for example by: programming the analog processor with a configuration of the number of programmable parameters for the analog processor, which corresponds to a probability distribution over qubits of the analog processor, evolving the analog processor, and reading out states for the qubits. The states for the qubits in the plurality of qubits correspond to a sample from the probability distribution. Operation of the sampling device may be summarized as including updating a set of samples to include the sample from the probability distribution, and returning the set of samples.

32 Claims, 26 Drawing Sheets

Related U.S. Application Data continuation-in-part of application No. 14/561,086, filed on Dec. 4, 2014, now abandoned.

(60) Provisional application No. 61/912,385, filed on Dec. 5, 2013.

(51) Int. Cl.
   *G06N 10/00*   (2019.01)
   *G06N 20/00*   (2019.01)

(56) References Cited

U.S. PATENT DOCUMENTS

| | | | |
|---|---|---|---|
| 7,533,068 | B2 | 5/2009 | Maassen van den Brink et al. |
| 8,008,942 | B2 | 8/2011 | van den Brink et al. |
| 8,190,548 | B2 | 5/2012 | Choi |
| 8,195,596 | B2 | 6/2012 | Rose et al. |
| 8,421,053 | B2 | 4/2013 | Bunyk et al. |
| 2003/0071258 | A1* | 4/2003 | Zagoskin ............... G06N 10/00 257/31 |

OTHER PUBLICATIONS

"Kinetic Monte Carlo study of accelerated optimization problem search using Bose-Einstein condensates" Yan et al (Year: 2011) https://www.nii.ac.jp/pi/n8/8_39.pdf.*

"Annealed importance sampling" Radford M. Neal (Year: 1998).*

"Quantum annealing of the traveling-salesman problem" Roman Martonak, Giuseppe E. Santoro, and Erio Tosatti Computational Science, Department of Chemistry and Applied Biosciences, ETH Zürich, USI Campus, Via Giuseppe Buffi 13, CH-6900 Lugano, Switzerland (Year: 2004).*

"A Bayesian analysis of the primordial power spectrum" M. Bridges, A. N. Lasenby and M. P. Hobson Astrophysics Group, Cavendish Laboratory, Madingley Road, Cambridge CB3 0HE Accepted Mar. 18, 2006. Received Mar. 15, 2006; in original form Nov. 25, 2005 (Year: 2005).*

Quantum Annealing—Foundations and Frontiers Eliahu Cohen and Boaz Tamir School of Physics and Astronomy, Tel Aviv University, Tel Aviv, Israel (Year: 2014).*

Hamze, "Sampling From a Set Spins With Clamping," U.S. Appl. No. 61/912,385, filed Dec. 5, 2013, 35 pages.

Hamze, "Sampling From a Set Spins With Clamping," U.S. Appl. No. 14/561,086, filed Dec. 4, 2014, 36 pages.

Hamze, "Sampling From a Set Spins With Clamping," U.S. Appl. No. 14/676,605, filed Apr. 1, 2015, 161 pages.

* cited by examiner

SAMPLING FROM AN ANALOG PROCESSOR

BACKGROUND

Field

The present techniques generally relate to sampling from statistical distributions and using the samples in computational tasks.

BRIEF SUMMARY

Sampling

Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population. That is, a plurality of data points collected from a statistical population. The process of sampling is preforming this collection by a defined procedure. For example, in any population, database, or collection of objects, a sample may refer to any individual datum, data point, object, or subset of data, data points, and/or objects.

In electrical engineering and related disciplines, sampling relates to collecting a plurality of measurements of an analog signal or some other physical system. This is a conversion of a continuous signal to a discrete signal. Here the $i^{th}$ sample of a variable X is denoted $x^{(i)}$.

In many fields including simulations of physical systems, computing, especially analog computing, the foregoing meanings merge. A hybrid computer can draw samples from an analog computer. The analog computer as a provider of samples is an example of a "sample generator". The analog computer can be configured to provide samples from a statistical distribution. A probability distribution assigns a respective probability of being sampled to each data point in the population.

An analog processor, such as a quantum processor and in particular a quantum processor designed to perform quantum annealing and/or adiabatic quantum computation, may be operated as a sample generator. Here each sample corresponds to a state of the processor and the population corresponds to all possible states of the processor. Using an analog processor as a sample generator may be a preferred mode of operating the processor for certain applications. Operating an analog processor as a sample generator may also enable a broader range of problems to be solved compared to, for example, using an analog processor to find a low energy state of a Hamiltonian that encodes an optimization problem.

Importance Sampling

Importance Sampling is a technique for estimating properties of a distribution of interest, by drawing samples from a different distribution, and weighting the samples as needed to recover the distribution of interest. When combined with the normalization constants of both distributions, the resulting estimator is unbiased. Alternatively one can normalize the estimator by the sum of the weights to yield an asymptotically unbiased estimator. Consider the expectation values of a function h(x) over a distribution of interest, π(x), also called the target distribution.

$$I = \int h(x)\pi(x)dx \quad (1)$$

In Equation (1) we can replace the distribution of interest, π(x) with another distribution, the proposal distribution, provided the other distribution q(x) is strictly positive with respect to π(x). Now the integral is:

$$\int h(x)\frac{\pi(x)}{q(x)}q(x)dx \quad (2)$$

Further we define a factor called the importance weight, w(x)=π(x)/q(x). The distributions may only be known to constant factors so a new weight can be defined $\tilde{w}(x)=\tilde{\pi}(x)/\tilde{q}(x)$ where tilde denotes the absence of normalization for the distributions. The integral in Equation (2) can be approximated with a sum over samples from the distribution. Here, for N samples, an unbiased estimate is:

$$\hat{I} = \frac{\sum_{i=1}^{N} h(X^{(i)})\tilde{w}(X^{(i)})}{\sum_{i=1}^{N} \tilde{w}(X^{(i)})} \quad (3)$$

A challenge in importance sampling is finding a good proposal distribution, q(x). A poor choice of proposal will result in a large variance, that is, a very large number of samples must be drawn from the proposal before the weighted set is "representative" of the target distribution. As the number of dimensions in the distribution increases the problem becomes more pronounced.

Markov Chain Monte Carlo

Markov Chain Monte Carlo is a class of computational techniques. A Markov chain may be used, for example when a probability distribution cannot be used. A Markov chain is a sequence of discrete random variables. When the chain is long enough the aggregate properties of the chain, for example, the mean, match the aggregate properties of a target distribution. This sequence is obtained by proposing a new point according to a Markovian proposal process. The new point is either rejected, in which case a new proposal is made, or accepted and the sequence moves on. The points which are accepted are those points that make for a probabilistic convergence to the target distribution. Further, the acceptance of a proposal can be done so that the Markov chain is reversible (also called having detailed balance). That is, the product of transition rates over any closed loop of states in the chain must be the same in either direction. However, because of the technical nature of proposing and accepting proposals the new point often is local to the current point.

Superconducting Qubits

There are solid state qubits based on circuits of superconducting materials. There are two superconducting effects that underlie how superconducting qubits operate: magnetic flux quantization, and Josephson tunneling.

Flux is quantized via the Aharonov-Bohm effect where electrical charge carriers accrue a topological phase when traversing a conductive loop threaded by a magnetic flux. For superconducting loops the charge carries are pairs of electrons called Cooper pairs. For a loop of sufficiently thick superconducting material quantum mechanics dictates that the Cooper pairs accrue a phase that is an integer multiple of 2π. This then constrains the allowed flux in the loop. The flux is quantized. The current in the loop is governed by a single wavefunction and, for the wavefunction to be singlevalued at any point in the loop, the flux within is quantized. In other words, superconductivity isn't simply the absence of electrical resistance but rather a quantum mechanical effect.

Josephson tunneling is the process by which Cooper pairs cross an interruption, such as an insulating gap of a few nanometres, between two superconducting electrodes. The amount of current is sinusoidally dependent on the phase difference between the two populations of Cooper pairs in the electrodes. That is, the phase difference across the interruption.

These superconducting effects are present in different configurations and give rise to different types of superconducting qubits including flux, phase, charge, and hybrid qubits. These different types of qubits depend on the topology of the loops, placement of the Josephson junctions, and the physical parameters of the parts of the circuits, such as, inductance, capacitance, and Josephson junction critical current.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. A qubit and a coupler resemble each other but differ in physical parameters. One difference is the screening parameter, β. Consider an rf-SQUID, which includes a superconducting loop interrupted by Josephson junction. The screening parameter β is defined as the ratio of the geometrical inductance of the loop to the so called Josephson inductance of the junction. The screening parameter β is defined a $2\pi L I_C/\Phi_0$ That is, β is proportional to the product of inductance and critical current. A design with lower values of β, below and about 1, behaves more like an inductive loop whose magnetic susceptibility is altered by the presence of the Josephson junction. This is a monostable device. A design with higher values of β is more dominated by the Josephson junctions and produces a mutistable behavior, such as, bistable behavior. Flux qubits are typically desired to be bistable wherein there are two wells in the potential and often with degenerate ground state configurations for the supercurrent flowing in the loop. For SQUIDs with sufficiently low capacitance quantum tunneling lifts the degeneracy of the ground states. Couplers are typically monostable such as there is a single ground state. Both qubits and couplers may have more devices associated with them. Further details and embodiments of exemplary quantum processors that may be used in conjunction with the present systems and devices are described in, for example, U.S. Pat. Nos. 7,533,068; 8,008,942; 8,195,596; 8,190,548; and 8,421,053.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is a linear interpolation between initial Hamiltonian and final Hamiltonian. An example is given by:

$$H_e = (1-s)H_i + sH_f \quad (4)$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can transition to a higher energy state, such as the first excited state. In the present systems and devices an "adiabatic" evolution is an evolution that satisfies the adiabatic condition:

$$\dot{s} |\langle 1 | dH_e/ds | 0 \rangle| = \delta g^2(s) \quad (5)$$

where $\dot{s}$ is the time derivative of s, g(s) is the difference in energy between the ground state and first excited state of the system (also referred to herein as the "gap size") as a function of s, and δ is a coefficient much less than 1. Generally the initial Hamiltonian $H_i$ and the final Hamiltonian $H_f$ do not commute. That is, $[H_i, H_f] \neq 0$.

The process of changing the Hamiltonian in adiabatic quantum computing may be referred to as evolution. If the rate of change, for example, change of s, is slow enough that the system is always in the instantaneous ground state of the evolution Hamiltonian, then transitions at anti-crossings (i.e., when the gap size is smallest) are avoided. The example of a linear evolution schedule is given above. Other evolution schedules are possible including non-linear, parametric, and the like. Further details on adiabatic quantum computing systems, methods, and apparatus are described in, for example, U.S. Pat. Nos. 7,135,701; and 7,418,283.

Quantum Annealing

Quantum annealing is a computation method that may be used to find a low-energy state, typically preferably the ground state, of a system. Similar in concept to classical simulated annealing, the method relies on the underlying principle that natural systems tend towards lower energy states because lower energy states are more stable. However, while classical annealing uses classical thermal fluctuations to guide a system to a low-energy state and ideally its global energy minimum, quantum annealing may use quantum effects, such as quantum tunneling, as a source of disordering to reach a global energy minimum more accurately and/or more quickly than classical annealing. In quantum annealing thermal effects and other noise may be present to annealing. The final low-energy state may not be the global energy minimum. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of disorder during the annealing process. An objective function, such as an optimization problem, is encoded in a Hamiltonian $H_P$, and the algorithm introduces quantum effects by adding a disordering Hamiltonian $H_D$ that does not commute with $H_P$. An example case is:

$$H_E \propto A(t)H_D + B(t)H_P, \quad (6)$$

where A(t) and B(t) are time dependent envelope functions. For example, A(t) changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing A(t)). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system may settle in the global minimum (i.e., the exact solution), or in a local minimum close in energy to the exact solution. The performance of the computation may be assessed via the residual energy (difference from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of disordering Hamiltonian $H_D$ (i.e., reducing A(t)) in quantum annealing may follow a defined schedule known as an annealing schedule. Unlike adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem. The removal of the disordering Hamiltonian $H_D$ may occur after the same Hamiltonian has been added. That, is turn on the disordering Hamiltonian and then off.

The techniques and structures described herein generally relate to sampling from an available probability distribution to create a desirable probability distribution. This resultant distribution can be used for computing values used in computational techniques including: Importance Sampling and Markov chain Monte Carlo systems.

A computational system may be summarized as including at least one analog processor including qubits, coupling devices, and a readout subsystem. Each coupling device provides controllable communicative coupling between a respective pair of the qubits. The computational system may be summarized as including at least one processor-based device (e.g., digital processor, digital computer), communicatively coupled to the at least one analog processor, and at least one non-transitory computer-readable storage medium that stores processor-executable instructions, which when executed causes at least one processor-based device to: draw, via the readout subsystem, a first plurality of samples for a plurality of variables from a function defined on an analog processor; create a first estimator for the first plurality of samples, and draw a second sample from the first estimator, the second sample including a value for the first variable in the plurality of variables. The processor-executable instructions when executed may further cause the processor-based device to, for the function, during a first iteration of at least one iteration on the function: fix an instant first variable in the plurality of variables to a value for a first variable in the plurality of variables. Where fixing the instant first variable defines: an instant fixed subset of plurality of variables, an instant unfixed subset of plurality of variables, and an instant partially fixed version of the function. The processor-executable instructions may further cause the processor-based device to: draw, via the readout subsystem, an instant plurality of samples for the instant unfixed subset of the plurality of variables from the instant partially fixed version of the function defined on the analog processor; create an instant estimator for the instant unfixed subset of the plurality of variables from the instant plurality of samples; and draw an instant value for an instant second variable of the unfixed subset of plurality of variables from the instant estimator.

A computational system may be summarized as including at least one analog processor comprising: qubits, and coupling devices, where each coupling device provides controllable communicative coupling between a respective pair of qubits. The computational system may be summarized as including at least one processor-based device communicatively coupled to the at least one analog processor, and at least one non-transitory computer-readable storage medium that stores processor-executable instructions, which when executed causes at least one processor-based device to receive a function defining a probability distribution, and during a respective iteration of at least one iteration: initialize an analog processor; allow the analog processor to evolve to a state defined by the function; draw a sample from the function implemented on the analog processor; and update a plurality of samples with the sample; and return the plurality of samples.

A method for operation of a sampling device, including both an analog processor and at least one processor-based device communicatively coupled to one another. The analog processor includes qubits, and a plurality of coupling devices, where each coupling device provides controllable communicative coupling between a respective pair of qubits. The method for operation of the sampling device may be summarized as including operating the analog processor as a sample generator to provide samples from a probability distribution where the shape of the probability distribution depends on a configuration of a number of programmable parameters for the analog processor. Operating the analog processor as a sample generator includes programming the analog processor with a configuration of the number of programmable parameters for the analog processor, where the configuration of a number of programmable parameters corresponds to the probability distribution over the plurality of qubits of the analog processor, evolving the analog processor, and reading out states for the qubits in plurality of qubits of the analog processor, where the states for the qubits in the plurality of qubits correspond to a sample from the probability distribution. The method for operation of the sampling device may be summarized as including updating a set of samples to include the sample from the probability distribution, and returning the set of samples.

A method of operation in a sampling device that comprises both an analog processor, including qubits and coupling devices, and at least one processor-based device communicatively coupled to one another, may be summarized as including initializing, to an initial state, a tree to store a plurality of configurations for a set of variables, and a plurality of probabilities for the plurality of configurations for the set of variables. The tree includes a plurality of nodes representing the plurality of configurations for the set of variables, and a plurality of edges, disposed between pairs of nodes in the plurality of nodes, the edges representing the plurality of probabilities for the plurality of configurations for the set of variables. The method may be further summarized as including: creating a sub-set of variables to be added to the tree, wherein the sub-set of variables is a sub-set of the set of variables; drawing a first plurality of samples from the analog processor implementing a function; selecting a first variable in the sub-set of variables to be added to the tree wherein the first variable in the sub-set of variables to be added to the tree has a minimum entropy value amongst the sub-set of variables to be added to the tree; extending the tree by the selected first variable in the sub-set of variables to be added to the tree; removing the selected first variable in the sub-set of variables to be added to the tree from the sub-set of variables to be added to the tree; performing an iterative process to extend the tree; and returning the tree.

The method of operation in a sampling device may be summarized as further including receiving the tree with an instant state; drawing an instant sample value from an estimator defined by the tree with the instant state; fixing a first instant variable associated with the instant sample value from the estimator with the instant sample value from the estimator in the sub-set of variables in the analog processor implementing a function; drawing an instant plurality of samples from the analog processor implementing an updated function wherein the a first instant variable associated with the instant sample value from the estimator is fixed; and selecting a second instant variable in the sub-set of variables to be added to the tree. The second instant variable has a minimum entropy value amongst any remaining variables in the sub-set of variables to be added to the tree over the instant plurality of samples. The method of operation in a sampling device may be summarized as further including extending the tree by the selected second instant variable in the sub-set of variables to be added to the tree; removing the selected second instant variable from the sub-set of variables to be added to the tree; and traversing the tree in a specified order. The method of operation in a sampling device may be characterized by traversing the tree in a specified order comprises traversing the tree in an order selected from the group consisting of depth first traversal and breadth first traversal. The method of operation in a sampling device may be summarized as further including receiving a request for the plurality of probabilities for the plurality of configurations for the set of variables. The method of operation in a sampling device, where performing the iterative process to extend the tree, may be summarized as further including storing the tree having a varying branching ratio in the at least one nontransitory processor-readable medium. The method of operation in a sampling device, where drawing the first plurality of samples from the analog processor implementing the function, may be summarized as further including programming, via a programming subsystem, the analog processor with a first configuration of the plurality of qubits, and a second configuration for the plurality of coupling devices of the analog processor via the at least one processor-based device, wherein the first configuration and the second configuration corresponds to the function, evolving the analog processor via an evolution subsystem, and reading out states for the qubits in plurality of qubits of the analog processor via a readout subsystem, wherein the states for the qubits in the plurality of qubits correspond to a sample in the first plurality of samples.

A computational system may be summarized as including at least one analog processor including qubits and coupling devices, where each coupling device provides controllable communicative coupling between a respective pair of qubits; at least one processor-based device communicatively coupled to the at least one analog processor; and at least one non-transitory computer-readable storage medium that stores processor-executable instructions. The at least one non-transitory computer-readable storage medium when executed causes at least one processor-based device to initialize, to an initial state, a tree to store a plurality of configurations for a set of variables, and a plurality of probabilities for the plurality of configurations for the set of variables. The tree includes a plurality of nodes which represent the plurality of configurations for the set of variables, and a plurality of edges, disposed between respective pairs of nodes in the plurality of nodes, the edges representative of the plurality of probabilities for the plurality of configurations for the set of variables. The instructions when executed cause at least one processor-based device to: create a sub-set of variables to be added to the tree, the sub-set of variables comprising a sub-set of the set of variables; draw a first plurality of samples from the at least one analog processor implementing a function; determine which of the variables in the sub-set of variables to be added to the tree has a minimum entropy value of the variables in the sub-set of variables; extend the tree by the variable in the sub-set of variables determined to have the minimum entropy value amongst the sub-set of variables; remove the variable used to extend the tree from the sub-set of variables to be added to the tree; iteratively extend the tree; and return the tree.

To iteratively extend the tree, the instructions when executed may cause the at least one processor-based device to: receive the tree with an instant state; raw an instant sample value from an estimator defined by the tree with the instant state; fix a first instant variable associated with the instant sample value from the estimator with the instant sample value from the estimator in the sub-set of variables in the analog processor implementing the function; draw an instant plurality of samples from the analog processor implementing an updated function wherein the a first instant variable associated with the instant sample value from the estimator is fixed; determine an instant variable in the sub-set of variables that has a minimum entropy value amongst any remaining variables in the sub-set of variables to be added to the tree over the instant plurality of samples; extend the tree by the instant variable in the sub-set of variables determined to have the minimum entropy value amongst any remaining variables in the sub-set of variables to be added to the tree over the instant plurality of samples; remove the instant variable used to extend the tree from the sub-set of variables to be added to the tree; and traverse the tree in a specified order. The computational system may be characterized by the specified order being selected from the group consisting of depth first traversal and breadth first traversal. The processor-executable instructions when executed may cause at least one processor-based device to receive a request for the plurality of probabilities for the plurality of configurations for the set of variables. The at least one processor-based device may receive the tree with a varying branching ratio. The computational system may be summarized as further including a programming sub-system for programming the analog processor with a first configuration of the plurality of qubits with one qubit in the plurality of qubits fixed, wherein the first configuration corresponds to the function.

A method of operation in a sampling device that comprises both an analog processor, including qubits, and coupling devices where each coupling device provides controllable communicative coupling between two of the qubits; and at least one processor-based device communicatively coupled to one another, may be summarized as including initializing, to an initial state, a tree to store a plurality of configurations for a set of variables, and a plurality of probabilities for the plurality of configurations for the set of variables. The tree may include a plurality of nodes representing the plurality of configurations for the set of variables, and a plurality of edges, the edges disposed between pairs of nodes in the plurality of nodes representing the plurality of probabilities for the plurality of configurations for the set of variables. The method of operation in the sampling device may be summarized as including drawing a plurality of samples from the analog processor implementing a function; and recursively expanding the tree. Recursively expanding the tree may include receiving an instant tree and a sub-set of variables to be added to the instant tree; in response to the instant tree not corresponding to a base case: finding a variable amongst the sub-set of variables to be added to the instant tree that maximizes the expected depth of the instant tree; updating the instant tree to include the variable as a new level, with a first node at the new level corresponding to a first state of the variable, and a second node at the new level corresponding to a second state of the variable, and a first probability corresponding to first state of the variable associated with a first edge incident on the first node, and a second probability corresponding to the second state of the variable associated with a second edge incident on the first node; removing the variable from the sub-set of variables to be added to the tree; performing the recursive procedure on a remaining part of the tree; and returning the tree.

The performing the recursive procedure on a remaining part of the tree may be summarized as further including performing the recursive procedure on a left-subtree, with the first node at the new level as the root node the left-subtree; and performing the recursive procedure on a right-subtree, with the second node at the new level as the root node the right-subtree; and returning the tree. The method of operation may be summarized as further including receiving a request for the plurality of probabilities for the plurality of configurations for the set of variables. The method of operation in the sampling device may be characterized by performing the iterative process to extend the tree creates a varying branching ratio in the tree. The method of drawing the plurality of samples from the analog processor implementing the function may be summarized as further including programming, via a programming subsystem, the analog processor with a first configuration of the plurality of qubits, and a second configuration for the plurality of coupling devices of the analog processor via the at least one processor-based device, wherein the first configuration and the second configuration corresponds to the function, evolving the analog processor via an evolution subsystem, and reading out states for the qubits in plurality of qubits of the analog processor via a readout subsystem, wherein the states for the qubits in the plurality of qubits correspond to a sample in the plurality of samples. The method may be summarized as further including, in response to the instant tree corresponding to the base case, returning the instant tree. The method may be characterized by the base case includes the instant tree is a complete configuration in the plurality of configurations for the set of variables. The method may be characterized by the base case in which the instant tree includes an edge that is below a threshold value. The method of operation may be summarized as further including traversing the instant tree; and drawing a sample from the instant tree using the plurality of edges, disposed between pairs of nodes in the plurality of nodes representing the plurality of probabilities for the plurality of configurations for the set of variables, as an estimator for a partial configuration for the set of variables. The method may be summarized as further including checking if a node in the tree is a terminal node not associated with a full configuration; and performing an operation selected from the group consisting of: returning an estimate of the probability of the configurations below the node as all being equally probable; again continuing to recursively expanding the with a lower threshold for the base case. The method of finding the variable in set of variables that maximizes the expected depth of the tree may be summarized as further including selecting the variable in set of variables associated a minimum entropy.

A computational system may be summarized as comprising at least one analog processor, including qubits and coupling devices where each coupling device provides controllable communicative coupling between a respective pair of qubits; at least one processor-based device communicatively coupled to the at least one analog processor; and at least one non-transitory computer-readable storage medium that stores processor-executable instructions which when executed causes at least one processor-based device to: initialize, to an initial state, a tree to store a plurality of configurations for a set of variables, and a plurality of probabilities for the plurality of configurations for the set of variables. The tree may include: a plurality of nodes which represent the plurality of configurations for the set of variables, and a plurality of edges, the edges disposed between pairs of nodes in the plurality of nodes which represent the plurality of probabilities for the plurality of configurations for the set of variables. When executed processor-executable instructions cause at least one processor-based device to: draw a plurality of samples from the analog processor implementing a function; and recursively expand the tree. To recursively expand the tree the at least one processor-based device: receives an instant tree and a sub-set of variables to be added to the instant tree; determines whether the instant tree corresponds to a base case; in response to the instant tree not corresponding to the base case: finds a variable amongst the sub-set of variables to be added to the instant tree that maximizes the expected depth of the instant tree; updates the instant tree to include the found variable as a new level, with a first node at the new level corresponding to a first state of the found variable, and a second node at the new level corresponding to a second state of the found variable, and a first probability corresponding to first state of the found variable associated with a first edge incident on the first node, and a second probability corresponding to the second state of the found variable associated with a second edge incident on the first node; remove the found variable from the sub-set of variables to be added to the tree; and performs the recursive procedure on a remaining part of the tree.

To perform the recursive procedure on a remaining part of the tree, the processor-executable instructions may cause the at least one processor-based device to perform the recursive procedure on a left-subtree within the remaining portion of the tree, with the first node at the new level as the root node the left-subtree; and perform the recursive procedure on a right-subtree within the remaining portion of the tree, with the second node at the new level as the root node the right-subtree. The processor-executable instructions may further cause the at least one processor-based device to receive a request for the plurality of probabilities for the plurality of configurations for the set of variables. The tree may have a binary branching ratio and an unbalanced structure. The analog processor may include a plurality of qubits, and a plurality of coupling devices, where each coupling device provides controllable communicative coupling between a respective pair of the plurality of qubits. In order to draw the plurality of samples from the analog processor implementing the function, when executed, the processor-executable instructions may further cause the at least one processor to: program, via a programming subsystem, the analog processor with a first configuration for the plurality of qubits in the analog processor, and a second configuration for the plurality of coupling devices for the analog processor via the at least one processor-based device, wherein the first configuration and the second configuration corresponds to the function, evolve the analog processor via an evolution subsystem, and read out states for the qubits in plurality of qubits of the analog processor via a readout subsystem, wherein the states for the qubits in the plurality of qubits correspond to a sample in the plurality of samples. In the base case, the instant tree may be a complete configuration in the plurality of configurations for the set of variables. The base case may be characterized as the instant tree including an edge that is below a threshold value. When executed, processor-executable instructions may further cause the at least one processor-based device to: traverse the tree; and draw a sample from the tree using the plurality of edges, disposed between pairs of nodes in the plurality of nodes representing the plurality of probabilities for the plurality of configurations for the set of variables, as an estimator for a partial configuration for the set of variables. When executed, the processor-executable instructions may further cause the at least one processor-based device to: check if a node in the tree is a terminal node not associated with a full configuration; and perform an operation selected from the group consisting of: return an estimate of the probability of the configurations below the node as all being equally probable; extend the tree calling the recursive procedure with a lower threshold for the base case. In order to draw the plurality of samples from the analog processor implementing the function, when executed the processor-executable instructions further cause the at least one processor to: select a variable in set of variables with a minimum entropy. The computational system may be characterized by where, when executed, the processor-executable instructions cause the at least one processor-based device to return the tree.

A computational system may be summarized as including at least one analog processor comprising qubits and coupling devices, wherein each coupling device provides controllable communicative coupling between a respective pair of qubits; at least one processor-based device communicatively coupled to the at least one analog processor; and at least one non-transitory computer-readable storage medium that stores processor-executable instructions. The processor-executable instructions, when executed, may cause at least one processor-based device to: receive a sample from a function implemented on an analog processor; run a simulated annealing according to a backwards annealing schedule, wherein the simulated annealing starts at the sample and generates a history of states of the simulated annealing; and return the history of states of the simulated annealing.

A computational system may be summarized as further including a readout subsystem responsive to a state of each of the qubits in the plurality of qubits to generate a first sample. The processor-executable instructions may, when executed, cause at least one processor-based device to provide the backwards annealing schedule, the sample, and the function to a simulated annealer to run the simulated annealing. The backwards annealing schedule may be an accelerated backwards annealing schedule. The processor-executable instructions, when executed, may cause at least one processor-based device to record the history of states of the simulated annealing. The processor-executable instructions, when executed, may cause at least one processor-based device to compute a weight for the sample from the history of states of the simulated annealing. The processor-executable instructions, when executed, may cause at least one processor-based device to compute the weight as proportional to a product over a plurality of states in the history of states of the simulated annealing, each term of the product includes an exponent of a multiplication of: a difference between an inverse temperature at a first state in the history of states of the simulated annealing and an inverse temperature at a second state in the history of states of the simulated annealing, and an energy at the second state in the history of states of the simulated annealing. The processor-executable instructions, when executed, may cause at least one processor-based device to apply the weight to the sample in importance sampling. The processor-executable instructions, when executed, may cause at least one processor-based device to record the weight, return the weight, or the like.

A method of operation in a sampling device that includes both an analog processor, including qubits, and coupling devices where each coupling device provides controllable communicative coupling between two of the qubits, may be summarized as including receiving a sample from a function implemented on an analog processor; running a simulated annealing in accordance with a backwards annealing schedule. The simulated annealing starts at the sample and generates a history of states of the simulated annealing. The method for operation may include returning the history of states of the simulated annealing.

The method for operation of the sampling device may be further summarized as including providing the backwards annealing schedule, the sample, and the function to a simulated annealer to run the simulated annealing. The method may provide an accelerated backwards annealing schedule in the backwards annealing schedule. The method for operation of the sampling device may be further summarized as including computing a weight for the sample from the history of states of the simulated annealing. The method for operation of the sampling device may be further summarized as including computing the weight as proportional to a product over a plurality of states in the history of states of the simulated annealing. Each term of the product may include an exponent of a multiplication of: a difference between an inverse temperature at a first state in the history of states of the simulated annealing and an inverse temperature at a second state in the history of states of the simulated annealing, and an energy at the second state in the history of states of the simulated annealing. The method for operation of the sampling device may be further summarized as including applying the weight to the sample in importance sampling. The method for operation of the sampling device may be further summarized as including recording the weight. The method for operation of the sampling device may be further summarized as including returning the weight. The method for operation of the sampling device may be further summarized as including recording the history of states of the simulated annealing. The method for operation of the sampling device may be further summarized as including fixing a first qubit in the plurality of qubits to a known state.

A non-transitory computer-readable storage medium stores processor-executable instructions, which when executed, cause at least one processor to: receive a sample from a function implemented on an analog processor; run a simulated annealing according to a backwards annealing schedule, wherein the simulated annealing starts at the sample and generates a history of states of the simulated annealing; and return the history of states of the simulated annealing.

The processor-executable instructions may, when executed, cause at least one processor to provide the backwards annealing schedule, the sample, and the function to a simulated annealer to run the simulated annealing. The processor-executable instructions may provide an accelerated backwards annealing schedule. The processor-executable instructions may, when executed, cause at least one processor to compute a weight for the sample from the history of states of the simulated annealing. The processor-executable instructions may, when executed, cause at least one processor to compute the weight as proportional to a product over a plurality of states in the history of states of the simulated annealing, each term of the product includes an exponent of a multiplication of: a difference between an inverse temperature at a first state in the history of states of the simulated annealing and an inverse temperature at a second state in the history of states of the simulated annealing, and an energy at the second state in the history of states of the simulated annealing. The processor-executable instructions may, when executed, cause at least one processor to apply the weight to the sample in importance sampling. The processor-executable instructions may, when executed, cause at least one processor to record the weight. The processor-executable instructions may, when executed, cause at least one processor to return the weight. The processor-executable instructions may, when executed, cause at least one processor to record the history of states of the simulated annealing.

A computational system may be summarized as including at least one analog processor including qubits and coupling devices, where each coupling device provides controllable communicative coupling between a respective pair of the qubits; at least one processor-based device communicatively coupled to the at least one analog processor; and at least one non-transitory computer-readable storage medium that stores processor-executable instructions which, when executed, cause at least one processor-based device to: receive a function; receive a temperature ladder that specifies at least a first temperature; request a plurality of samples from an analog processor implementing the function; initialize a plurality of Markov chains each including one or more entries with a null value; and associate each Markov chain in the plurality of Markov chains to a respective temperature from the temperature ladder, a first Markov chain associated with the first temperature, and a set of Markov chains in the plurality of Markov chains not associated with the first temperature. The processor-executable instructions, when executed, may cause at least one processor-based device to: for each respective entry in each Markov chain of the plurality of Markov chains, if the respective entry is in the first Markov chain, and if a hardware sample is available in the plurality of samples requested from the analog processor implementing the function, update the respective entry in the first Markov chain with the hardware sample, and otherwise, generate a value for the respective entry, and update the respective entry with the value under a probabilistic acceptance rule. The processor-executable instructions, when executed, may cause at least one processor-based device to return at least one of the Markov chains from the plurality of Markov chains.

The processor-executable instructions, when executed, may cause at least one processor-based device to, for each respective entry in each Markov chain of the plurality of Markov chains, if the respective entry is in a respective Markov chain of the set of Markov chains in the plurality of Markov chains, or if the respective entry is in the first Markov chain and a hardware sample is not available in the plurality of samples requested from an analog processor implementing the function: propose a first new state as the respective entry to the respective Markov chain; and update the respective entry with first new state in accordance with a first probability. The respective entry may be in the first Markov chain, or the respective entry may be in a respective Markov chain in the set of Markov chains. The processor-executable instructions, when executed, may cause at least one processor-based device to, for each of a number of pairs of Markov chains of the plurality of Markov chains, where each respective pair of Markov chains includes a warmer Markov chain, and a cooler Markov chain: draw a random number; and swap a first entry in the warmer Markov chain in the respective pair of Markov chains with a second entry in the cooler Markov chain in the respective pair of Markov chains if the random number exceeds a second probability. The processor-executable instructions, when executed, may cause at least one processor-based device to compute the second probability as an exponential of a term proportional to a product: an energy difference between the first entry in the warmer Markov chain and the second entry in the cooler Markov chain, and a difference between a first inverse temperature associated with the warmer Markov chain and a second inverse temperature associated with the cooler Markov chain. The processor-executable instructions, when executed, may cause at least one processor-based device to, for each respective entry in the first Markov chain of the plurality of Markov chains, draw a sample from a binary probability distribution; and if the sample drawn from the binary probability distribution exceeds a third probability update the respective entry in first Markov chain with the hardware sample. The processor-executable instructions, when executed, may cause at least one processor-based device to record the plurality of Markov chains. The computational system may be summarized as further including a readout subsystem responsive to a state of each of the qubits in the plurality of qubits to generate the plurality of samples requested from the analog processor.

A method of operation in a sampling device that includes both an analog processor, including qubits and coupling devices where each coupling device provides controllable communicative coupling between two of the plurality of qubits, and at least one processor-based device where the analog processor and the at least one processor-based device are communicatively coupled to one another, may be summarized as including receiving a function; receiving a temperature ladder specifying at least a first temperature; requesting, asynchronously, a plurality of samples from the analog processor implementing the function; initializing a plurality of Markov chains each including one or more entries with a null value; associating with each Markov chain in the plurality of Markov chains to a respective temperature from the temperature ladder wherein a first Markov chain is associated with the first temperature, and a set of Markov chains in the plurality of Markov chains is not associated with the first temperature; for a respective entry in each Markov chain of the plurality of Markov chains, if the respective entry is in the first chain Markov associated with the first temperature, and if a hardware sample is available in the plurality of samples requested from the analog processor implementing the function, update the respective entry in first chain associated with the first temperature with the hardware sample, and otherwise, generate a value for the respective entry and accept the value under a probabilistic update rule; and returning a Markov chain from the plurality of Markov chains.

The method of operation in the sampling device may be summarized as further including, for the respective entry in each Markov chain of the plurality of Markov chains, if the respective entry is in a respective Markov chain of the set of Markov chains in the plurality of Markov chains, or if the respective entry is in the first Markov chain associated with the first temperature, and if a hardware sample is not available in the plurality of samples requested from an analog processor implementing the function, proposing a first new state as the respective entry in the respective Markov chain; and updating the respective entry with first new state in accordance with a first probability. The method of operation in the sampling device may be summarized as further including, determining if the respective entry is in the first Markov chain associated with the first temperature, or the respective entry is in a respective Markov chain of the set of Markov chains in the plurality of Markov chains. The method of operation in the sampling device may further include, for each of a number of pairs of Markov chains of the plurality of Markov chains, where each respective pair of Markov chains includes a warmer Markov chain, and a cooler Markov chain, drawing a random number; and swapping a first entry in the warmer Markov chain in the respective pair of Markov chains with a second entry in the cooler Markov chain in the respective pair of Markov chains if the random number exceeds a second probability. The method may further include, computing the second probability as an exponential proportional to a product of: an energy difference between the first entry in warmer Markov chain and the second entry in the cooler Markov chain, and a difference between a first inverse temperature associated with the warmer Markov chain and a second inverse temperature associated with the cooler Markov chain. The method may further include, for the respective entry in each Markov chain of the plurality of Markov chains: draw a sample from a binary probability distribution; and if the sample drawn from the binary probability distribution exceeds a third probability, add the hardware sample to the first chain as the respective entry. The method may further include recording the plurality of Markov chains.

A computational system may be summarized as including at least one nontransitory processor-readable medium that stores at least one of processor executable instructions or data; and at least one processor communicatively coupled to the least one nontransitory processor-readable medium, where, in response to execution of the at least one of processor executable instructions or data, the at least one processor requests a set of samples from an analog processor implementing a function, seeds a Markov chain with a sample drawn from the set of samples, updates the Markov chain in accordance with an update rule, and returns the Markov chain.

The computational system may further receive the function. The processor-executable instructions, when executed, may cause the processor to, in accordance with the update rule, propose a new state; and accept the new state probabilistically. The processor-executable instructions, when executed, may cause the processor to, in accordance with the update rule, execute a method selected from the group consisting of Gibbs sweeping, Metropolis method, and locally tree like updates. The processor-executable instructions may cause the processor to trim the Markov chain. The processor-executable instructions may cause the processor to sub-sample the Markov chain. The processor-executable instructions may cause the processor to assign a set of weights to the entries in the Markov chain.

A method of operating a sampling device may be summarized as including requesting a set of samples from an analog processor wherein the analog processor implements a function; seeding a Markov chain with a sample drawn from the set of samples; updating the Markov chain in accordance with an update rule; and returning the Markov chain.

The method of operating the sampling device may further include receiving the function. The method may further include proposing a new state, in accordance with the update rule; and accepting the new state probabilistically, in accordance with an update rule. The method may further include executing a method selected from the group consisting of Gibbs sweeping, Metropolis method, and locally tree like updates. The method may further include trimming the Markov chain. The method may further include sub-sampling the Markov chain. The method may further include assigning a set of weights to the entries in the Markov chain.

A method of operating a sampling device, that includes both an analog processor and at least one processor-based device communicatively coupled to one another, may be summarized as operating the analog processor as a sample generator to provide samples from a probability distribution, where a shape of the probability distribution depends on a configuration of a number of programmable parameters for the analog processor, processing the samples read via the readout system via the at least one processor-based device, where processing the samples read via the readout system via the at least one processor-based device includes determining a sub-set of the samples based on distances between the samples; and returning the sub-set of samples. As part of operating the analog processor as a sample generator, the method may include: programming, via a programming subsystem, the analog processor with a configuration of the number of programmable parameters for the analog processor via the at least one processor-based device, where the configuration of a number of programmable parameters corresponds to the probability distribution over the plurality of qubits of the analog processor, evolving the analog processor via an evolution subsystem, and reading out states for the qubits in plurality of qubits of the analog processor via a readout subsystem, wherein the states for the qubits in the plurality of qubits correspond to samples from the probability distribution. The analog processor may include a plurality of qubits, and a plurality of coupling devices. Each coupling device provides controllable communicative coupling between two of the plurality of qubits.

The method of operating the sampling device may further include programming the analog processor with a configuration of the number of programmable parameters for the analog processor comprises programming the analog processor with the configuration of the number of programmable parameters which correspond to the probability distribution over the plurality of qubits of the analog processor which define a function. The method may further include causing the analog processor to implement the function as a constraint satisfaction problem, wherein the constraint satisfaction problem comprises a plurality of constraints. The method may further include, for each of a number of the samples, determining if the respective sample from the samples is an infeasible solution to the constraint satisfaction problem; and excluding the respective sample that is an infeasible solution to the constraint satisfaction problem from the samples. The method may include determining a sub-set of the samples based on distances between the samples based on diversity. The method may include determining a sub-set of the samples based on distances between the samples, for instance based on diversity and sparsity. The method may include determining a sub-set of the samples based on distances between the samples and determining the sub-set of the samples based on proximity. The method may include evolving the analog processor via an evolution subsystem and performing at least one of adiabatic quantum computation, or quantum annealing.

A computational system may be summarized as including at least one non-transitory processor-readable medium that stores at least one of processor executable instructions or data; and at least one processor communicatively coupled to the least one non-transitory processor-readable medium which, in response to execution, cause the at least one processor to: receive a function; implement the function on an analog processor; collect a plurality of samples from the analog processor implementing the function on the analog processor; determine a sub-set of the samples in the plurality of samples based on distances between samples in the plurality of samples; and return the sub-set of the samples.

The processor executable instructions or data, in response to execution, may cause the at least one processor to program the analog processor with a configuration of a number of programmable parameters for the analog processor via the at least one processor, wherein the configuration of the number of programmable parameters corresponds to a probability distribution over the plurality of qubits of the analog processor defined by the function. A computational system may operate on a constraint satisfaction problem comprising a plurality of constraints implemented by the function. The processor executable instructions or data, in response to execution, may cause the at least one processor to determine if a sample from the plurality of samples is an infeasible solution to the constraint satisfaction problem; and exclude the sample that is an infeasible solution to the constraint satisfaction problem from the samples. The processor executable instructions or data, in response to execution, may cause the at least one processor to determine the sub-set of the samples based on diversity. The processor executable instructions or data, in response to execution, may cause the at least one processor to determine the sub-set of the samples based on sparsity. The processor executable instructions or data, in response to execution, may cause the at least one processor to determine the sub-set of the samples based on proximity. The processor executable instructions or data, in response to execution, may cause the at least one processor to evolve the analog processor via at least one of adiabatic quantum computation, or quantum annealing.

A method of operating a first one processor-based device for using a set of samples from a sampling device may be summarized as receiving the set of samples; receiving a second function; searching through the set of samples for a feasible solution to the second function; and returning the feasible solution to the second function. The sampling device may be summarized as including both an analog processor and a second at least one processor-based device communicatively coupled to one another. The analog processor including a plurality of qubits, and a plurality of coupling devices, wherein the analog processor includes a configuration of a number of programmable parameters corresponds a first function.

The method may further include sorting the set of samples in increasing order of energy; and searching through the set of samples for a feasible solution to the second function in increasing order of energy. The second function may be a changed version of the first function. The method may further include sorting the set of samples in increasing order of energy; and searching through the set of samples for a feasible solution to the second function in increasing order of energy.

A computational system may be summarized as including at least one non-transitory processor-readable medium that stores at least one of processor executable instructions or data; and at least one processor communicatively coupled to the least one non-transitory processor-readable medium which, in response to execution, cause the at least one processor to: receive the set of samples; receive a second function; search through the set of samples for a feasible solution to the second function; and return the feasible solution to the second function.

The processor executable instructions or data may, in response to execution, further cause the at least one processor to: sort the set of samples in increasing order of energy; and search through the sorted set of samples for a feasible solution to the second function in increasing order of energy. The second function may be a changed version of the first function.

A method of operating a sampling device that includes both an analog processor, including qubits and coupling devices, wherein each coupling device provides controllable communicative coupling between two of the qubits, and at least one processor-based device communicatively coupled to one another, may be summarized as including operating the analog processor as a sample generator to provide samples from a probability distribution, where a shape of the probability distribution depends on a configuration of a number of programmable parameters for the analog processor. Operating the analog processor as a sample generator may include programming, via a programming subsystem, the analog processor with a configuration of the number of programmable parameters for the analog processor via the at least one processor-based device, where the configuration of a number of programmable parameters corresponds to the probability distribution over the plurality of qubits of the analog processor, evolving the analog processor via an evolution subsystem, and reading out states for the qubits in plurality of qubits of the analog processor via a readout subsystem. The states for the qubits in the plurality of qubits correspond to samples from the probability distribution. The method may include processing the samples read via the readout system via the at least one processor-based device. Processing the samples read via the readout system via the at least one processor-based device may include determining a sub-set of the samples based on distances between the samples. The method may further include returning the sub-set of samples.

Programming the analog processor may further include programming the analog processor with the configuration of the number of programmable parameters which correspond to the probability distribution over the plurality of qubits of the analog processor which define a function. The method may include causing the analog processor to implement the function as a constraint satisfaction problem, wherein the constraint satisfaction problem comprises a plurality of constraints. The method may further include, for each of a number of the samples, determining if the respective sample from the samples is an infeasible solution to the constraint satisfaction problem, and excluding the respective sample that is an infeasible solution to the constraint satisfaction problem from the samples. The may include determining the sub-set of the samples based on diversity. The method may determining the sub-set of the samples based on diversity and sparsity. The method may include determining the sub-set of the samples based on proximity. Evolving the analog processor via an evolution subsystem may be summarized as including performing at least one of adiabatic quantum computation, or quantum annealing. The method programming, via the programming subsystem, the analog processor with the configuration of the number of programmable parameters for the analog processor via the at least one processor-based device, wherein the configuration of the number of programmable parameters corresponds to the probability distribution over the plurality of qubits of the analog processor may be summarized as including fixing a first qubit in the plurality of qubits to a known state.

A computational system may be summarized as including at least one non-transitory processor-readable medium that stores at least one of processor executable instructions or data, and at least one processor communicatively coupled to the least one non-transitory processor-readable medium which, in response to execution of the at least one of processor executable instructions or data: receives a function, implements the function on an analog processor, collects a plurality of samples from the analog processor implementing the function on the analog processor, determines a sub-set of the samples in the plurality of samples based on distances between samples in the plurality of samples, and returns the sub-set of the samples.

In response to execution of the at least one of processor executable instructions or data, the at least one processor may further program the analog processor with a configuration of a number of programmable parameters for the analog processor via the at least one processor, wherein the configuration of the number of programmable parameters corresponds to a probability distribution over the plurality of qubits of the analog processor defined by the function. The computational system may be further characterized by the function implementing a constraint satisfaction problem comprising a plurality of constraints. In response to execution of the at least one of processor executable instructions or data, the at least one processor may further determine if a sample from the plurality of samples is an infeasible solution to the constraint satisfaction problem; and exclude the sample that is an infeasible solution to the constraint satisfaction problem from the samples. In response to execution of the at least one of processor executable instructions or data, the at least one processor may further determine the sub-set of the samples based on diversity. In response to execution of the at least one of processor executable instructions or data, the at least one processor may further determine the sub-set of the samples based on sparsity. In response to execution of the at least one of processor executable instructions or data, the at least one processor may further determine the sub-set of the samples based on proximity. In response to execution of the at least one of processor executable instructions or data, the at least one processor may further evolve the analog processor via at least one of adiabatic quantum computation, or quantum annealing.

A method of operation in a first one processor-based device for using a set of samples from a sampling device. The sampling device may include both an analog processor, and a second at least one processor-based device communicatively coupled to one another. The analog processor may include a plurality of qubits, and a plurality of coupling devices. The analog processor includes a configuration of a number of programmable parameters corresponds a first function. The method of operation in the first one processor-based device for using the set of samples from the sampling device may be summarized as including receiving the set of samples, receiving a second function, searching through the set of samples for a feasible solution to the second function, and returning the feasible solution to the second function.

The method of operation in the first one processor-based device for using the set of samples from the sampling device may be further summarized as including sorting the set of samples in increasing order of energy, and searching through the set of samples for a feasible solution to the second function in increasing order of energy. The second function may be a changed version of the first function.

A system for use in sample processing may be summarized as including at least one non-transitory processor-readable medium that stores at least one of processor executable instructions or data; and at least one processor communicatively coupled to the least one non-transitory processor-readable medium which, in response to execution causes at least one processor to: receive the set of samples; receive a second function; search through the set of samples for a feasible solution to the second function; and return the feasible solution to the second function.

The system for use in sample processing where the processor-executable instructions when executed may further cause the at least one processor to sort the set of samples in increasing order of energy, and search through the sorted set of samples for a feasible solution to the second function in increasing order of energy. The second function may be a changed version of the first function.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", one example", an example", or "another example" means that a particular referent feature, structure, or characteristic described in connection with the embodiment or example is included in at least one embodiment or example. Thus, the appearances of the phrases in one embodiment", in an embodiment", "another embodiment" or the like in various places throughout this specification are not necessarily all referring to the same embodiment or example. Furthermore, the particular features, structures, or characteristics may be combined in any suitable manner in one or more embodiments or examples.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Figure 8:
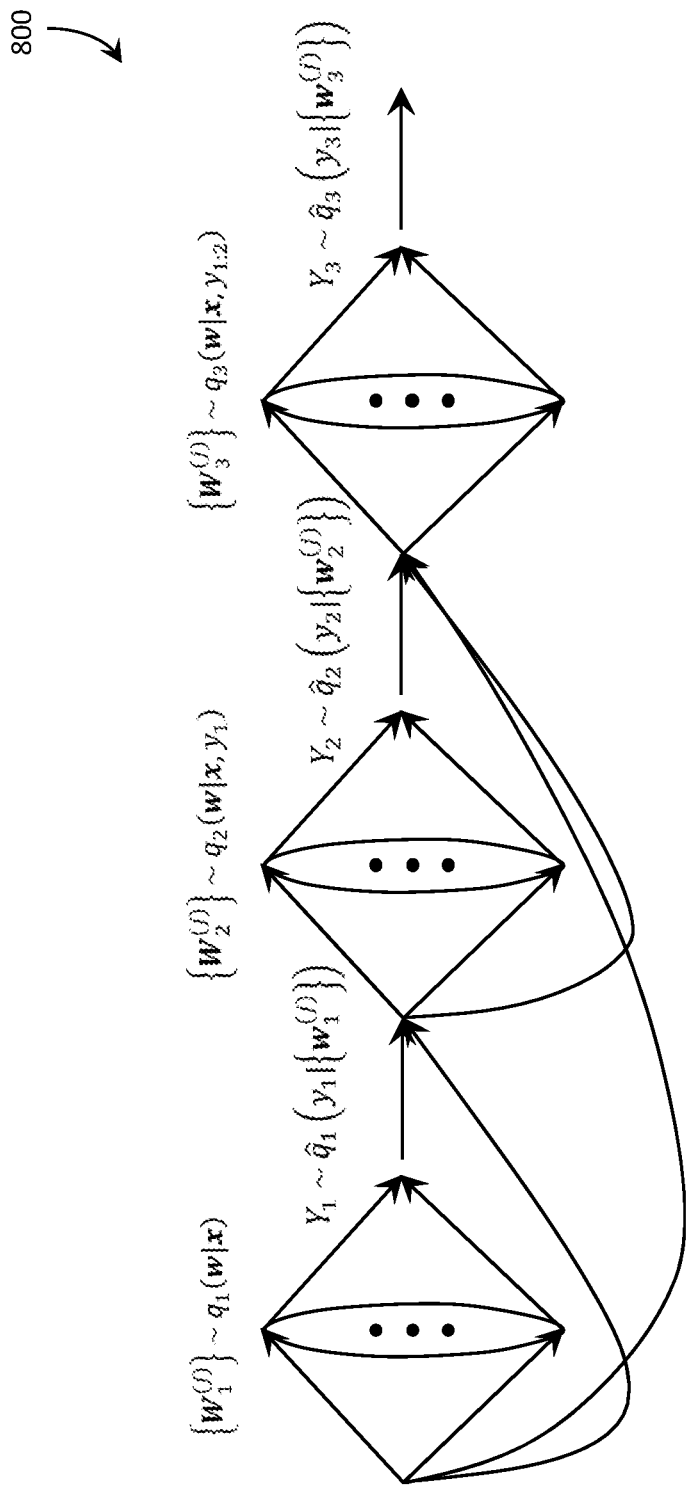
FIG. 8 is a block-diagram showing an exemplary application of techniques described herein on blocks of variables in accordance with the presently described systems, devices, articles, and methods.
Figure 9:
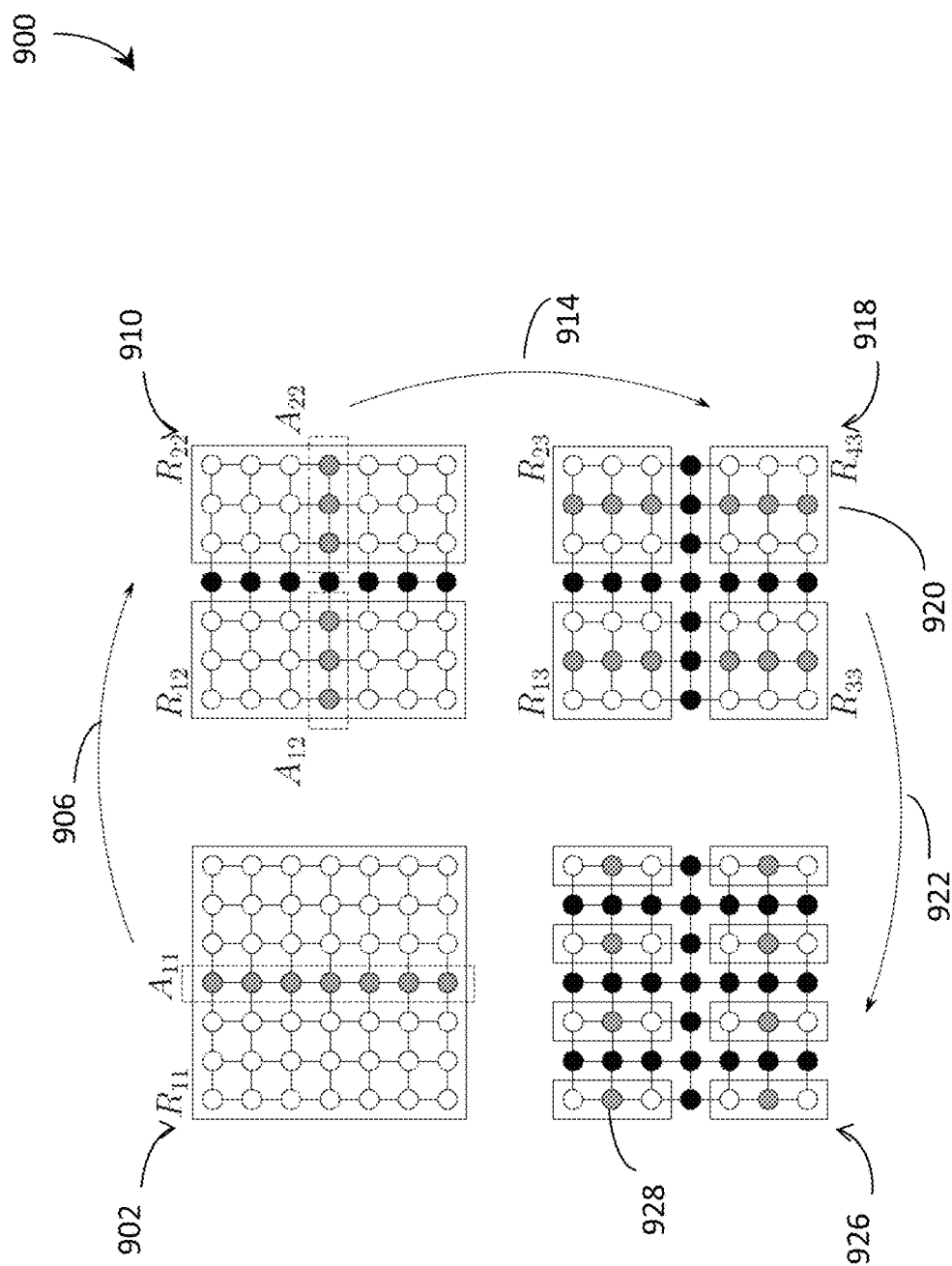
FIG. 9 is a block-diagram showing an exemplary application of techniques described herein on blocks of variables in a multiway recursion in accordance with the presently described systems, devices, articles, and methods.
Figure 10:
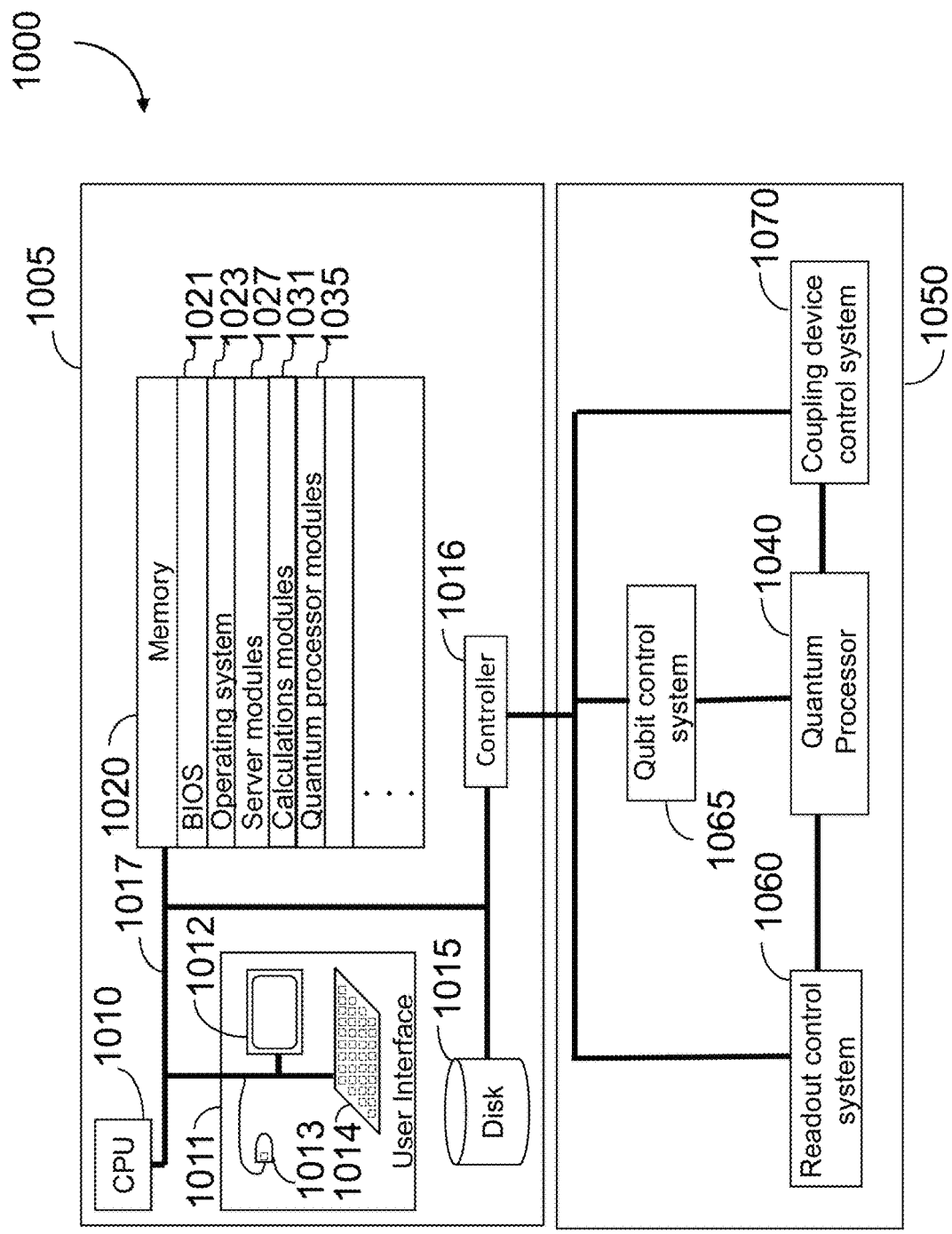
FIG. 10 is a schematic diagram of an exemplary hybrid computing system including a digital processor and quantum processor useful in performing the methods described in the present disclosure.

The present systems, devices, articles, and methods relate to sampling from an available probability distribution and making use of the samples. Some concepts and notation are explained in the description for FIG. 1. Techniques for performing correct sampling from a proposal distribution are described in the description for FIG. 2. The correct sampling can provide useful insight for, or be used in, Importance Sampling (FIG. 3), Markov chain Monte Carlo techniques (FIGS. 4, 5, 6, and 7), and the like. The sampling techniques can be applied with blocks of variables (FIG. 8). Sampling can be performed on blocks of variables in a multiway recursion, for instance as illustrated in FIG. 9. Correct sampling can be performed via a digital computer on its own, or performed via a digital computer in cooperation with an analog computer, such as, a quantum computer. FIG. 10 shows a digital computer communicatively coupled to a quantum computer. Use of a quantum computer for sampling may advantageously allow samples to be taken from many disparate low energy states.

Figure 11:
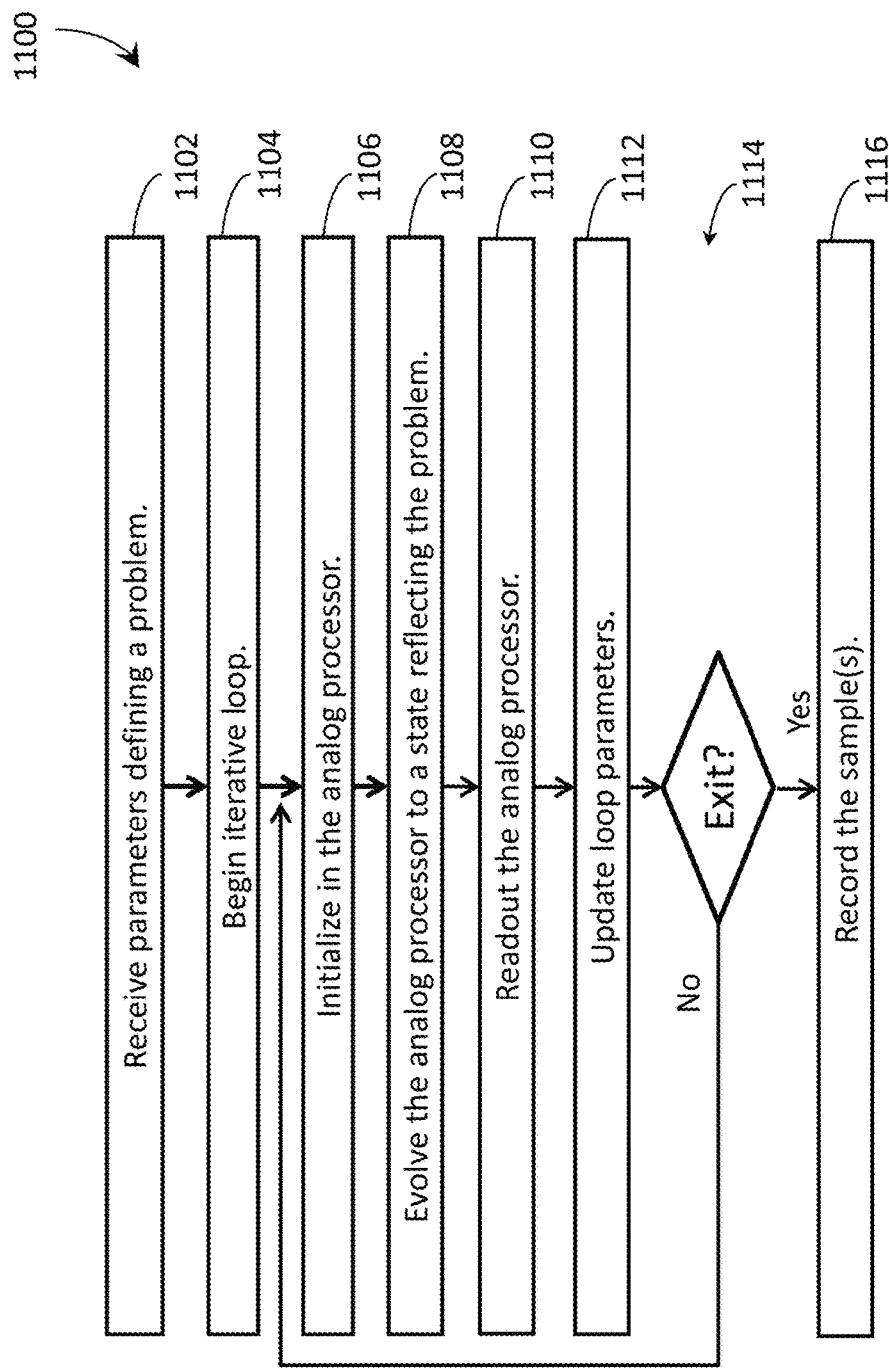
FIG. 11 is a flow-diagram showing a method of sampling in accordance with the presently described systems, devices, articles, and methods.
Figure 12:
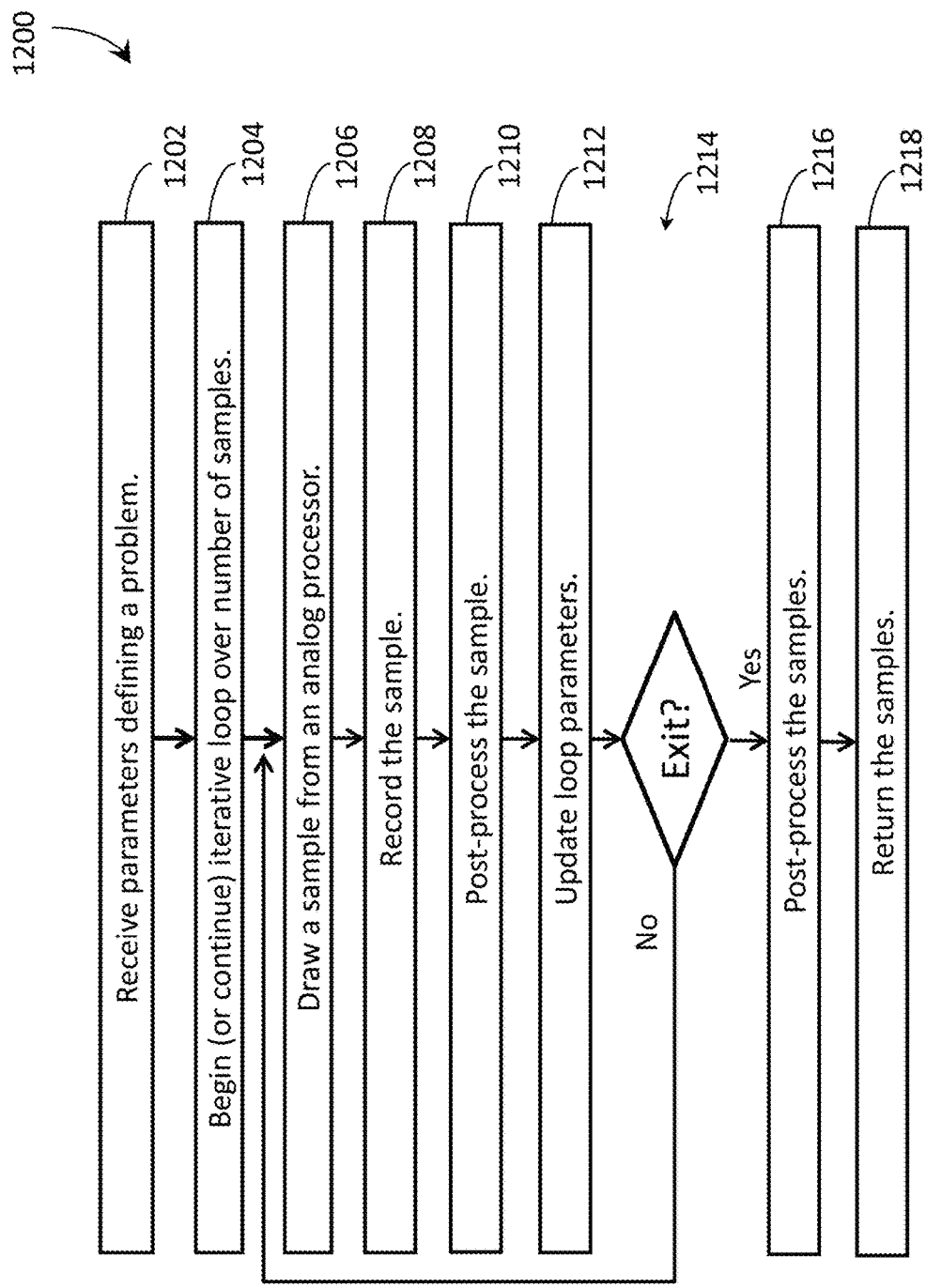
FIG. 12 is a flow-diagram showing a method of sampling including post-processing in accordance with the presently described systems, devices, articles, and methods.
Figure 13:
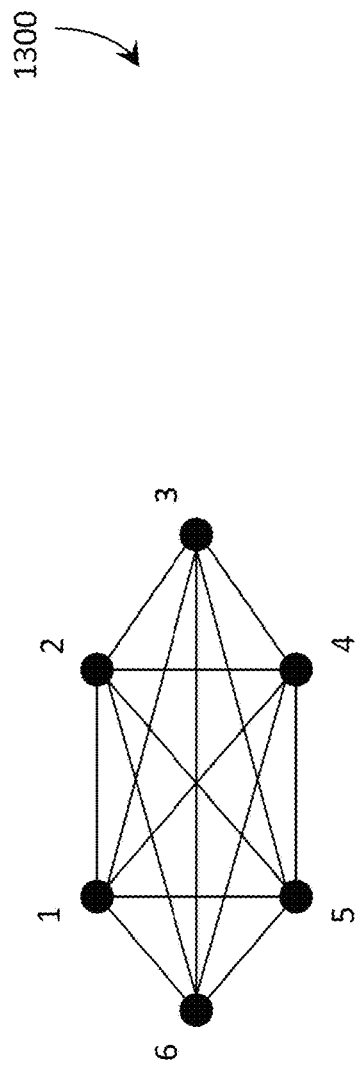
FIG. 13 is a graph that illustrates an exemplary complete graph in accordance with the presently described systems, devices, articles, and methods.
Figure 14:
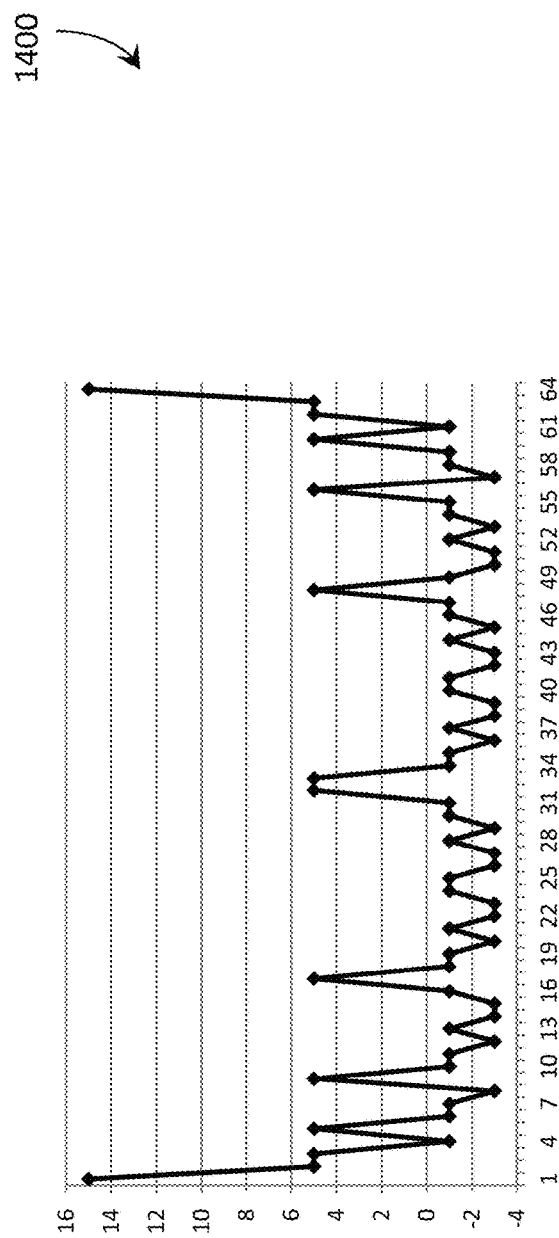
FIG. 14 is a graph that shows the energies for the problem Hamiltonian described in FIG. 13, in accordance with the presently described systems, devices, articles, and methods.
Figure 15:
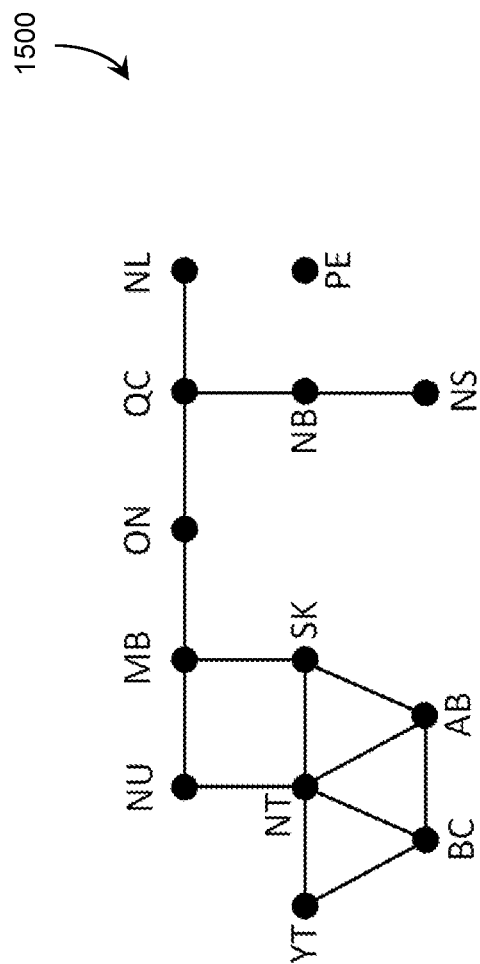
FIG. 15 is an exemplary graph in accordance with the presently described systems, devices, articles, and methods.
Figure 16:
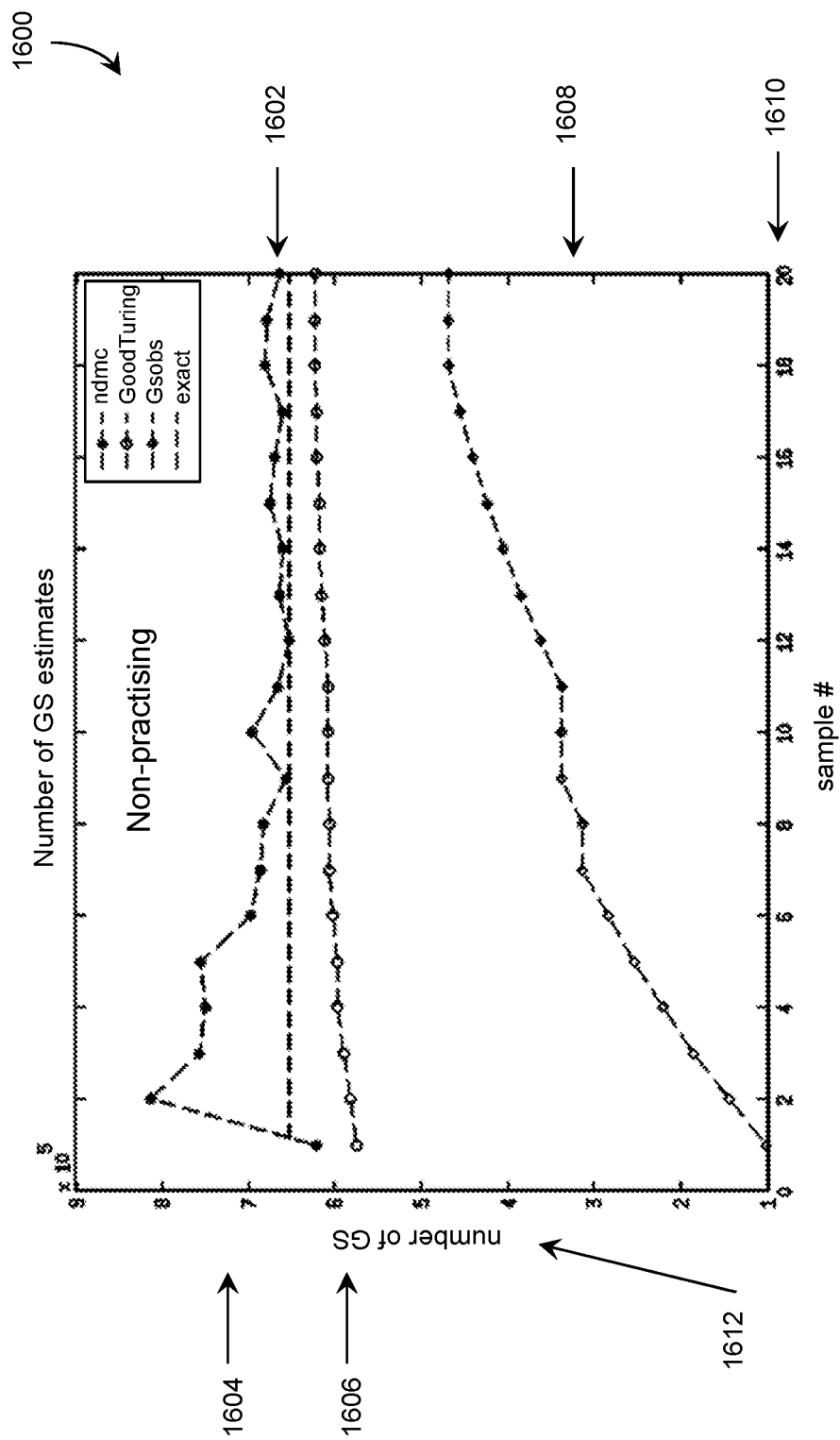
FIG. 16 is a graph that shows data series associated with the problem Hamiltonian described in FIG. 15, in accordance with the presently described systems, devices, articles, and methods.
Figure 17:
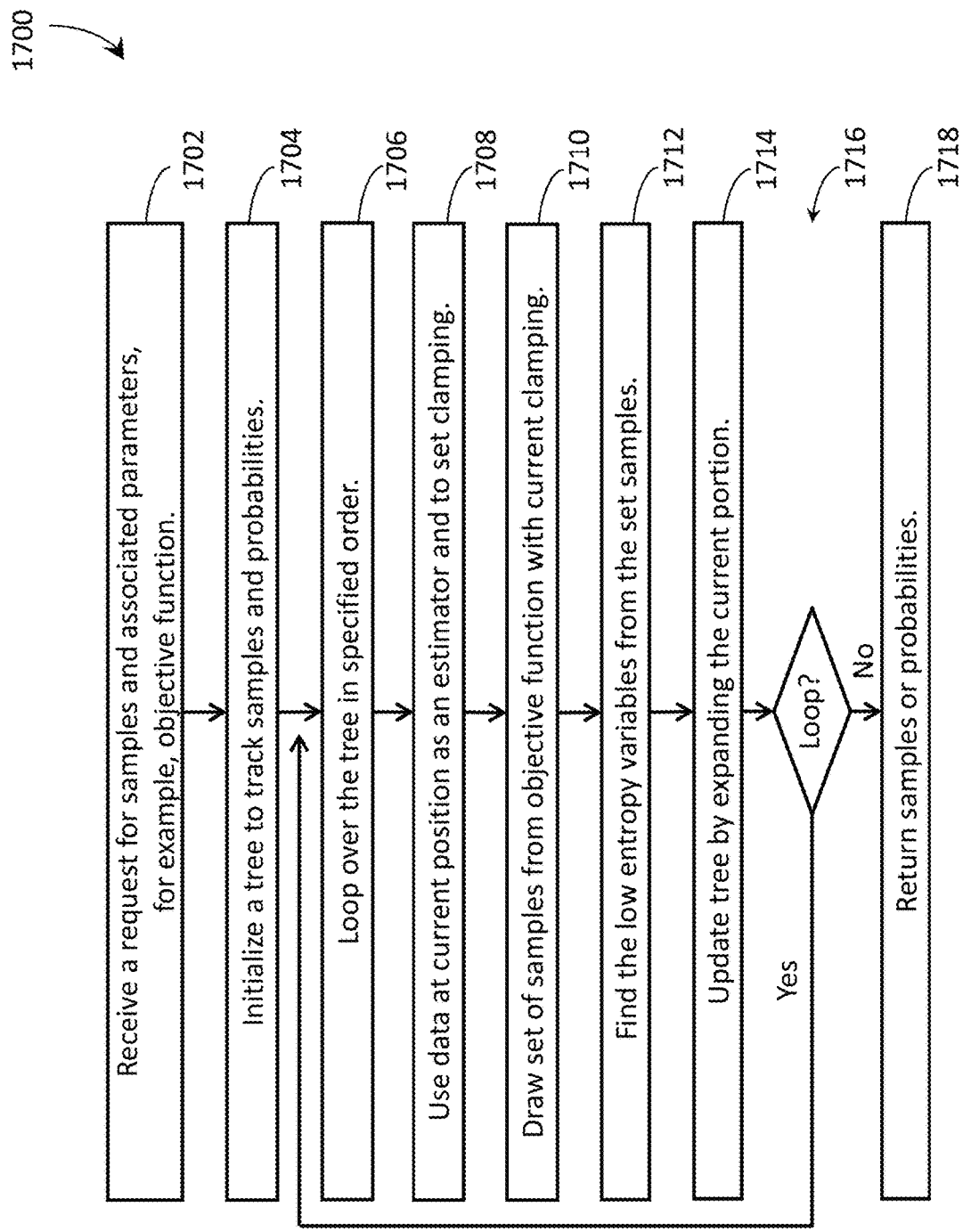
FIG. 17 is a flow-diagram showing a method to create information characterizing a plurality of samples for a set of variables in accordance with the presently described systems, devices, articles, and methods.
Figure 20:
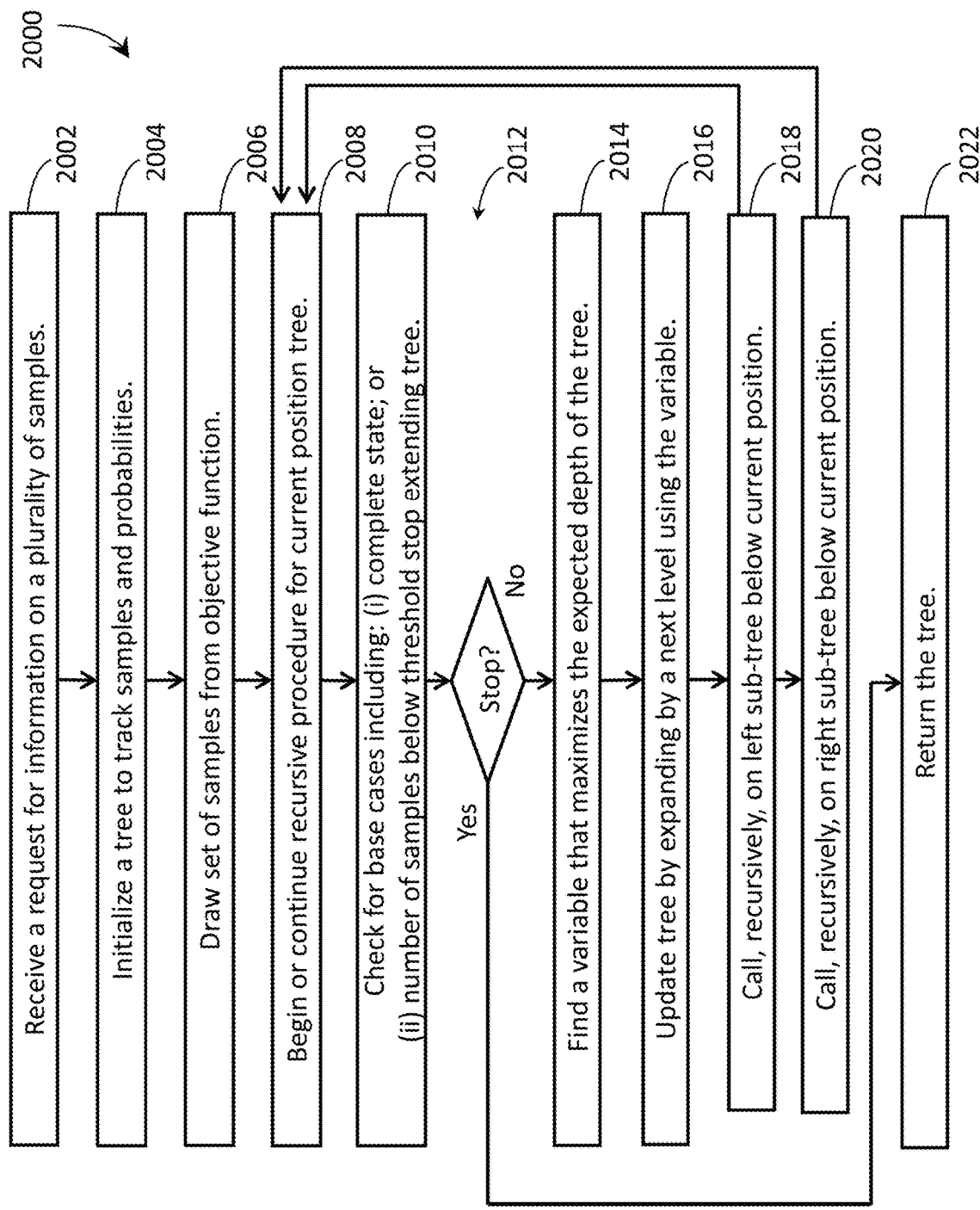
FIG. 20 is a flow-diagram showing a method to create information characterizing a plurality of samples for a set of variables in accordance with the presently described systems, devices, articles, and methods.
Figure 21:
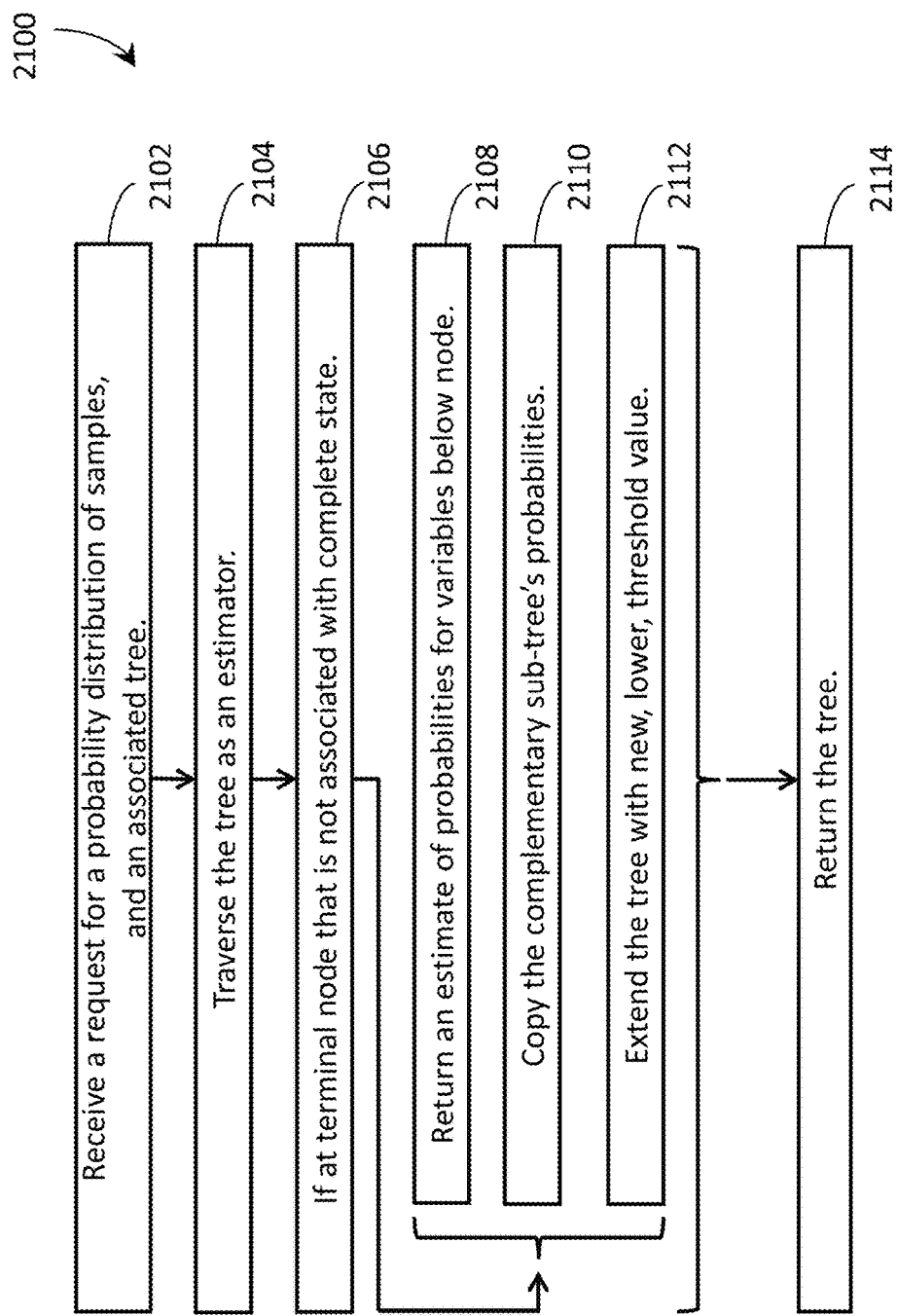
FIG. 21 is a flow-diagram showing a method to create a distribution for a set of samples in accordance with the presently described systems, devices, articles, and methods.

The present systems, devices, articles, and methods relate to sampling from an available probability distribution. FIG. 11 shows a technique for sampling. FIG. 12 shows a method of sampling using post-processing. Examples of a problem Hamiltonian and its respective energy landscape are shown in FIGS. 13 and 14 respectively. Examples of a problem Hamiltonian and a graph showing estimates of the number of ground states to the problem Hamiltonian are shown in FIGS. 15 and 16 respectively. FIG. 17 shows a method for creating information characterizing samples from a set of variables making use of a data structure such as the one shown in FIG. 18. FIGS. 20 and 21 show methods for creating information characterizing samples for a set of variables making use of a data structure such as the one shown in FIG. 19.

Figure 22:
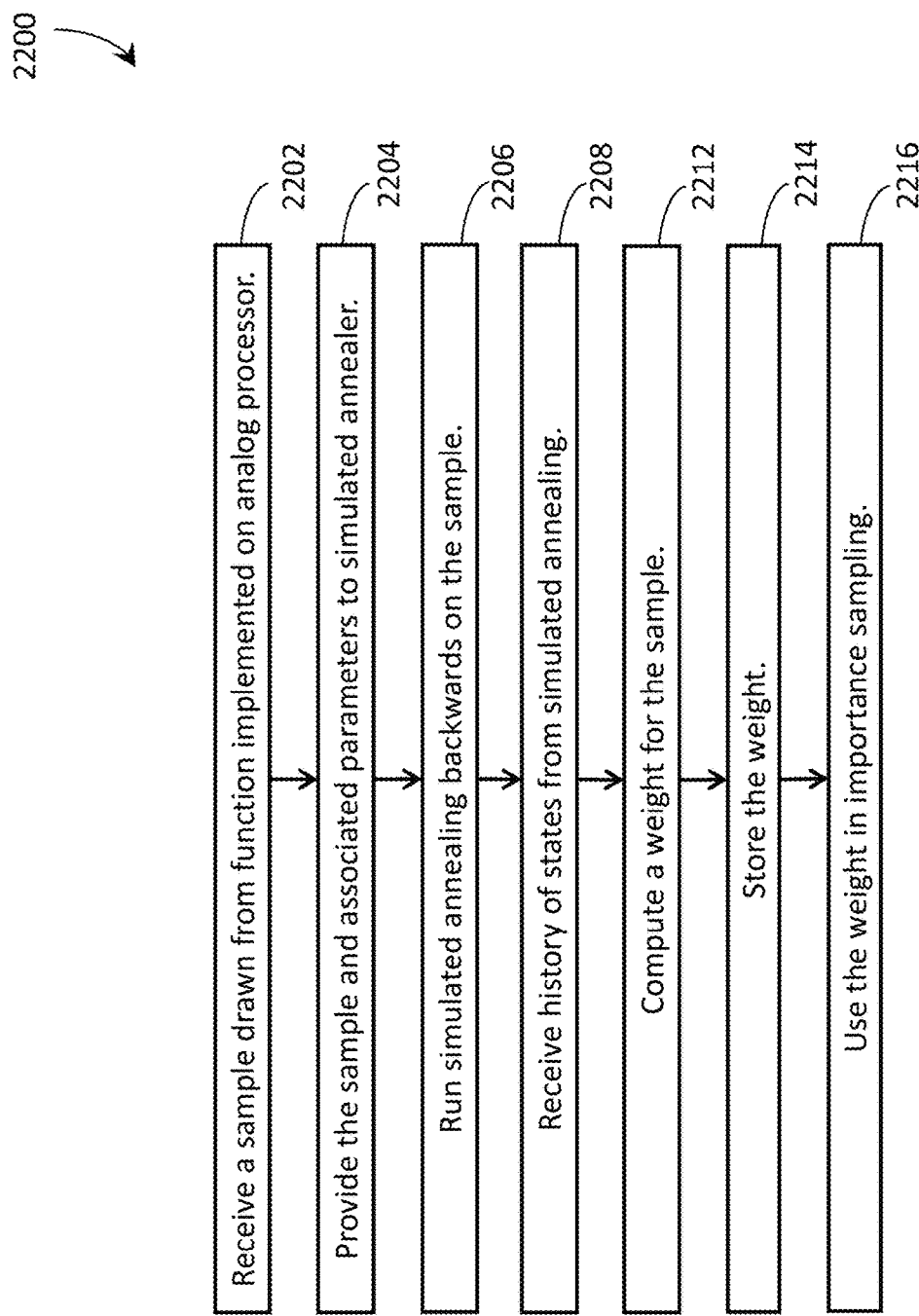
FIG. 22 is a flow-diagram showing a method to forma weight for a sample drawn from an analog processor in accordance with the presently described systems, devices, articles, and methods.
Figure 23:
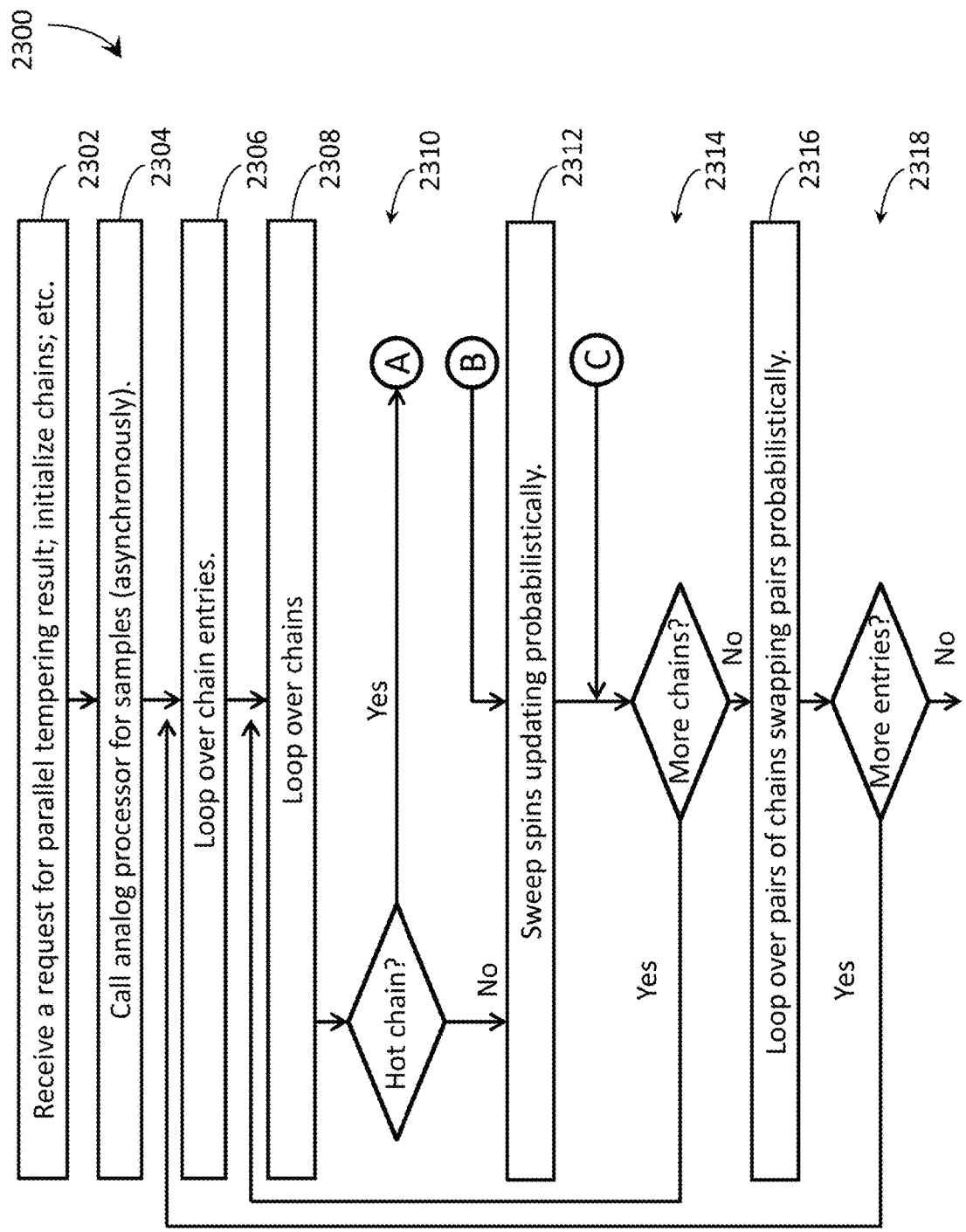
FIG. 23 is a flow-diagram showing a method to create a sample from a set of variables using an analog processor and parallel tempering, in accordance with the presently described systems, devices, articles, and methods.

The present systems, devices, articles, and methods relate to sampling from an available probability distribution and making use of the samples. FIG. 22 is a flow-diagram showing a method for forming a weight, such as, an importance weight, for a sample drawn from an analog processor. FIG. 23 is a flow-diagram showing a method for creating a sample from a set of variables using an analog processor and a parallel tempering method. An example, of a part of this method is shown in detail in FIG. 24. FIG. 25 is a flow-diagram showing a method for building a Markov chain seeded by one or more samples.

Figure 26:
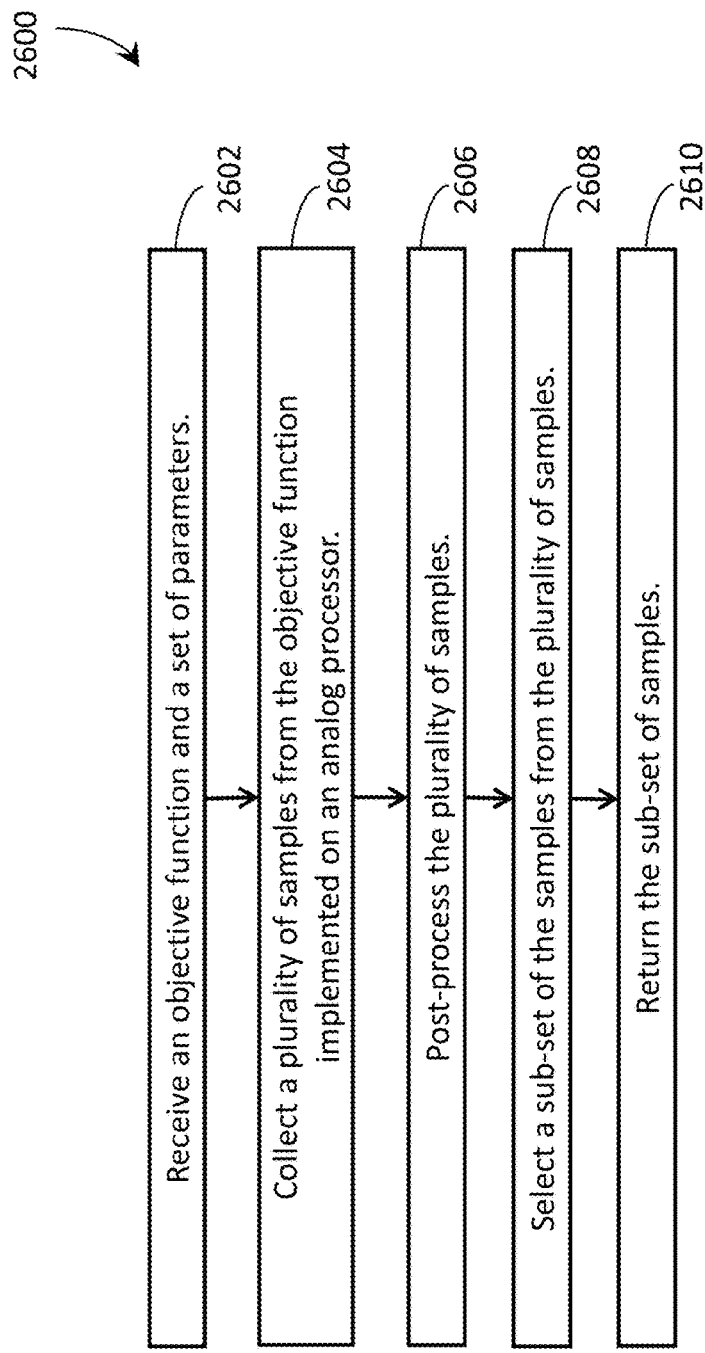
FIG. 26 is a flow-diagram showing a method to collect a plurality of samples drawn from an analog processor and sub-selecting a sub-set of the same, in accordance with the presently described systems, devices, articles, and methods.
Figure 27:
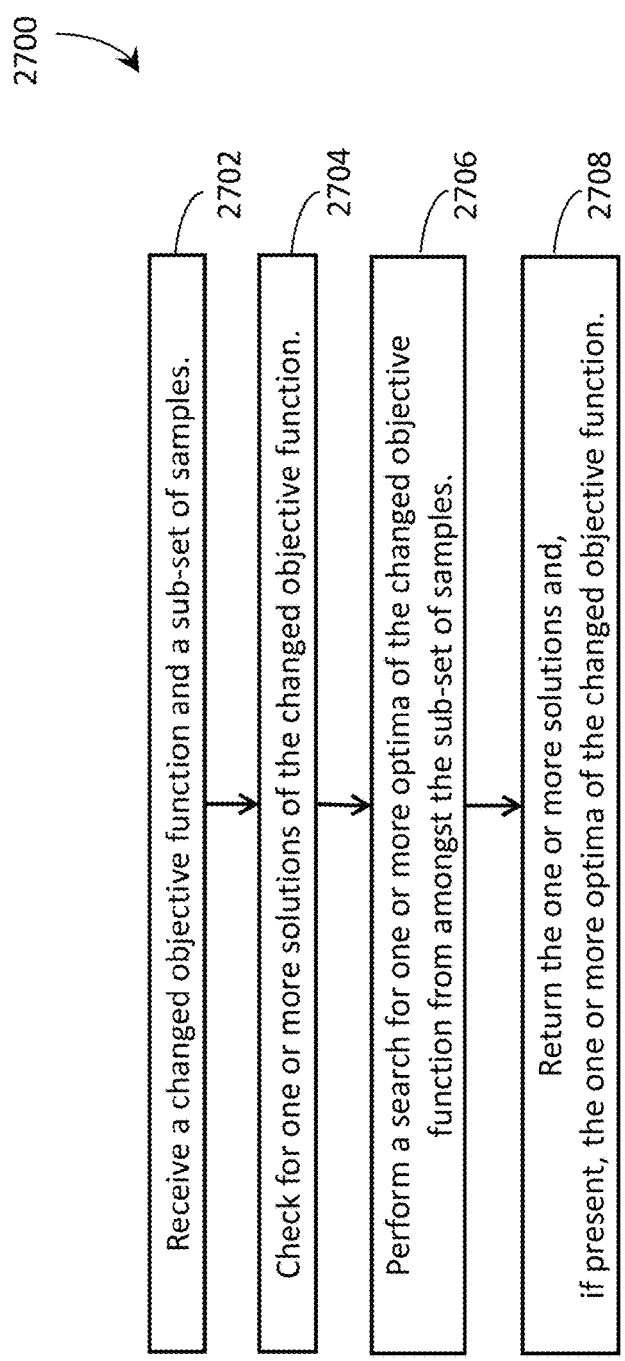
FIG. 27 is a flow-diagram showing a method that uses sub-set of samples of plurality of samples drawn from an analog processor in accordance with the presently described systems, devices, articles, and methods.

FIG. 26 illustrates a method for collecting a plurality of samples drawn from an analog processor and sub-selecting a sub-set of the same. FIG. 27 is a flow-diagram showing a method for using the sub-set of samples of plurality of samples drawn from the analog processor. An example application of using the sub-set is disclosed.

Figure 1:
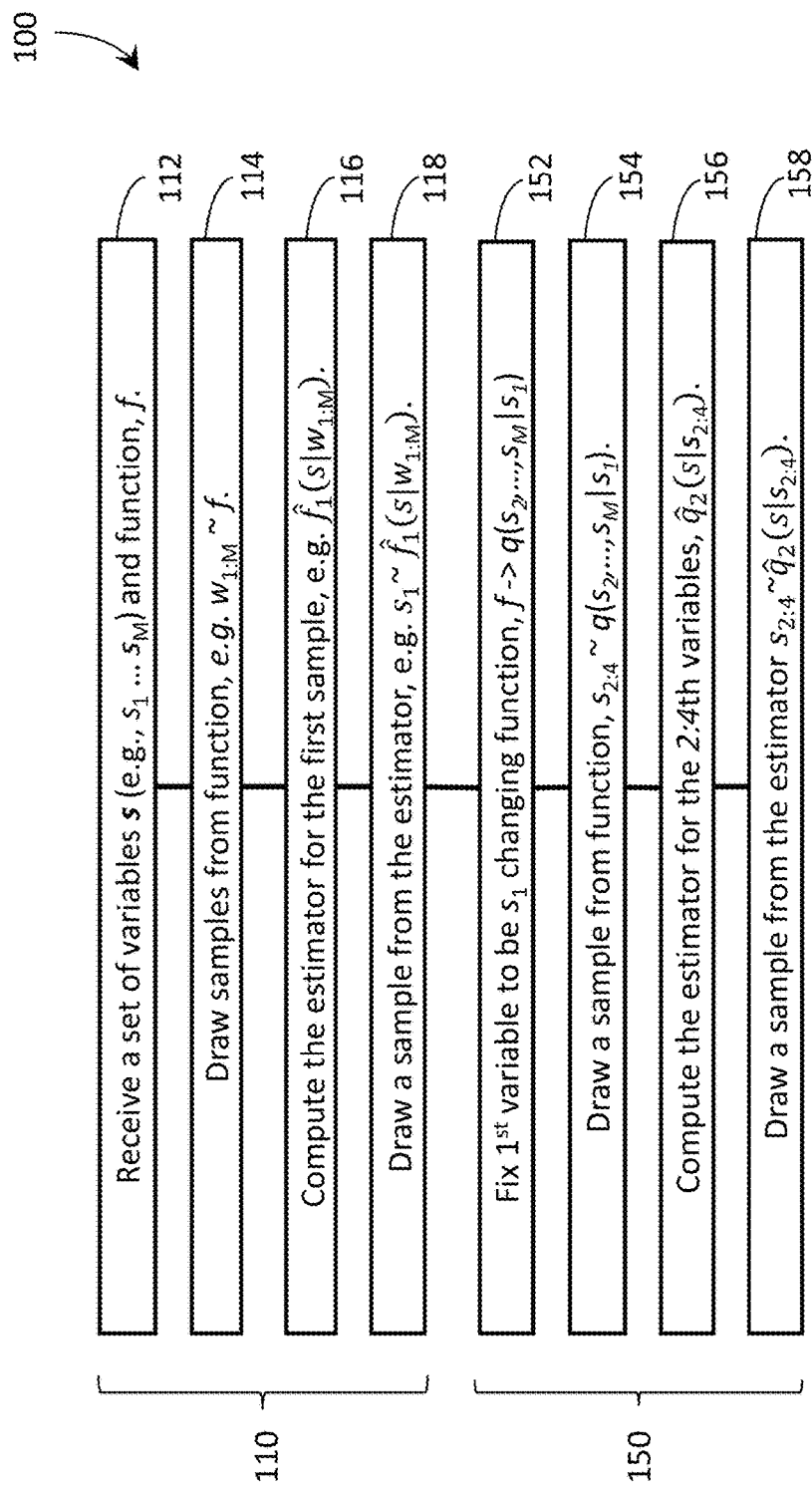
FIG. 1 is a flow-diagram showing a method of creating a sample from a set of variables in accordance with the presently described systems, devices, articles, and methods.

FIG. 1 is a flow-diagram showing a method 100 for creating a sample for a set of variables from a function for the purpose of illustrating various aspects of the embodiments. For the method 100, as with others methods taught herein, the various acts may be performed in a different order than that illustrated and described. Additionally, the methods can omit some acts, and/or employ additional acts. One or more of these acts may be performed by or via one or more circuits, for instance one or more processors (e.g., digital processors such as microprocessors, analog processor such as quantum processors, a hybrid computer including a digital process and an analog processor). A sampling device, such as, a device including a hybrid computer, may perform one or more of the acts in method 100. The method 100 includes drawing samples of a first variable at block 110 and drawing samples over all remaining variables at block 150.

At 112, a sampling device receives a set of variables s (e.g., $s_1 \ldots s_M$) and a function $f$. In some embodiments the variables represent spins (that is, $s_i$ in $\{-1, +1\}$). In some embodiments, the variables are stored or processed in a digital computer. In some embodiments, the variables are stored or processed in an analog computer. The function, $f$, may be a function over a set of inputs including the set of M variables. An example of the function, $f$, is a function corresponding to a problem defined in an Ising spin glass. That is, the output of the function $f$ corresponds to an energy value. The input of the function is a spin configuration. Additional parameters can be included in the input to the function, such as, bias terms, coupling strengths, annealing time, and the like. Variation of some parameters may lead to a low energy state of an Ising spin glass associated with an instance of the function, $f$. Further, the problem can optionally be partition into sub-problems and/or parts of the problem can be fixed. The sub-problem or the problem with fixed variables is denoted function, q. Throughout, the function $f$ and the function q may be interchanged.

At 114, the sampling device draws a sample from the function. That is, a configuration of the variables, w, is received from the function $f$. The vector w is the same length as s and labeled w to avoid overloading the variable name in FIG. 1.

At 116, the sampling device computes an estimator, $\hat{f}_1$. The estimator will be used to create information about the distribution associated with the function $f$. In one example, an estimator may count up the different values of a variable over the samples collected. This count can be normalized by the number of samples. In essence, the information in this estimator is a histogram. At 118, the sampling device draws a sample from the estimator. That is, a distribution of the first variable is made according to the information in the estimator. Then, the sampling device draws a sample from the distribution.

An example of fixing a variable is shown in method 100 at 152. A first variable $s_1$ is to be fixed. This changes the function, $f$ to $q(s_2, \ldots, s_M|s_1)$. At 154, the sampling device draws a sample, including multiple variables, from the function. For example, the sampling device draws a sample for a plurality of unfixed variable from 2 to k less than M e.g., $s_{2:4} \sim q(s_2, \ldots, s_M|s_1)$. Next at 156, the sampling device computes an estimator. This estimator is the second one in the method 100, but is for the block of variables (e.g., three variables, namely $s_2$, $s_3$, and $s_4$ variables, $\hat{q}_2(s|s_{2:4})$. At 158, the sampling devices draws a sample from the estimator $s_{2:4} \sim \hat{q}_2(s|s_{2:4})$.

Figure 2:
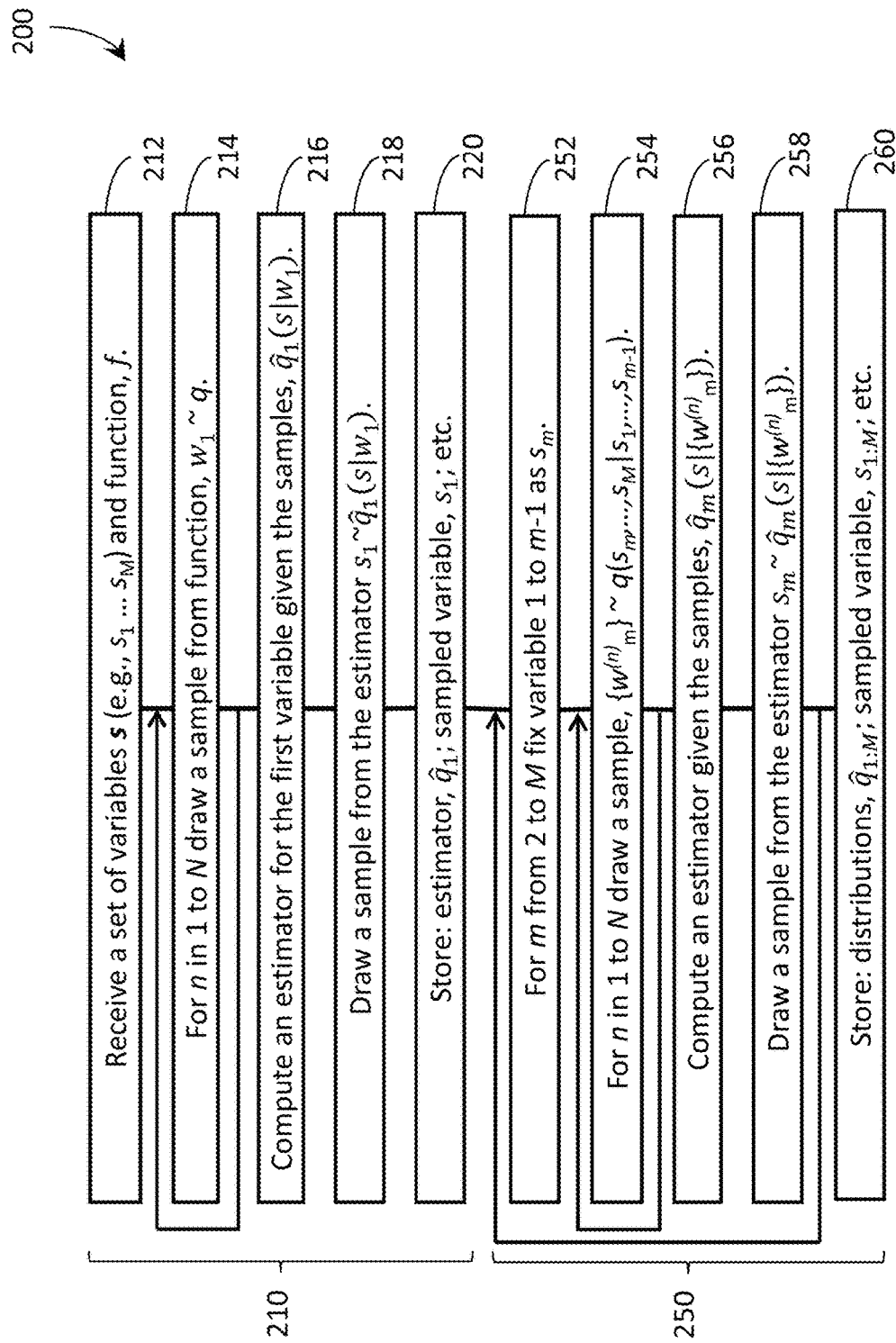
FIG. 2 is a flow-diagram showing a method of creating a sample from a set of variables in accordance with the presently described systems, devices, articles, and methods.

FIG. 2 is a flow-diagram showing a 200 method for creating a sample from a set of variables and an associate function. Given a function a sample will be drawn from the function. The sample is used to compute a representative value of a variable and a probability distribution. The method 200 includes drawing samples of a first variable at block 210 and drawing samples over all remaining variables at block 250. One or more of the acts in method 200 may be performed by or via one or more circuits, for instance one or more hardware processors. In some examples, a sampling device, including a hybrid computer, performs one or more acts in method 200.

At 212, a sampling device, including a computer or processor, receives information specifying a set of M variables. In some embodiments the variables represent spins (that is, $s_1$ in $\{-1, +1\}$).

The sampling device also receives a function, $f$, over a set of inputs including the set of M variables. An example of the function, $f$, is a function corresponding to a problem defined in an Ising spin glass. That is, the function $f$'s output corresponds to an energy value. In some examples, additional parameters are included in the input to the function, such as, bias terms, coupling strengths, annealing time, and the like. Variation of some parameters may lead to a low energy state of an Ising spin glass associated with an instance of the function, $f$.

In some embodiments the input to the function, $f$, is the set of M variables representing spins, and the parameters need to define the problem. These include a set of local qubit biases and inter qubit couplings (denoted as $h_i$ and $J_{ij}$). The input and output of the function can be represented as $S_i = f(h_i, J_{ij}, \ldots)$ for all i in $\{1, 2, \ldots M\}$ and $j > i$. Additional parameters such as an annealing schedule can optionally be provided. The function $f$ will be associated with a probability distribution.

At 214, the sampling device draws a set of samples from the function. That is, for samples 1 through N index by i superscript get the output of function $f$. This may be denoted as $w_1^{(i)} \sim f(s_1, \ldots, s_M)$, where $\sim$ means sample from, the superscript denotes the sample number, and the subscript denotes the qubit number. When the sample is being drawn from a quantum processor configured as a quantum annealer, the drawing of samples involves running the problem defined on the Ising spin glass per an annealing schedule, and reading out a result. See, FIG. 11 and the related discussion for an example of the process. In some embodiments, in block 110 the read-out is of the first variable only.

At 216, the sampling device computes an estimator. The estimator will be used to create information on the distribution associated with the function $f$. One example of an estimator is to count up the different values of a variable over the samples collected. This can be normalized by the number of samples. In essence, the information in this estimator is a histogram. An example of an estimator is:

$$\hat{q}_{1m}(s_m) \equiv \frac{1}{N} \sum_{i=1}^{N} \delta_{s_m}(t_m^{(i)}) \tag{7}$$

where $\delta_i$ is a delta function that is zero at all locations but index i where it is one. Here the index is over the spin states. The value of the estimator for the opposite spin value can be computed $\hat{q}_m(-1) = 1 - \hat{q}_m(+1)$ because in a binary system the probabilities sum to one.

At 218, the sampling device draws a sample from the estimator. A distribution of the first variable is made according to the information in the estimator. Then, the sampling device draws a sample from the distribution, $s_1 \sim \hat{q}_1(s)$. An example of performing this is generating a random number between 0 and 1. If the random number is less than $\hat{q}_1(+1)$ assign $s_1$ to +1, else assign to −1. Techniques for using a random number generator to sample from a discrete set of three or more outcomes are described herein with reference to FIG. 11 and supporting description.

At 220, the sampling device saves the estimator and associated information. Also saved is the sample, $s_1$. Processing continues in block 250.

In block 250, there are two loops. Examples of loops include "for loops", "do while loops", "do until loops" and the like. There is an outer loop over the variables from variable 2 to variable M. There is an inner loop to draw samples from a clamped version of function, $f$. The clamped version of the function, $f$, has one or more fixed variables as input.

The outer loop begins at 252. For variables 2 to M as indexed by m, variables are fixed in states determined in previous iterations. The initial fixed value for 252 is determined in block 110. In repeating returns to 252, the index m is incremented by one.

At 254, the sampling device begins an inner loop. A series of samples are drawn each from function, $f$, but with one or more variables fixed. This fixing of variables herein is called clamping. The ith sample of the mth variable drawn from a function with clamping is denoted by $s_m^{(i)} = f(s_1, \ldots, s_{m-1}, S_m, \ldots, S_M)$ where s denotes a fixed variable and S denotes an unfixed variable.

In an analog computer the fixing of a variable involves tuning the computer to enforce a value on the variable. For example, with a quantum computer the fixing of a variable involves applying a signal associated with the diagonal single qubit term of sufficient strength to fix the qubit's state. That is the qubit associated with a variable to be fixed is locally biased to the fixed state. In a quantum processor including rf SQUID qubit, the fixing of a variable involves applying a strong magnetic field to the qubit. For example, the magnetic field can be associated with single qubit bias.

In some examples, the non-fixed values are read out and stored. In some embodiments if the fixed value is not in the fixed state an exception is recorded. Exceptions can be used to repeat the sampling.

At 256, the sampling device computes an estimator. The estimator will be used to create information on the distribution associated with the function $f$, with clamping.

At 258, the sampling device draws a sample from the estimator. That is a simulation is made of the distribution of the first variable according to the information in the estimator. Then a sample is made, $s_m \sim \hat{q}_m(s)$. Unless the index has reached its end, the last variable, processing continues in block 252.

If the "for loop" is complete, at 260, the sampling device saves the estimator and associated information. Also saved are the samples, $s_{1:M}$.

The description of the method found in FIG. 2 may be refactored into a single outer and inner loop. The drawing of an initial sample in block 110 is thus one more iteration through the outer loop in block 250 with some additional acts, operations, or branching logic.

Figure 3:
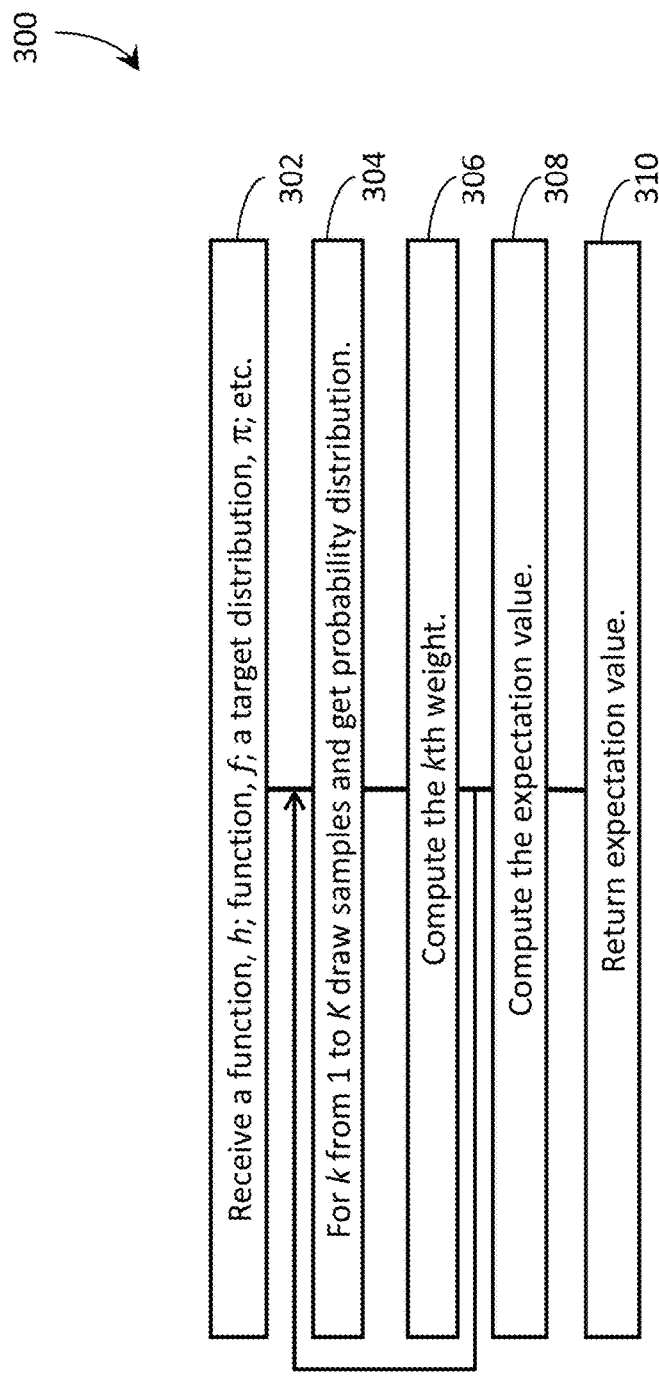
FIG. 3 is a flow-diagram showing a method of making use of a sample to do Importance Sampling in accordance with the presently described systems, devices, articles, and methods.

FIG. 3 is a flow-diagram showing a method 300 for making use of a set of samples to do Importance Sampling. One or more of the acts in method 300 may be performed by or via one or more circuits, for instance one or more hardware processors. In some examples a sampling device including a hybrid computer performs one or more acts in method 300.

At 302, the sampling device receives a function, h; a function, $f$, associated with an associated proposal distribution, a target distribution, $\pi$; and the like. The sampling device starts a loop at 304. For the variable k from 1 to K the sampling device draws a set of samples. In some embodiments, the samples are drawn according to method 200. The loop portion 304 yields values for the samples $\{y_m^{(k)}\}$ (or $y^{(k)}$) and a probability distribution $\hat{q}_m(y_m^{(k)})$. At 306, the sampling device creates the weights for the Importance Sampling. The weight may be expressed as:

$$w(y^{(k)}) = \frac{\pi(y^{(k)})}{\prod_{m=1}^{M} \hat{q}_m(y_m^{(k)})} \tag{8}$$

where the index mth refers to the mth version of the estimator and mth variable. In some embodiments there is one estimator for many variables. The sampling device makes a weight for each sample. At 308 the expectation value of the supplied function h is computed. Examples of the function h include average, variance, higher moments, custom functions, and the like.

$$E_\pi[h(y)] = \frac{1}{K} \sum_k w(y^{(k)}) h(y^{(k)}) \tag{9}$$

At 310 the sampling device returns the expectation value.

Some embodiments make use of conditional independence. An unknown proposal distribution, $f$, may be factorized into its univariate conditionals:

$$f(y|x) = f_1(y_1|x)f_2(y_2|x,y_1) \ldots f_m(y_m|x,y_{1:m-1}) \quad (10)$$

The factoring into conditionals can be used to break a sampling problem into sub-problems. Accounting for conditionals in hardware involves considering the effect of the fixed portions of a configuration on a non-fixed portion. For example, if variables $y_1$ and $y_{100}$ are uncoupled nothing is to be done. If variable $y_1$ and $y_2$ are coupled, then if $y_1$ is fixed the effect on $y_2$ is to account for this by adjusting the local bias on $y_2$.

Figure 4:
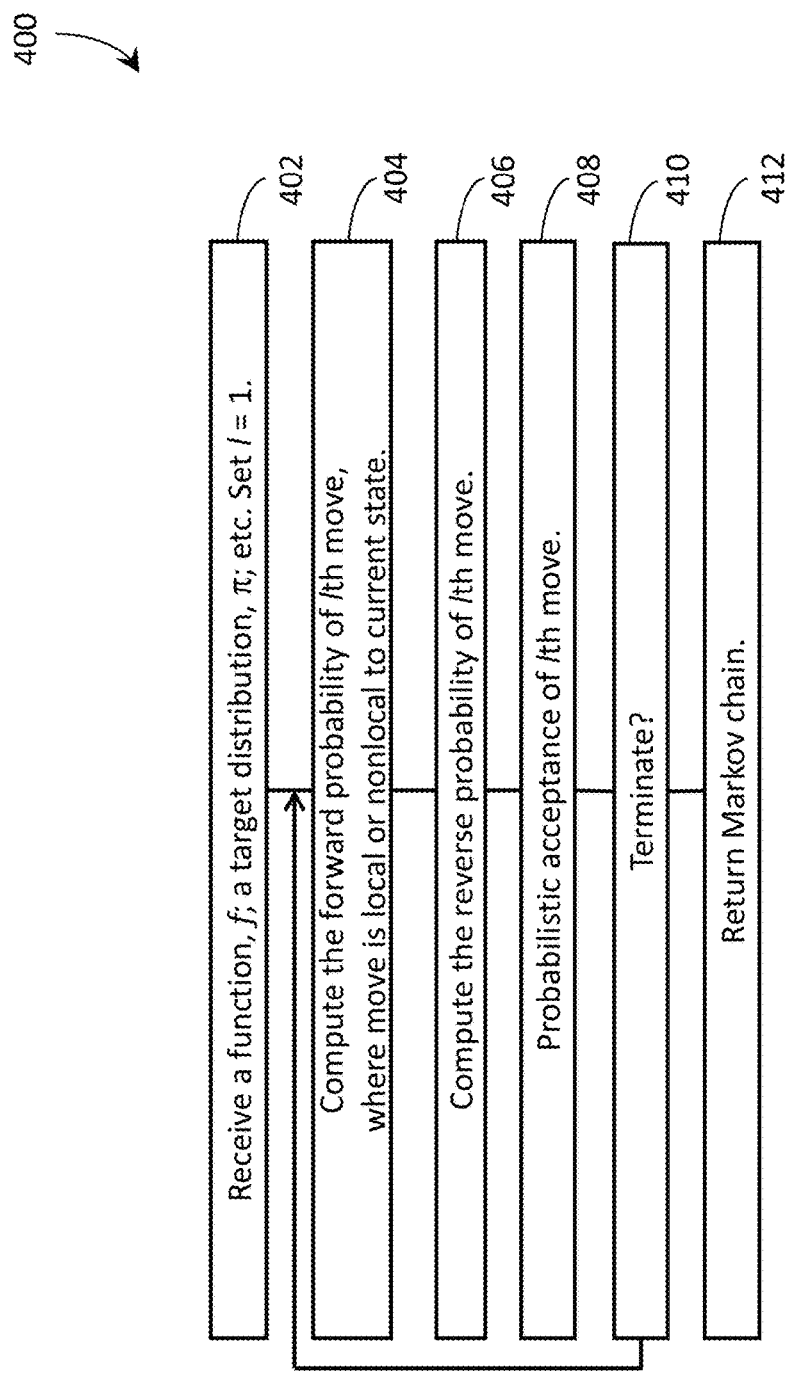
FIG. 4 is a flow-diagram showing a method of making use of a sample to implement Markov chain Monte Carlo techniques in accordance with the presently described systems, devices, articles, and methods.

FIG. 4 is a flow-diagram showing a method 400 for making use of samples to implement Markov chain Monte Carlo techniques. One or more of the acts in method 400 may be performed by or via one or more circuits, for instance one or more hardware processors. In some examples a chain generator including a hybrid computer performs one or more acts in method 400.

A chain generator follows the method 400 to propose a new configuration as a new point in the chain. The chain generator tests the new point and accepts the new point per Markov chain Monte Carlo techniques. Using a quantum annealing to provide samples allows proposals from disparate states including low energy states.

At 402, a Markov chain generator receives a distribution, $\pi$, a function $f$, a set of variables, and the like. A counter is set to one, e.g., $l=1$. At 404, given a current point x, a new point, y, in the Markov Chain is proposed according to a Markovian proposal process using samples draft from the function $f$. In normal Markov chain construction certain technical requirements must be met. These have the unfortunate consequence that the proposal is for local states to the current state. That is, the proposals may differ by a bit flip, a few bit flips, and the like. Using a quantum annealer with and without fixed variables allows for proposals to be drawn from many disparate configurations that are local or non-local. In addition, states with low energy can be proposed.

At 406, the Markov chain generator calculates the probability of the reverse transition from the proposal to the current state. Again the current state is a configuration of variables. The proposal is a new state that is a configuration as suggested by a sampling process like in methods 200. At 406, the chain generator checks to ensure that the transition from the current state to the new state is reversible (also called making sure the chain has detailed balance). That is, the product of transition rates over any closed loop of states in the chain must be the same in either direction.

To calculate the reverse probability the chain generator takes the proposed state and fixes the variables in the function $f$ accordingly. A sample is made and an estimator generated according to method 200.

At 408, the chain generator accepts the proposal y and adds the proposal to the chain with a probability $\alpha$. The value of the probability $\alpha$ is the minimum of 1 and value:

$$\frac{\pi(y) \prod_{m=1}^{M} \hat{q}_m(x_m)}{\pi(x) \prod_{m=1}^{M} \hat{q}_m(y_m)} \quad (11)$$

Again x is the current point in the chain, the target distribution is $\pi$, and $\hat{q}_m$ are the estimators. The set of estimators $\hat{q}_m(y_m)$ are associated the forward probability of the proposal and set of estimators $\hat{q}_m(x_m)$ is created in evaluating the reverse probability. At 410, the chain generator tests for termination of the instant loop. The chain generator returns the results, including the chain, at 412.

Figure 5:
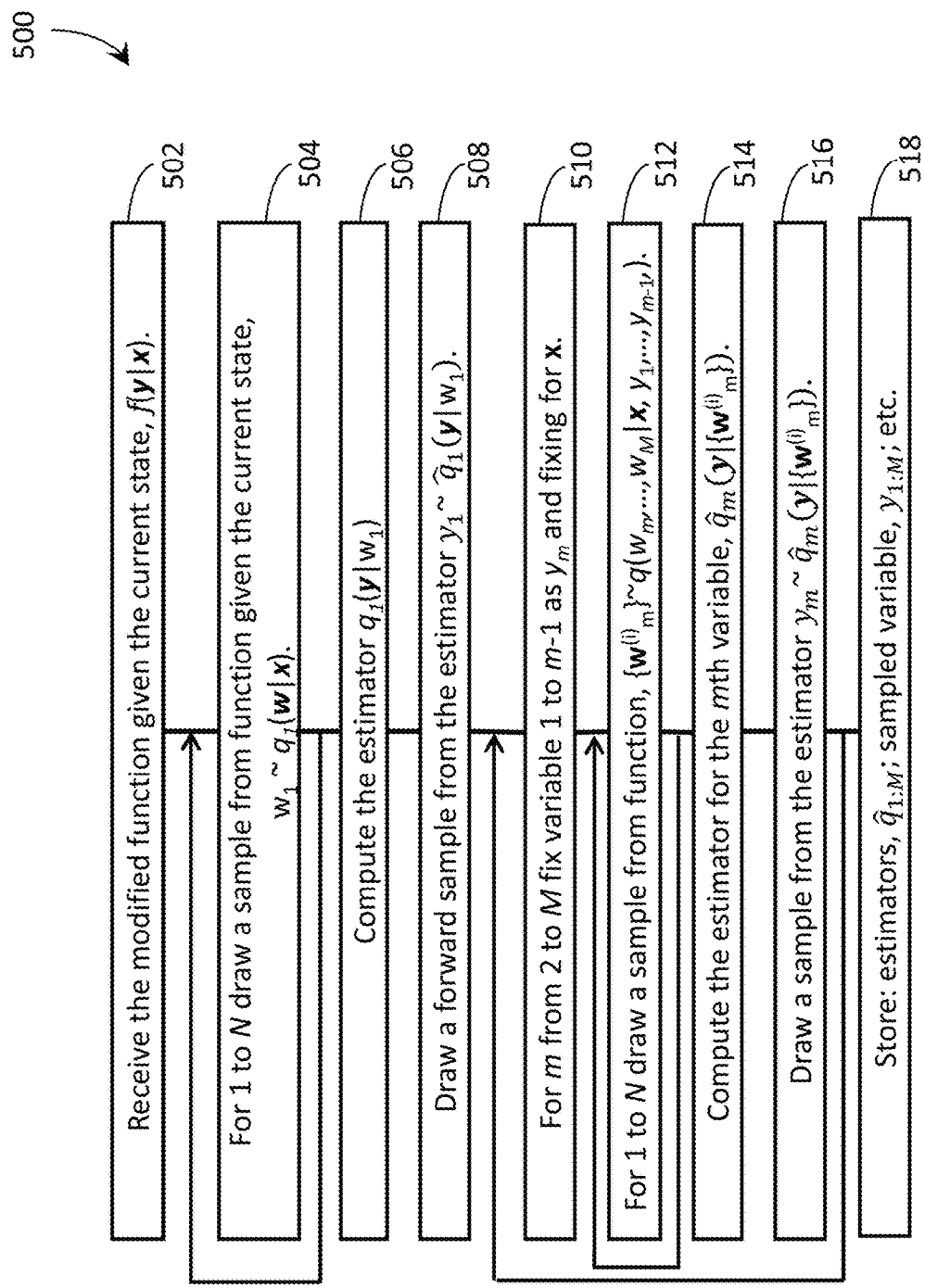
FIG. 5 is a flow-diagram showing a method of making a proposal for a Markov chain in accordance with the presently described systems, devices, articles, and methods.

FIG. 5 is a flow-diagram showing a method for making a proposal for a Markov chain. One or more of the acts in method 500 may be performed by or via one or more circuits, for instance one or more hardware processors. In some examples, a chain generator including a hybrid computer performs one or more acts in method 500.

At 502, the chain generator receives the modified function given the current state, $f(y|x)$. At 504, the chain generator samples the function $f$, now modified to reflect the current state x and called q. The chain generator is samples the function q, N times for the first variable in a process like in act 210. That is, $\{w^{(n)}_1\} \sim q_1(w|x)$, where w is the sample variables. The chain generator receives draws N samples in a "for loop" or similar iterative structure. At 506, the chain generator constructs an estimator for the first variable, $\hat{q}_1(y|\{w_1^{(n)}\})$, for example using techniques from method 100. At 508, the chain generator draws a forward sample for the first variable from the first estimator, $y_1 \sim \hat{q}_1(y|\{w_1^{(n)}\})$.

At 510, the chain generator enters an outer "for loop" in index m from 2 to M (the number of variables). An inner loop starts at 512. The chain generator samples the function q, N times with the first to m−1 variables fixed, like in process 250 (FIG. 2). That is, $\{w^{(n)}_m\} \sim q_m(w_m \ldots w_M|x, y_1 \ldots y_{m-1})$, where $w_m \ldots w_M$ are the sampled variables, x the current state and can include biases on qubits. The N samples are drawn in a "for loop" or similar iterative structure. At 514, the chain generator constructs an estimator for the first variable, $\hat{q}_1(y|\{w_1^{(n)}\})$. For example, the chain generator uses a technique from method 100. At 516, the chain generator draws a forward sample for the present variable from the current estimator $y_m \sim \hat{q}_m(y|\{w_m^{(i)}\})$. At 518, the chain generator stores the sampled variables and created estimators.

Figure 6:
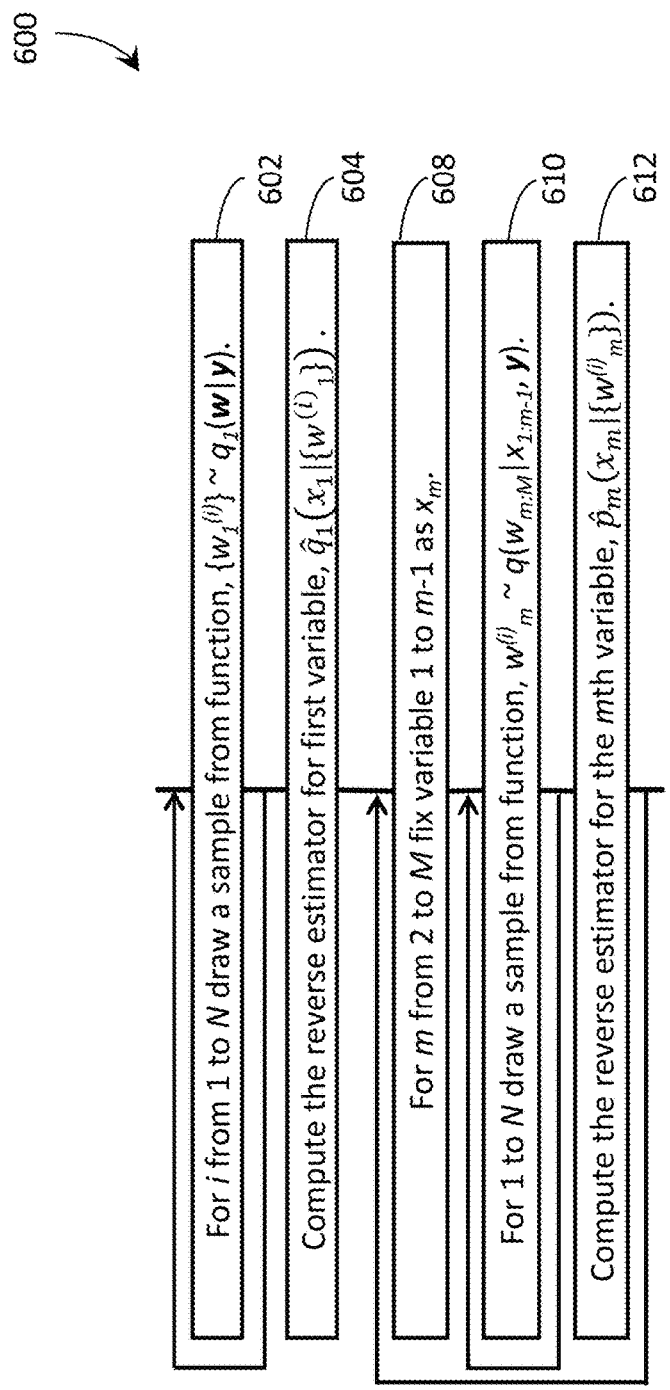
FIG. 6 is a flow-diagram showing a method of computing a reverse probability in accordance with the presently described systems, devices, articles, and methods.

FIG. 6 is a flow-diagram showing a method 600 of computing a reverse probability for creating a Markov chain. In process 600 the computation of the reverse probability has a similar form to method 500, but without sampling from the estimators. One or more of the acts in method 600 may be performed by or via one or more circuits, for instance one or more hardware processors. In some examples a chain generator including a hybrid computer performs one or more acts in method 600.

At 602, a loop begins or continues with iteration i from 1 to N. In the loop the sample generator draws a sample from a function, $\{w_1^{(i)}\} \sim q_1(w|y)$. That is, create a sample of size N from the function given the proposal y. At 604, the Markov chain generator computes the reverse estimator for a first variable in the set of variable, $\hat{q}_1(x_1|\{w^{(i)}1\})$. At 608, an outer iterative loop begin over m from 2 to M fix variables 1 to m−1 as $x_m$ and given the proposal y. That is, fix the variables with values from the current state. Within the outer loop is an inner loop. At 610, in the inner loop the generator draws N samples from the function, $w^{(i)}_m \sim q(w_{m:M}|x_{1:m-1}, y)$. At 612, within the outer loop the samples are used to compute the reverse estimator for the mth variable, $\hat{q}_m(x_m|\{w_m^{(i)}\})$.

Figure 7:
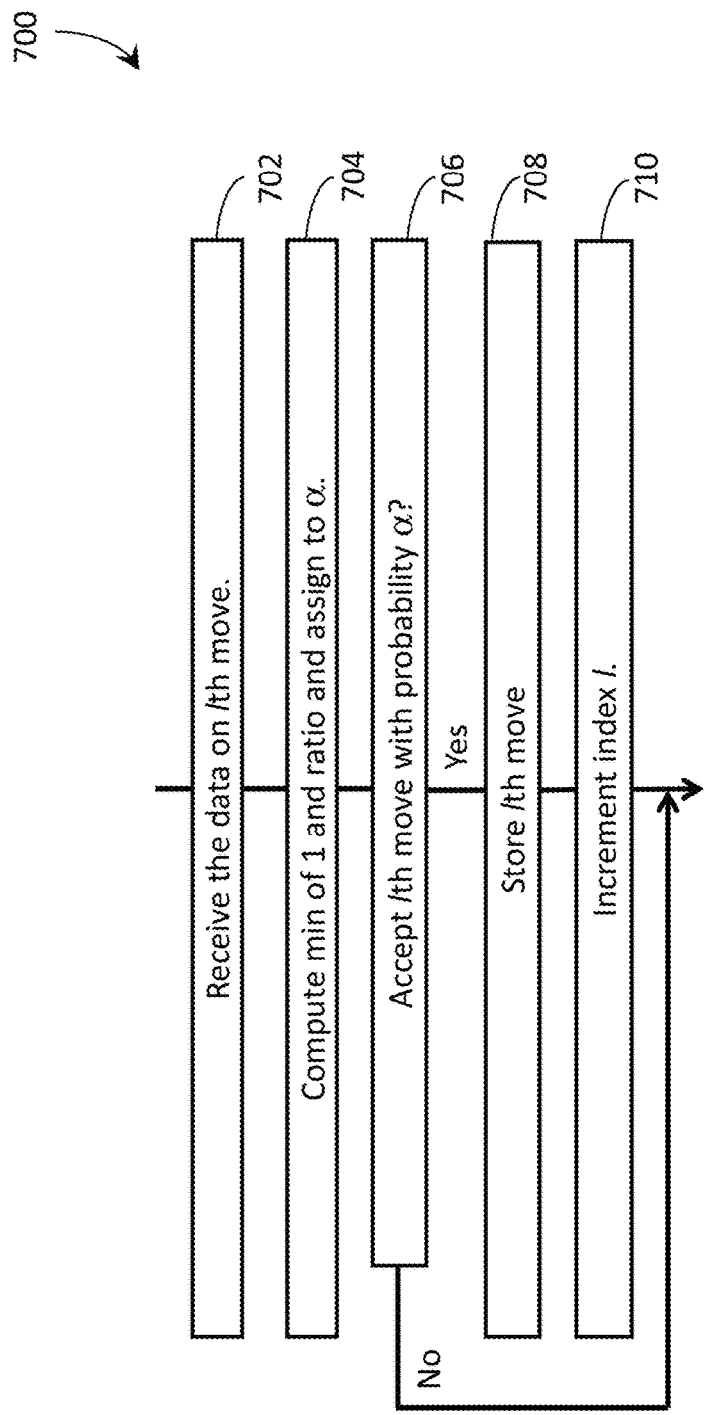
FIG. 7 is a flow-diagram showing a method of accepting or rejecting a proposal for a Markov chain in accordance with the presently described systems, devices, articles, and methods.

FIG. 7 is a flow-diagram showing a method 700 for accepting or rejecting a proposal for a Markov chain. The Markov chain generator receives the data on the l-th move. That is the current state, x, the proposed state, y, and associated probabilities, estimators, and the like. At 710, the minimum of 1 and Equation (11) is computed and assigned to probability $\alpha$. At 706, the lth move is accepted with the probability α. If the move is accepted, at 708, the Markov chain is updated and, at 710, the index is incremented. If the move is not accepted, control returns to 404 in method 400 (FIG. 4).

FIG. 8 is a diagram showing a technique 800 for performing the above techniques on blocks of variables. In particular, there are a series of samplings and estimators computed. Each sampling can be for a variable, for instance as described in method 200, or for a block of variables. As such, the index m can refer to the mth estimator or the estimator for the mth variable depending on the context.

FIG. 9 is a block-diagram showing a process 900 for performing the above techniques on blocks of variables in a multiway recursion. Shown is an example of how to exploiting conditional independence to accelerate sampling on a grid of qubits or groups of qubits.

In particular, FIG. 9 illustrates the process 900 as being applied to four instances of a seven by seven grid of groups of qubits with inter-group couplings. Initially the grid 902, includes samples that are sequentially drawn from the vertical shaded column called $A_{11}$. The two sets of variables separated by the column are labeled $R_{12}$, and $R_{22}$. Once the variables in $A_{11}$ are sampled, the variables in $R_{12}$ and $R_{22}$ are independent dividing the grid into two independent sets as shown by transition 906. In 910, sampling within the sets $R_{12}$, and $R_{22}$ continues. By sampling simultaneously along the horizontal bisectors, $A_{12}$, and $A_{22}$, a grid is transformed (914) to a grid 918 partitioned 4 ways. The bisection continues with sets $R_{13}$, $R_{23}$, $R_{33}$, and $R_{43}$ divided (e.g., by bisector 920) along transition 922 to create grid 926. The sets within grid 926 can be further bisected and bisector 928 is an example. In process 900, the number of calls to the sampling process is advantageously reduced from order $L^2$ to order $L \log_2 L$, where L is the length of the grid.

FIG. 10 illustrates computing system 1000 including a digital computer 1005 coupled to a quantum computer 1050 in accordance with the present systems, methods and devices. Shown is an exemplary digital computer 105 including a digital processor that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. Digital computer 105 will at times be referred to in the singular herein, but this is not intended to limit the application to a single digital computer. The present systems and methods can also be practiced in distributed computing environments, where tasks or modules are performed by remote processing devices, which are linked through a communications network. In a distributed computing environment, program modules may be located in both local and remote memory storage devices.

Digital computer 1005 may include at least one processing unit (such as, central processor unit 1010), at least one system memory 1020, and at least one system bus 1017 that couples various system components, including system memory 1020 to central processor unit 1010.

The digital processor may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 1 are of conventional design. As a result, such blocks need not be described in further detail herein, as they will be understood by those skilled in the relevant art.

System bus 1017 can employ any known bus structures or architectures, including a memory bus with a memory controller, a peripheral bus, and a local bus. System memory 1020 may include non-volatile memory such as read-only memory ("ROM") and volatile memory such as random access memory ("RAM") (not shown). An basic input/output system ("BIOS") 1021, which can form part of the ROM, contains basic routines that help transfer information between elements within digital computer 1005, such as during startup.

Digital computer 1005 may also include other non-volatile memory 1015. Non-volatile memory 1015 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 1015 may communicate with digital processor via system bus 1017 and may include appropriate interfaces or controllers 1016 coupled to system bus 1017. Non-volatile memory 1015 may serve as long-term storage for computer-readable instructions, data structures, program modules and other data for digital computer 1005. Although digital computer 1005 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various sets of processor readable instruction, also called program modules or modules, and/or data can be stored in system memory 1020. For example, system memory 1020 may store an operating system 1023, and server modules 1027. In some embodiments, server module 1027 includes instruction for communicating with remote clients and scheduling use of resources including resources on the digital computer 1005 and quantum computer 1050. For example, a Web server application and/or Web client or browser application for permitting digital computer 1005 to exchange data with sources via the Internet, corporate Intranets, or other networks, as well as with other server applications executing on server computers.

In some embodiments system memory 1020 may store a calculation module 1031 to perform pre-processing, co-processing, and post-processing to quantum computer 1050. In some embodiments, calculation module 1031 is used to handle samples from a quantum computer per methods 200, 300, 400, 500, 600, 1100, and so forth. In accordance with the present systems and methods, system memory 1020 may store a set of quantum computer interface modules 1035 operable to interact with the quantum computer 1050. In some examples the computer interface modules 1035 includes sets of processor readable instructions for a programming subsystem, an evolution subsystem, and/or readout subsystem. While shown in FIG. 10 as being stored in system memory 1020, the modules shown and other data can also be stored elsewhere including in nonvolatile memory 1015.

The quantum computer 1050 is provided in an isolated environment (not shown) to shield the internal elements of the quantum computer from heat, magnetic field, and the like. The quantum computer includes a quantum processor 1040 including qubits. The qubits are read out via a control system 1060. These results are fed to the various modules in the digital computer 1005 including server modules 1027, calculation module 1031, or quantum computer interface modules 1035, stored in nonvolatile memory 1015, returned over a network or the like. The qubits are controlled via qubit control system 1065. The couplers are controlled via coupler control system 1070. In some embodiments of the qubit control system 1065 and the coupler control system 1070 are used to implement quantum annealing as described herein on quantum processor 1040.

In some embodiments the digital computer 1005 can operate in a networking environment using logical connections to at least one client computer system. In some embodiments the digital computer 1005 is coupled via logical connections to at least one database system. These logical connections may be formed using any means of digital communication, for example, through a network, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 101 may be connected to the LAN through an adapter or network interface card ("NIC") (communicatively linked to bus 1017). When used in a WAN networking environment, digital computer 1005 may include an interface and modem (not shown), or a device such as NIC, for establishing communications over the WAN. Non-networked communications may additionally, or alternatively be employed.

Sampling is a process for selecting data points from a probability distribution. Sampling is a computationally difficult task. This is particularly so for high-dimensional multi-modal probability distributions. Some useful approaches to sampling high-dimensional multi-modal distributions are variations of Metropolis-Hastings sampling in which a Markov chain is constructed whose equilibrium distribution is the desired target sampling distribution.

For Metropolis-Hastings samplers, and related samplers, the first samples are often not suitable for use. The initial samples, if within some distance of the start of the chain that is comparable to the autocorrelation length of the chain, correlate with the initial chain value. This initial chain value may not even be random. Thus, these are not random samples from within a distribution of interest. So, a sampling device building needs to equilibrate, or burn-in, the chain before serving up useful samples from the chain. In some examples, the burn-in length is several times the autocorrelation length.

In some examples, a sampling device including an analog processor, such as shown in FIG. 10, exploits the inherent randomness in a physical system, and the associate act of measurement, as a source of randomness. Such a system provides samples from even highly multi-modal distributions. In some examples, the sampling rate is quicker than possible from a digital computer. In some examples, thermal effects contribute to randomness. In some examples, quantum effects contribute to randomness. In some examples, both quantum effects and thermal effects contribute to randomness.

Temperature offers a source of randomness. In ideal non-quantum physical systems, samples are governed by a statistical distribution such as the Boltzmann distribution where; the probability varies as an inverse exponential of the energy so that high energy states have low probability, and low energy states have high probability. In some examples, a sampling device at high temperature produces random samples. In non-quantum non-ideal physical systems, samples are governed by a different statistical distribution. This is an example of an available statistical distribution. In some physical systems, these thermal effects compete with quantum effects.

Quantum effects offers a source of randomness. In ideal quantum physical systems, samples are governed by quantum mechanics. The samples are affected by the present of off-diagonal terms in the Hamiltonian and the act of measuring the system. With large off-diagonal terms in the Hamiltonian a system can, given a short evolution time, be effectively randomized. In examples, a sampling device produces a sample from an available probability distribution that is governed by both thermal effects and quantum effects.

Any single spin variable may be up with a given probability, p, or down with the complementary probability, 1-p. These states of up and down with the associated probabilities define a probability distribution. Probability distributions can be built for systems of more spins. A set of spins is a good model for a set of qubits.

If the probability distribution for one or more spin variables is known then the probability distribution can be sampled. Consider sampling for a single spin variable. A random number is generated, $0 \leq u \leq 1$. This is compared to probability of up, p. If random number is less than probability of up then the state of up is recorded. In other words, the method includes assigning states to portions of the number line from 0 to 1. Each configuration has a portion of the line and the length of the portion is commensurate to the probability of the configuration. For larger systems of spin variables each configuration of spins can be assigned to a portion of the number line. Thus, a random number selects a configuration, also called a state.

Each configuration in a set of spins has an energy. If the set of spins has local biases on some or all of the spins and is limited to two spin interactions then conventionally the energy is represented as:

$$E(s_1 \ldots s_N) \propto \Sigma_i h_i s_i + \Sigma_{j>i} J_{ij} s_i s_j \qquad (12)$$

Each configuration has a probability. If the probability is Boltzmann the probability can be expressed as:

$$p(s_1 \ldots s_N) = e^{-E(s_1 \ldots s_N)/k_B T}/Z \qquad (13)$$

Here T is temperature, and $k_B$ is the Boltzmann constant. The Boltzmann constant can be set to one without loss of generality. The denominator, Z, is the partition function and is a normalization factor. It is a sum of the exponent of the negative energy divided by $k_B T$ for all the configurations.

There are at least three tasks in sampling that are comparable to each other in difficulty. The first task is counting the number of ground states. The second task is finding the probability that qubit is up or down. That is, finding the expectation value for qubit i, $E[s_i]$. The third task is finding the actual probability of a state. In some examples, this involves computing the partition function, Z. In some examples, this involves clamping variables.

A sampling device accomplishes these sampling tasks in at least a few ways. In some examples, a sampling device including a hybrid computer performs these methods.

In a first method, a sampling device counts the number of ground states.

In some examples of the method, a sampling device performs three acts. In the first act, the sampling device repeatedly samples until a ground state is found. Next, the sampling device estimates the probability of the ground state. An example of an estimator is an expression that includes the inverse of the number of states found. Three, the sampling device computes an estimate of the number of ground states as proportional to the inverse of the probability.

In other examples of the method, a sampling device performs four acts. In the first act, a sampling device collects a plurality of samples, $N_S$. In the next act, the sampling device counts the number of distinct ground states, $N_D$, from amongst the collected samples. In the third act, the sampling device counts the number of states or configurations appearing once, $N_O$. In the fourth act, the sampling device calculates and, optionally, returns the estimate of the number of ground states as:

$$N_{GS} \propto \frac{N_D}{1 - \frac{N_O}{N_S + 1}} \quad (14)$$

In some examples, finding the probability that qubit is up or down is a task that may be completed using a direct approach. A sampling device collects a series of samples from the qubit. The sampling device counts at how many times the qubit has or is in a given state relative to the number of samples. This is, finding the expectation value for qubit i, $E[s_i]$, and is equivalent to finding the probability distribution for qubit i. This approach can be used to find the probability of a state. This approach may be slow and thus methods such as those illustrated in FIGS. 1-9, 17-18 and described in the supporting description, and the like, may be used.

One approach to finding the actual probability of a state involves computing the partition function, Z. This, in practice, is very difficult because the partition function is the sum of the exponential of the negative of temperature normalized energy over all configurations. As a set of spins has exponentially many configurations this computation becomes impractical for even powerful conventional computers as the number of spins grows. However, there are practical methods like clamping variables as illustrated in FIGS. 1-9, 17, 20, 21 and described in the supporting discussion, and the like. Basically, to find the probability of a given configuration, $s_1 \ldots s_N$, a hybrid computer finds or estimates the probability distribution of a first spin. Then the sampling device fixes the first spin and estimates the probability of the reduced system $s_2 \ldots s_N$. The enumeration of the spins is arbitrary.

A plurality of different terms or parameters characterize or define a sampling process. These terms correspond to different levels of abstraction of the sampling process. At the highest level of abstraction, a sampling device provides samples from a target probability distribution. The target probability distribution can be based off a function, such as, an objective function. The objective function has many states and the target probability distribution specifies the likelihood of occupation of the states. Often, however, one has to consider the lower level details of how a sampling device takes samples from an available probability distribution.

The available distribution, in some examples, is implemented on an analog processor (e.g., quantum processor). For a quantum processor, the implementation involves specifying a problem Hamiltonian. The problem Hamiltonian itself corresponds to the objective function that normally is discussed in higher level of abstraction. For some quantum processors, the problem Hamiltonian can be reduced to a set of local bias values and a set of coupling values. However, the processor will, as an imperfect device, implement an actual problem Hamiltonian that is a permuted set of local bias values and coupling values. The sample returned from the processor corresponds to this actual problem Hamiltonian, the exact form of which is always unknown. An energy spectra from the problem Hamiltonian informs the available probability distribution.

FIG. 11 shows a method 1100 executable by circuitry to create a sample for a set of variables from a function for the purpose of illustrating the process of sampling. One or more of these acts may be performed by or via one or more circuits, for instance one or more hardware processors. In some examples, a sampling device including a hybrid computer performs the acts in method 1100.

At 1102, a sampling device receives a set of parameters defining the sampling process. In some examples, parameters include an objective function. In some examples, parameters include a problem Hamiltonian that implements the objective function. In some examples, parameters include the number of samples to be drawn, and additional parameters like annealing time. In some examples, one or more the received parameters was previously received or provided and a selection to use one or more parameters is received. In some examples, a parameter is used by default.

At 1104, the sampling device begins, or continues, an iterative loop, such as a "for" loop. The iteration is over the number of samples. At 1106, the sampling device initializes an analog processor in a ground state of the initial Hamiltonian. The initial Hamiltonian is selected because its ground state is accessible. The initial Hamiltonian is, during act 1104, the instant Hamiltonian of the analog processor. An example initialization Hamiltonian includes off-diagonal single qubit terms.

At 1108, the analog processor as described by its instant Hamiltonian is evolved toward a problem Hamiltonian, $H_P$. At 1110, the analog processor provides a read-out. In some examples, the results of the read-out are returned. In some examples, the results of the read-out are stored.

At 1112, the sampling device updates the counter for the for-loop. In some examples where a "for" loop is not used similar control variables are updated. At 1114, the sampling device tests the variables used to control the loop. If the loop is to continue, the processing by the sampling device, continues at 1106. If the loop is to terminate, then at 1116 the sampling device records the sample or the plurality of samples obtained in the loop 1106-1110.

In some examples, the sampling device orders the plurality of samples by energy value. Energy value is a proxy for quality of solution. In some examples, the sampling device returns the sample or the plurality of samples obtained in the loop 1106-1110.

FIG. 12 shows a method 1200 executable by circuitry to create a plurality of samples for a set of variables from an objective function with the use of post-processing. One or more of these acts may be performed by or via one or more circuits, for instance one or more hardware processors. In some examples, a sampling device including a hybrid computer performs the acts in method 1200.

At 1202, a sampling device receives a set of parameters defining in part the sampling process in method 1200. In some examples, parameters include an objective function. In some examples, parameters include a problem Hamiltonian that implements the objective function. In some examples, parameters include the number of samples to be drawn, and additional parameters like annealing time. In some examples, one or more the received parameters was previously received or provided and a selection to use one or more parameters is received. In some examples, a parameter is used by default.

At 1204 the sampling device begins, or continues, an iterative loop, such as a "for" loop. The iteration is over the number of samples. At 1206, the hybrid computer draws a sample from the analog processor in accordance with methods 1100, 1200, or the like.

At 1208, optionally, the sampling device post-processes the sample. That is the sampling device performs or requests another processor to perform one or more post-processing operations. In some examples, the other processor is a digital processor. Examples of the one or more post-processing operations include: a majority voting post-processing operation, a greedy descent post-processing operation, a variable clamping post-processing operation, a variable branching post-processing operation, or a local field voting post-processing operation.

Post processing operations may be implemented on one or more of a microprocessor, a digital signal processor (DSP), a graphical processing unit (GPU), a field programmable gate array (FPGA), or other circuitry.

At 1210, the sampling device updates a plurality of samples with the sample.

At 1212, the sampling device updates the counter for the for-loop. In some examples where a "for" loop is not used, similar control variables are updated. At 1214, the sampling device tests the variables used to control the loop. If the specified number of samples has been drawn (1214—Yes), processing continues at 1216. Otherwise, the sampling device continues the loop at 1204.

At 1216, optionally, the sampling device post-processes the plurality of samples. When using GPUs, matrix-matrix operations on batches are much more efficient than matrix-vector operations on a single sample. Thus, it may be advantageous to post-process an entire sampling batch at a time, rather than sample by sample. In some examples, the sampling device receives the plurality of samples and causes an execution of at least one post-processing operation on at least one respective sample in the plurality of samples via at least one post-processing non-quantum processor-based device. In some examples, a post-processing non-quantum processor-based device includes a microprocessor, a DSP, a GPU, a FPGA, or other circuitry.

In post-processing the plurality of samples at 1216, the sampling device adjusts the plurality of samples as needed such that the plurality of samples reflects a desirable aggregate value. In some examples, one sample in the plurality of samples is adjusted. In some examples, the sampling device adjusts two or more samples in the plurality of samples. In some examples, the desired aggregate is a statistical value from the plurality of samples. Examples of a statistical value include a first order moment, second order moment, and so on, of the plurality of samples or a distribution. For example, the sampling device uses post-processing to match the mean and variance for the plurality of samples to the mean and variance for a target distribution. In some examples, the sampling device changes a representative sample in the plurality of samples such that an aggregate value for the plurality of samples converges on an aggregate value for a target distribution.

In some examples, the sampling device adjusts the plurality of samples such that the plurality of samples is further equilibrated at a desired temperature. For example, the sampling device partitions the samples into two halves of a bipartite set. The sampling device performs local updates on a first half. Then the sampling device performs local updates on a second half. As the qubits are bipartite, the local updates to one have do not affect the qubits in the same half but affect the qubits in the other half. Examples of local updates include: Gibbs sweeping, Metropolis method, locally tree like updates, and the like. The post-processing by the sampling device at 1216 allows the plurality of samples to equilibrate to a desired temperature set in the post-processing process. The temperature can be cooler, the same, or warmer than the temperature associated with the sample.

At 1218, optionally, the sampling device returns the plurality of samples. In some examples, the plurality of samples has been individually post-processed. In some examples, the plurality of samples has been processed as a set.

In some examples, methods 1100 or 1200 are used to find a set of local bias values and a set of coupling values such that the available probability distribution matches a target probability distribution.

FIG. 13 illustrates a problem graph that defines, in part, a problem Hamiltonian. The graph 1400 includes a set of vertices 1402 and a set of edges 1404. The vertices 1402 may be labeled 1-6 and the edges 1404 labeled by the incident vertices, for example, an edge 12 extends between vertices 1 and 2. The graph is a model of a set of qubits and couplings, and vice versa. The graph 1400 is complete in that an edge connects every pair of vertices. The graph 1400 represents a problem Hamiltonian. All the qubits are antiferromagnetically coupled. There is zero local field on each qubit. The example problem Hamiltonian is:

$$H_P \propto \sum_{i=1}^{6} h_i \sigma_i^z + \sum_{j>i}^{6} \sum_{i=1}^{6} J_{ij} \sigma_i^z \sigma_j^z \tag{15}$$

To reflect a zero local field $h_i=0$ for all qubits 1-6 and the matrix J has zeros on the diagonal and the lower triangle and the value for AFM coupling on the upper triangle. Here antiferromagnetically is denoted as 1:

$$\begin{bmatrix} 0 & 1 & \cdots & 1 \\ 0 & \ddots & \ddots & \vdots \\ \vdots & \ddots & \ddots & 1 \\ 0 & \cdots & 0 & 0 \end{bmatrix} \tag{16}$$

FIG. 14 is a plot that shows the energies for the problem Hamiltonian described in FIG. 13. The Hamiltonian has 6 binary variables and thus there are 6 vertices in the problem graph. There are $2^6$ or 64 energy levels for which an energy is to be calculated. The minimum energy for such a system is when half the variables are +1 and half are −1. Thus, the number of ground states is expected to be $$\binom{6}{3} = 20.$$

This means for a set of 6 objects there are 20 sub-sets of size 3. The 20 minima can be seen in graph 1400. A sampling device running problem Hamiltonian defined in Equations (15) and (16) would return each of the ground states with equal probability. However, in the presence of noise or small finite temperature the returned samples will be different, for example, unevenly spaced.

In some examples, where the problem Hamiltonian lacks any local field value, such as, show in FIG. 13, a sampling device turns one sample into two samples. When a sample is drawn from the analog processor, such as at 1110 of method 1100, the sampling device takes the ones' complement of the sample. In examples where the result is represented in traditional binary format the ones and zeros of a binary string are inverted. In examples where the result is represented as spin variables the ups are swamped for downs and downs for ups. This doubles the rate the sampling device produces solutions. However, this technique is useful when the problem Hamiltonian has high symmetry. Examples, of this include when there is no local field on the qubits in the problem Hamiltonian.

FIG. 15 illustrates a problem graph that defines the adjacencies of the political regions of Canada. That is, its provinces and territories. Postal abbreviations label the vertices of the graph. This graph will be used to show an example of map coloring. In map coloring, one may work with a graph derived from a map. The graph's vertices are assigned colors and a valid coloring is when no two adjacent vertices have the same color. For the Canadian map, and the graph 1500, three colors are sufficient. For other maps 4 colors may needed and it is known that no more than 4 colors are needed for all maps. Also for this graph the disconnected node PE, having no neighbors, can be excluded from consideration as it may have any color. There are 1738 valid 3-colorings within $3^{12}$ or 531,441 colorings. The ratio of valid to all 3-colorings is 0.0033. There are 653,184 valid 4-colorings within $4^{12}$ or 6,777,216 colorings. The ratio of valid to all 4-colorings is 0.0389.

Counting the ground states amongst the many states is useful. Each coloring corresponds to ground state. A technique to estimate the number of ground states for larger instances of this problem is useful. There are applications for map coloring including scheduling of agents using resources, register allocation to allow computers to run faster, pattern matching, and the like.

The encoding of the map coloring problem in a problem Hamiltonian includes a few parts. A logical gadget, an arrangement of qubits, local biases, couplers, and couplings, is needed such that a color can be represented. The gadgets are embedded in the hardware graph of the analog processor. The gadgets are then connected for the given problem. In one example, the gadget is a unary encoding of color. If there are 4 colors then four qubits are needed. In the unary encoding if a first qubit is in a first state and the remainder is in a second state this represents color one. An example problem Hamiltonian for such a gadget and encoding is:

$$H_P^G \propto \sum_{i=0}^{C} h_i \sigma_i^z + \sum_{j>i}^{C} J_{ij} \sigma_i^z \sigma_j^z \qquad (17)$$

Here, C is the number of qubits or colors. The local bias values, h, are set to −1 and the coupling values between qubits, J, are set to 2 in a complete graph, $K_4$. This complete graph and gadget may be embedded in a hardware graph. For example a tiling of $K_{4,4}$ unit cells. The coupling between gadgets encodes the adjacencies from graph 1400.

FIG. 16 is a graph that shows data series associated with the problem Hamiltonian described in FIG. 15. A first data series 1602 plots the exact number of ground states. A second data series 1604 represents a first estimate of the number of ground states via the first method of estimating ground states. A third data series 1606 represents a second estimate of the number of ground states via the second method of estimating ground states. A fourth data series 1608 represents the number of ground states observed during the execution of these methods. However, the axis 1612 represents the number of ground states processed to implement the first method of estimating ground states. The axis 1614 is the number of ground states found or estimated or known to exist, as the case may be.

In overview, to generate the graph 1600, a sampling device made forty thousand hardware samples. One of these was a ground state and a processor estimated the number of ground states by inverting the probability of the ground state. This first estimate is reflected in data series 1602. The processor searched within the hardware samples for distinct ground states and using the second method described above at Equation (14), made an estimate of the number of ground states. The second estimate is reflected in data series 1606. The number of ground states found is reflected in data series 1608.

In some examples, the sampling device selects an energy function to match a desired probability distribution and obtains samples from the same. That is, the sampling device selects a problem Hamiltonian to have the form designed to have the desired probability distribution. For example, the sampling device selects a problem Hamiltonian whose energy is proportional to a negative logarithm of the desired probability distribution. In some examples:

$$E(x) \propto -\ln P(x) \qquad (18)$$

The sampling device provides the problem Hamiltonian to the analog processor and follows a sampling process such as described in methods 100-900, 1100, 1200, 1700, and so on.

FIG. 17 shows a method 1700 executable by circuitry to create a distribution for a set of samples. One or more of these acts may be performed by or via one or more circuits, for instance one or more hardware processors. In some examples, a sampling device including a hybrid computer performs the acts in method 1700.

At 1702, a sampling device receives a request for information characterizing a plurality of samples and a set of parameters informing the sampling process. In some examples, the information characterizing a plurality of samples is a probability distribution for the samples. In some examples, the set of parameters include, a request for samples, an objective function, a number of samples to be drawn, and additional parameters, like annealing time. In some examples, the objective function is implemented as a problem Hamiltonian defined in terms of a set of local bias values and a set of coupling values. In some examples, one or more of the received parameter was previously received and a selection on the parameters to use is received, a parameter is used by default, or the like.

At 1704, a sampling device initializes a dynamic tree to track the samples. The tree describes how the samples are distributed over the states in the state space. In some examples, the distribution is described with counts. In some examples, the distribution is described with probabilities. Sometimes a probability is a count of a number of samples divided by a total number of samples, The initial value of the tree is a null value at the root node. The sampling device expands the tree in method 1700. This includes populating the edges and nodes of the tree.

Figure 18:
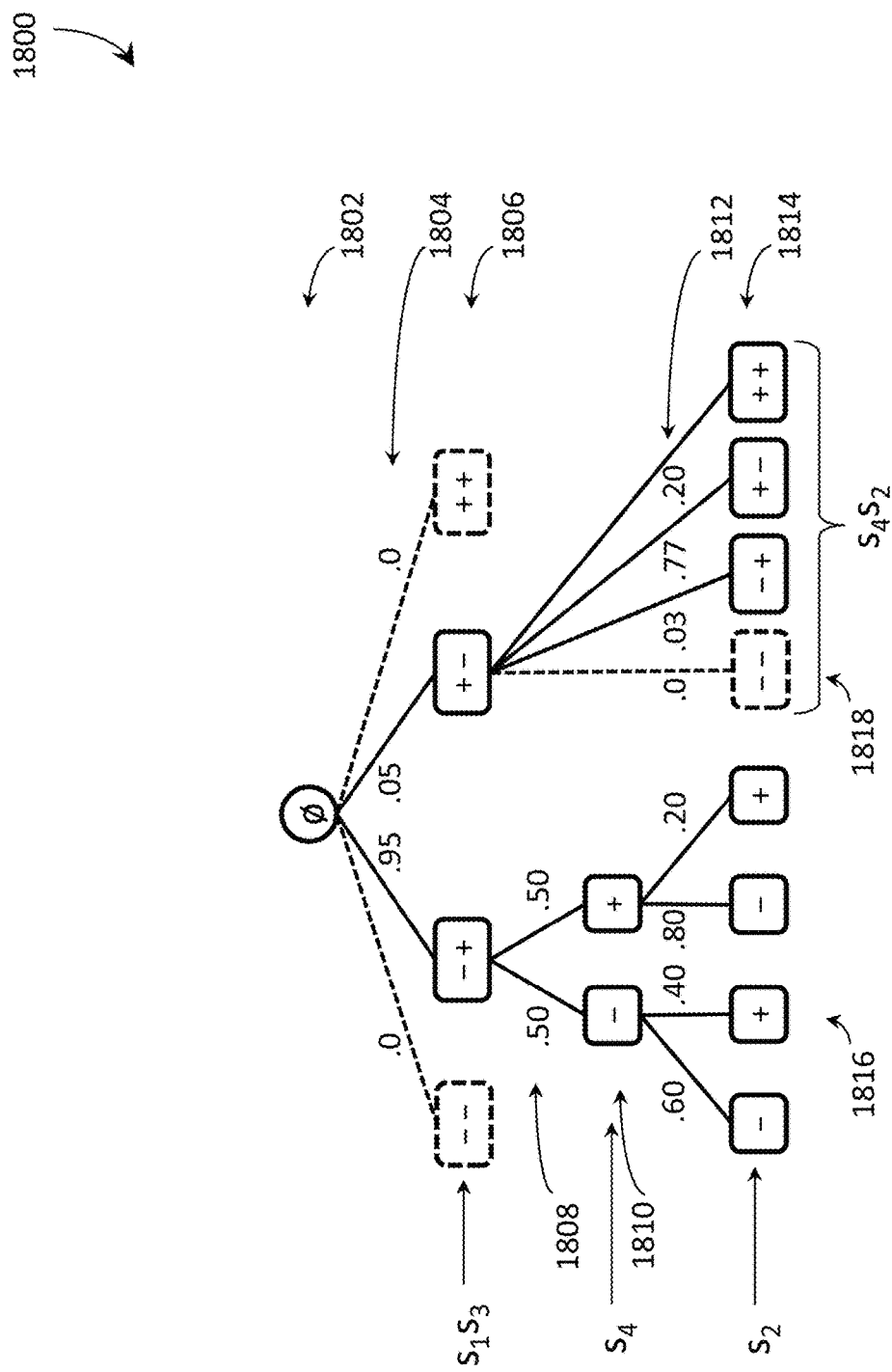
FIG. 18 is a block-diagram showing a data structure useful in creating samples and associated probabilities from a set of variables in accordance with the presently described systems, devices, articles, and methods.

An example of a tree is shown in FIG. 18. The root node of the tree is a placeholder with a null value. The non-terminal nodes of the tree are partial configurations of the variables for the objective function. The terminal nodes represent full configurations, or states, for the objective function. The edges between nodes represent probabilities. The probabilities are arranged such that the product of probabilities from a terminal node, also called a leaf node, to the root node is the probability of the state defined at the terminal node. The probability of a partial configuration is the product of the probabilities from the node representing the partial configuration to the root note. The probability of a partial configuration is a conditional probability.

A sampling device builds up the dynamic tree. The tree includes the fixed portion and an unfixed portion. The fixed portion includes the partial configurations and full configurations for which probabilities are known. The fixed portion will include information the variables to be clamped and the configurations. The unfixed portion includes the configurations for which probabilities are being generated. In some examples, the unfixed portion is recorded as a list of variables to be added to the tree. In some examples, the list is a sub set of the set of variables. A sub-set can be a null set and the full set to which it is a sub-set.

Returning to method 1700, at 1706, sampling device begins, or continues, an iterative loop, such as a "for" loop. The iteration is over the tree in a specified order such as depth first traversal, or breadth first traversal.

At 1708, sampling device draws a sample from the fixed portion of the tree. In the first iteration of the loop 1706-1716, the fixed portion is empty so there is no result. In further iterations, the sampling device draws one sample from the probabilities associated with the most recently fixed partial configuration. The first sample determines how the objective function is to be fixed. For example if the current portion of the tree is a pair partial configurations below the root node and the incident edges each a have probability, then the flip of a weight coin selects one partial configuration.

At 1710, per the sample drawn at 1708, the sampling device fixes the objective function to reflect the selected partial configuration. The sampling device draws a plurality of samples from the analog processor in accordance with methods 1100, 1200, or the like.

At 1712, the sampling device determines, from within the plurality of samples, a set of samples that have the lowest entropy. Entropy is the amount of information needed to specify the configuration of a system. In some examples, the search makes use of the following relation. The entropy of a pair of variables is equal to the entropy of a variable plus their mutual information plus the entropy of the second variable. This can be expressed as:

$$S(s_1,s_2)=S(s_1)+I(s_1,s_2)+S(s_2) \qquad (19)$$

The last two terms may be grouped and thus the expression may be rewritten as:

$$S(s_1,s_2)=S(s_1)+S'(s_2;s_1) \qquad (20)$$

For three qubits, the expression becomes:

$$S(s_1,s_2,s_3)=S(s_1,s_2)+S'(s_3;s_1,s_2) \qquad (21)$$

A set of variables with the lowest entropy may be built in a greedy fashion. The sampling devices finds the variable with the lowest entropy. To conform to Equation (19) this is $s_1$. Then, given this variables the sampling device finds the finds the next qubit variable with the lowest entropy. The set is enlarged again until the set of low entropy variables provides a sufficient estimator of the probability of states in the set of low entropy variables.

At 1714, the sampling device enlarges the tree. That is the node selected at 1708 is extended to reflect the variables that have the lowest entropy. Each added node is a configuration. Each added edge is the probability of the added configuration given the parent's node configuration.

At 1716, the sampling device tests for completeness of the tree. If the tree is incomplete, processing continues at 1706. If the tree is complete, processing continues at 1718.

At 1718, the sampling device returns the samples and/or the probability of the samples. In some examples, the sampling device returns the tree.

FIG. 18 illustrates a data structure. The data structure is a dynamic tree 1800 that shows partial and full configurations with the associated probabilities for these. The tree 1800 includes a root node 1802. The tree 1800 has an arbitrary branching ratio. The non-terminal nodes of the tree 1800 are the partial configurations for the variables of interest. The terminal nodes (or leaf nodes) are the full configurations (or states) for the variables of interest. The edges of the tree 1800 are associated with probability. The probability of the state is the product of the probabilities associated with the edges between the leaf and root nodes. The tree is dynamic and built up from root node to leaf nodes. During construction, non-terminal nodes will appear as leaf nodes. These will be referred to as the fixed portion of the tree.

The tree at a first level 1806 includes the partial configurations for two variables, $s_1$ and $s_3$, for the variables $s_1$, $s_1$, $s_3$, and $s_4$. The entropy of the two variables is low. Most of the time these two variables are in the −1+1 state. The state could be denoted as −+,01, down-up, or green-red, or the like. The probabilities of these configurations are shown at 1804.

The tree at a second level 1810 includes a partial configuration associated with variable $s_4$ given the partial configuration −1+1 associated with two variables, $s_1$ and $s_3$. Here the probabilities are show at 1808 and for the variable $s_4$ given $s_1$ and $s_3$ are −1+1. In this example, the probabilities are balanced.

In the next level 1814 of tree 1800, complete configurations or states are shown. The left half of the tree shows the configuration 1816 associated with variable $s_2$ The associated probabilities are shown at level 1812. The right half of the tree shows the configuration 1818 associated variables $s_4s_2$. The probabilities are shown at level 1812 on right. Each leaf node is a state. The probability of the state is the product of the edges between the leaf node and root node. For example, the state −1+1+1−1, 1818 has a probability 0.95*.50*.40 or 0.19. For example, the state 1000, 1820 has a probability 0.05*.0 or zero.

Figure 19:
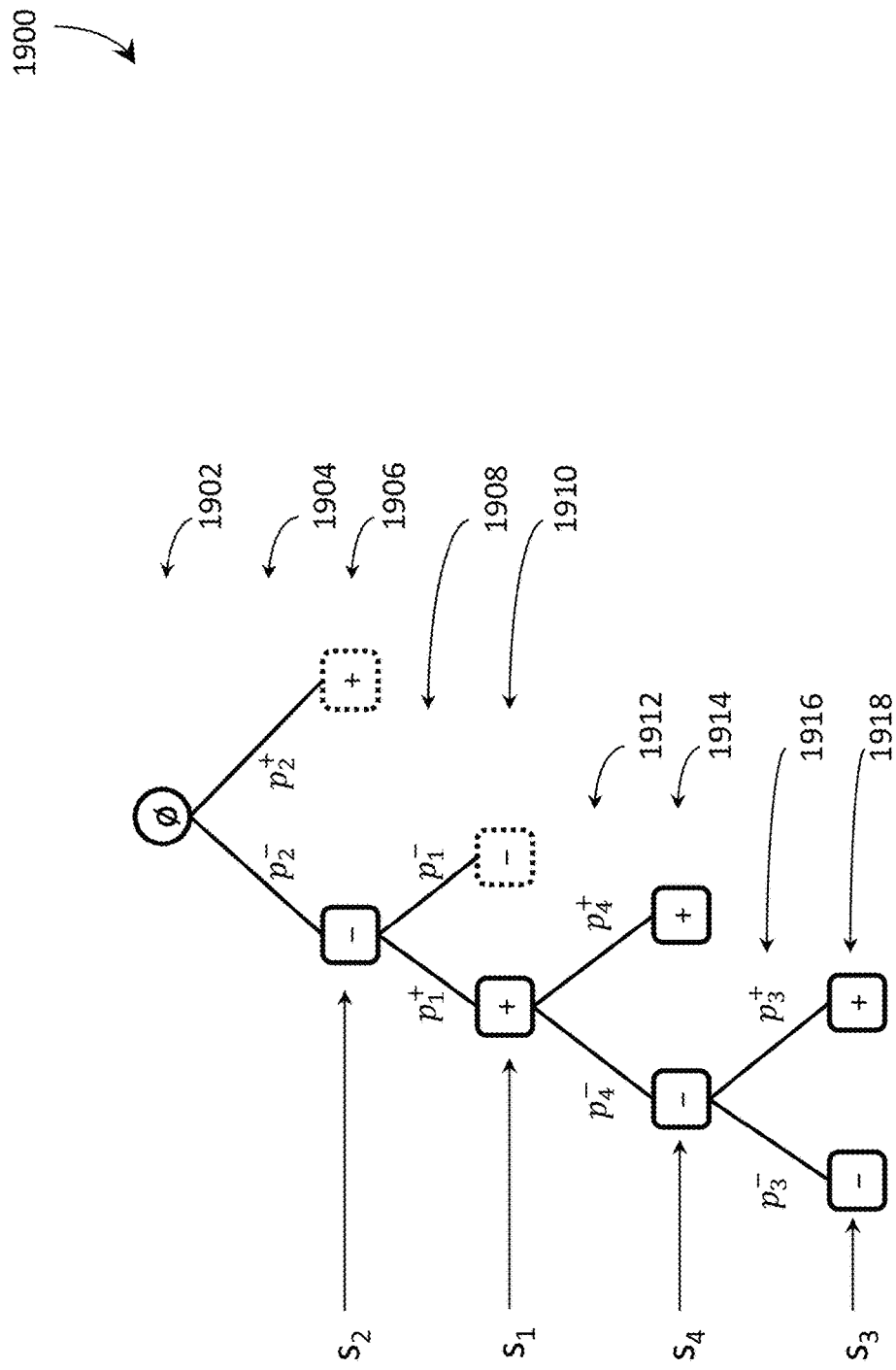
FIG. 19 is a block-diagram showing a data structure useful in creating samples and associated probabilities from a set of variables in accordance with the presently described systems, devices, articles, and methods.

FIG. 19 illustrates a data structure. The data structure is a dynamic tree 1900 that shows partial and full configurations for a set of variables with the associated probabilities for these partial and full configurations. The tree 1900 has a binary branching ratio and differs from tree 1800 that has a more general branching ratio. The non-terminal nodes of the tree 1900 are the partial configurations for the variables of interest. The terminal nodes (or leaf nodes) include the full configurations (or states) for the variables of interest. The terminal nodes include configurations for which there are too few samples to define descendants. The edges of the tree 1900 are associated with probability. The probability of a state is the product of the probabilities associated with the edges between a node and the root node. The tree is dynamic and built up from root node to leaf nodes. During construction, non-terminal nodes will appear as leaf nodes.

Each level of the tree 1900 is associated with a variable. By way of example, the tree at a first level, 1906, includes the partial configurations for one variable, $s_2$, out of the variables $s_1$, $s_1$, $s_3$, and $s_4$. The probabilities of these partial configurations are shown at 1904. Examples of probabilities could include $p_2^- = 999/1000$ and $p_2^+ = 1/1000$. Here the subscript is the variable and the super-script the partial configuration. In some examples, there is a threshold $\theta$. The threshold $\theta$ is the probability for which a node is made a terminal node even though the tree is incomplete. In some examples, the threshold $\theta$ is 0.02%. In other examples, the threshold $\theta$ is 0.2%. In some examples, the threshold $\theta$ is 2.0%. In some examples, the threshold $\theta$ is 10%. Where the probabilities are counting numbers the threshold $\theta$ is a counting number. Below the threshold $\theta$ there are insufficient samples to produce a useful distribution. Examples of terminal nodes associated with partial configurations are shown in stippled lines at levels 1906 and 1910.

The probabilities associated with the next variable, in this example $s_1$, are shown at 1908. The tree at a second level, 1910, includes the partial configurations for one variable, $s_1$. The unbalanced nature of the tree 1900 comes from the construction of the tree. The tree is built to maximize the expected value of the depth of the tree. Equivalently, a sampling device builds a tree to minimize the entropy of the distribution of each branch.

In the next level, 1914, of tree 1900, includes the partial configurations for one variable, $s_4$. The probabilities of these partial configurations are shown at 1912. The bottom level, 1918, of tree 1900, includes the partial configurations for one variable, $s_3$. The probabilities of these partial configurations are shown at 1916. The probability of the complete configuration, or states, at level 1918 is the product of the probabilities on the edges between the leaf nodes and the root node. For example, the state +1−1−1−1 at level 1918 has a probability of $p_3^- \times p_4^- \times p_1^+ \times p_2^-$ equivalently $p_1^+ \times p_2^- \times p_3^- \times p_4^-$.

FIG. 20 shows a method 2000 executable by circuitry to create a distribution for a set of samples. One or more of these acts may be performed by or via one or more circuits, for instance one or more hardware processors. In some examples, a sampling device including a hybrid computer performs the acts in method 2000.

At 2002, a sampling device receives a request for information characterizing a plurality of samples and a set of parameters informing the sampling process. In some examples, the information characterizing a plurality of samples is a probability distribution for the samples. In some examples, the set of parameters include, a request for samples, an objective function, a number of samples to be drawn, and additional parameters, like annealing time. In some examples, the objective function is implemented as a problem Hamiltonian defined in terms of a set of local bias values and a set of coupling values. In some examples, one or more of the received parameter was previously received and a selection on the parameters to use is received, a parameter is used by default, or the like.

At 2004, a sampling device initializes a dynamic tree to track the samples and well as the probabilities for the configurations within the samples. The initial value of the tree is a null value at the root node. The sampling device expands the tree in method 2000. This includes populating the edges and nodes of the tree. An example of the tree is shown in FIG. 19.

At 2006, the sampling device draws a plurality of samples from the analog processor implementing the objective function. In some examples, act 2006, is performed in accordance with methods 1100,1200, or the like. In some examples, the sampling device receives the plurality of samples previously drawn from the analog processor implementing the objective function.

At 2008, the sampling device begins, or continues, a recursive procedure over 2008-2020. The input to the recursive procedure is a current position in the tree and a list of variables to be added to the tree. In the first instance, the current position is the root node. After one variable has been added to the tree the current position is a node that defined a configuration for the variable and the list is the previous list with the variable removed.

At 2010, the sampling device evaluates for the base case of the recursive process. In some examples the base case is a complete configuration, a state. This is a leaf node associated with a state or complete configuration. In some examples the base case is a partial configuration for which too few samples exist. That is the probability for the partial configuration is below a threshold $\theta$. In some examples, the base case rules are applied in order such that a complete state below threshold $\theta$ is still added to the tree.

At 2012, the sampling device tests for existence of base case. If at base case, the processing in the recursive procedure stops and processing continues at act 2022. Otherwise, processing continues at act 2014.

At 2014, in some examples, the sampling device finds a variable that maximizes the expected value of the depth of the tree. In some examples, the sampling device finds a variable that minimizes the entropy of the distribution over the current variable. The current variable defines the next level in the tree.

At 2016, the sampling device updates the tree. This defines a left sub-tree and a right sub-tree.

At 2018, the sampling device calls the recursive procedure starting at act 2008 on the left sub-tree. At 2020, the sampling device calls the recursive procedure on the right sub-tree.

At 2020, in some examples, the sampling device returns the tree. In some examples, the sampling device returns a part of the tree. In some examples, the sampling device returns a probability distribution for a plurality of variables.

FIG. 21 shows a method 2100 executable by circuitry to create a distribution for a set of samples. One or more of these acts may be performed by or via one or more circuits, for instance one or more hardware processors. In some examples, a sampling device including a hybrid computer performs the acts in method 2100.

At 2102, a sampling device receives request for a probability distribution of samples, and an associated tree.

At 2104, the sampling device traverses the tree treating the probabilities associated with each edge and the associate does as an estimator to the configurations the nodes represent. Traversal of the tree then creates a probability distribution. In some examples, tree traversal is done by simulating the toss of a weighted coin where the probabilities of the edges are proportional to the weights on the coin.

At 2106, if the terminal node is not associated with a complete state there are three sub-acts that could be performed. A first sub-act, 2108, the sampling device returns an estimate that is an estimate for all the variables below the level of the terminal node. An example of an estimate is to assume a uniform probability for each partial configuration for each variable. For example, at level 1910 the state is a terminal node but variables $s_3$ and $s_4$ are below the level of the terminal node. These variable would be given an equal probability of each being up or down. The edges below − state in level 1910 would all be one half. In a second sub-act, 2110, the sampling device returns an estimate all the variables below the level of the terminal node. An example of the estimate is to copy the complementary probability of the other branch at the level. For example, at level 1910 for the − state, the tree below the + state is copied over.

A first sub-act, 2112, the sampling device, extends the tree by invoking method 2000 for the current position in the tree with a revised threshold. In some examples the revised threshold is lower that the unrevised threshold. At 2114, the sampling device returns the tree.

Simulated Annealing

Simulated annealing is a computer implemented probabilistic technique for searching an approximation to the optimum of an objective function defined over a large search space. Simulated annealing derives its name from a technique in metallurgy. In the metallurgical technique, a material is heated and then controllably cooled. This increases the size of the crystals in the material and reduces defects in the crystals.

A system to be simulated annealed is defined by an objective function and search space. A computer can operate as a simulated annealer. The simulated annealer puts the system in an initial state with a high effective temperature. The simulated annealer then slowly lowers the temperature in stages until system freezes and no further changes occur.

Simulated annealing includes a sequence of local searches over a series of stages and the temperature informs a probabilistic update rule. The simulated annealer considers the present state s, and some candidate state s'. Normally the candidate state s, is a neighboring state. Using a probabilistic update rule the simulated annealer decides between moving the system to the candidate state s', or staying in state s. The probability of update should favor candidate states of lower energy but must accept states of higher energy with some positive probability. This probability of accepting a higher energy state can tend to zero as the temperature tends to zero.

Some examples of the update rule are based on a condition or conditional statement (e.g., an "if" statement, a pair of "if" statements, or similar control structure). For example, if a random number is greater than the value of the acceptance probability function the simulated annealer moves to the candidate state. Else, the simulated annealer keeps the same state. The acceptance probability function is based on the energy differences, $\Delta E$, of the two states and the temperature, T. For finite temperature, the acceptance probability function is non-zero even if the candidate state s', has higher energy. As the temperature approaches zero the acceptance probability function approaches zero if the candidate state s' has higher energy, and otherwise with same or lower energy be one. An example of an update rule is:

$$\text{if } e^{\Delta E/k_B T} > R[0,1] \tag{22}$$

then $s \leftarrow s'$ else $s \leftarrow s$

Over time, the simulated annealer lowers the temperature. Normally a slow reduction in temperature improves the quality of the solution. The update rule leads the system to toward states of lower energy. The simulated annealer continues the process until reaching a termination condition. For example, the simulated annealer finds a state that is good enough, or determines it has used up all the allowed for time for the tasks.

FIG. 22 shows a method 2200 executable by circuitry to form a weight for a sample drawn from an analog processor. In some examples, one or more of these acts are performed by or via one or more circuits, for instance one or more hardware processors. In some examples, a sampling device including a hybrid computer performs the acts in method 2200.

The method 2200 may be used to compute importance weights, or simply weights, for an importance sampling process. In Importance Sampling an available probability distribution is used to approximate a target distribution. Important but rare samples get greater weight than less important and common samples. If the target distribution is the Boltzmann distribution and the available distribution is non-Boltzmann, that is, it is not Boltzmannly enough, then Importance Sampling is a technique to improve the Boltzmannliness of the available distribution. That is improve the degree to which the available distribution fits the Boltzmann distribution.

At 2202, a sampling device receives a sample s, drawn from an objective function f, as implemented on an analog processor. The sample s includes a spin configuration and optionally an energy of the sample. The sampling device draws a sample in accordance with methods 100-900, 1100, 1200, or the like.

At 2204, the sampling device provides the samples s; information defining the objective function f, and, optionally, an annealing schedule to a simulated annealer. The sampling device requests the simulated annealer run simulated annealing on the sample with a backwards annealing schedule.

An annealing schedule includes a series of temperatures or information that defines the same series. That is, the information defining the schedule includes the following or the equivalent: an initial temperature, a final temperature (or a stopping condition), a number of temperatures in the schedule, and a rule for decrementing the temperature. Examples of annealing schedules include linear schedules, geometric schedules, dynamic schedules, thermally inspired schedules, schedules designed to mimic quantum annealing, and the like. It is convenient to express the schedule as a series of inverse temperatures $\beta$. The definition of $\beta_i = 1/k_b T_i$ where T is temperature and $k_B$ is the Boltzmann constant. A schedule for forward simulated annealing is thus:

$$\beta_0 < \beta_1 < \ldots < \beta_n \tag{23}$$

Here $\beta_0$ could be zero corresponding to infinite temperate and $\beta_n$ could be a large number corresponding to a low absolute temperature. In examples, the annealing schedule is an accelerated schedule. An example of an accelerated annealing schedule is a schedule with a tenth as many entries as prescribed for a standard-speed forward schedule. For example, a standard-speed forward schedule is a linear schedule, such as, 0.00, 0.01, 0.02, . . . , 0.99, 1.00, the accelerated backwards schedule is 1.0, 0.9, 0.8, . . . , 0.1, 0.0. In normal simulated annealing, the simulated annealer finds an approximation to an optimum, and better approximations take more time. Some examples of method 2200 use an accelerated annealing schedule. For example, when an analog computer has provided a good approximate solution and the purpose of the simulated annealing is not to improve the solution but to build a history of states.

At 2206, the simulated annealer runs simulated annealing with the sample s, as the initial state. The simulated annealer runs the simulated annealing with an increasing temperature per the supplied annealing schedule or a predefined annealing schedule. That is, $s_n = s$, and the schedule works from a low temperature to a high temperature. Examples of annealing schedules are defined herein. The simulated annealer records a sequence of states of the simulated annealing and the associated energy for each state are recorded in a "history" of states. The term history is a bit of a misnomer since the simulated annealing process runs backwards.

At 2208, the simulated annealer returns (alternatively the sampling device receives) the history. In some examples, the history of states is an ordered set of states, and temperatures. In some examples, the history of states is a set of energies and temperatures.

At 2210, the sampling device computes a weight, w, for the initial sample, s, from the history. In some examples, the weight is proportional to the product of exponents of the product of: the difference between the inverse temperature at a first state and the inverse temperature at a second state, and the energy at the second state. An example of a formula for the weight, w is:

$$w \propto \prod_{i=1}^{n} e^{(\beta_{i-1} - \beta_i) E(s_i)} \quad (24)$$

Here $\beta$ is the inverse temperature and $E(s_i)$ the energy of the ith state $s_i$. Herein the convention used is the initial sample is $s_n$ and the final state $s_0$ to show the simulated annealing is run backwards. That is, with increasing temperature, or decreasing inverse temperature.

At 2212, the sampling device optionally records the weight w.

At 2214, the sampling device uses the weight w, to modify the sample for importance sampling. The process of importance sampling is described herein. In other examples, the sampling device returns weight to allow another computer to modify the sample.

The method 2200 is useful because it allows samples to be used in importance sampling and with faster simulated annealing times. A sample drawn from an analog processor, such as, quantum processor 1040 has no history information. A quantum computer cannot provide a history to its own calculations. Thus, a sample obtained from quantum processor is insufficient for performing importance sampling. In some examples, the annealing schedule is an accelerated schedule. Working backwards from a sample provided by an analog processor allows a sampling device to build a history. Using the history the sampling device then efficiently calculates a weight for a sample.

Parallel Tempering

Parallel tempering, also known as exchange Monte Carlo, or replica exchange Markov Chain Monte Carlo sampling, is a simulation method that improves the performance of some Monte Carlo methods. A digital computer simulates a plurality of replicas of a system of interest. Normally, the computer simulates, each replica with a different temperature. Each replica is also called a chain and is a Markov chain. During the simulation, the digital computer probabilistically exchanges configurations between replicas based on a Metropolis-like criterion the digital.

The differing temperatures have differing purposes. It is believed that high temperature simulations are generally able to sample from large volumes of a phase space associated with the simulation. Whereas low temperature simulations, whilst sampling in a low lying local region of the phase space, may become trapped in the local region. This trapping would occur during the timescale of a typical computer simulation and could be avoided with costly and infeasible long simulations. With configuration exchanges between replicas configurations at high temperatures available to the simulations at low temperatures and vice versa.

When a digital computer simulates a plurality replicas, rather than one, the computer requires more computational resources in proportion to the number of replicas. That is, if Q replicas, then the digital computer uses Q times more resources. This extra expense has been shown worthwhile as a parallel tempering simulation is more efficient than a standard, single-temperature Monte Carlo simulation. This efficiency is more than a factor of the inverse of Q. It is believed, this increased efficiency derives from allowing the lower temperature systems to sample regions of phase space that they would not have been able to access had regular sampling been conducted for a single-temperature simulation that was allowed to run longer.

Parallel tempering uses a "temperature ladder", that is, a fixed set of temperatures. In some examples, each temperature is attached to a replica. In some examples, inverse temperature or $\beta$ is attached to a replica. The values of beta range from $\beta_{min}$, the inverse temperature of the hottest replica, to $\beta_{get}$, the inverse temperature of the target distribution. The high temperature, or low inverse temperature, $\beta_{min}$ is typically set to 0, or close to it, allowing the system to explore the phase space freely.

In parallel tempering, entries in pairs of replicas are compared and swapped following a Metropolis-Hastings like update rule. The pair of replicas have adjacent temperatures to each other in the temperature ladder. One replica in the pair of replicas is the warmer replica and the other replica is the cooler replica. A given entry in the warmer replica and a corresponding entry in the cooler replica are swapped for two reasons. One, the entry for the warmer replica has lower energy than corresponding entry in the cooler replica. Two, the entries are swapped according to a probabilistic update rule like Metropolis-Hastings.

An additional benefit of the parallel tempering method is the generation of results for a range of temperatures, which may also be of interest to the investigator. It is now widely appreciated that parallel tempering is a useful and powerful computational method. It has found use in physical sciences for example in the simulation of polymeric systems, proteins, and the like.

FIG. 23 shows a method 2300 executable by circuitry to use samples drawn from an analog processor to augment a digital computer implemented version of parallel tempering. In some examples, one or more of these acts are performed by or via one or more circuits, for instance one or more hardware processors. In some examples, a sampling device including a hybrid computer performs the acts in method 2300. The hybrid computer draws from the queue in method 2400.

In method 2300 a hybrid computer receives a request to produce one or more Markov chains by parallel tempering. In some examples, the hybrid computers receives a temperature ladder including a split temperature.

In some examples, the hybrid computer splits the temperature ladder into two parts: the upper ladder containing all temperature values above a split temperature and the lower ladder containing all temperature values below the split temperature. In terms of inverse temperature, the hybrid computer splits the temperature ladder into two parts: the upper ladder containing all beta values up to $\beta_{split}$, and the lower ladder containing all beta values above $\beta_{split}$. An example of a temperatures ladder is thus:

$$\beta_{min} < \ldots < \beta_{split} < \ldots < \beta_{get} \quad (25)$$

In some examples, the ladder includes about 10 temperatures. In some examples, the ladder includes about 100 temperatures. In some examples, $\beta_{split}$ is 1. In some examples, $\beta_{split}$ is near 1. In some examples, $\beta_{get}$ is 3.

In method 2300, the hybrid computer creates a replica at the split temperature in a hybrid way drawing one or more samples from an analog computer. The replica at the split temperature is a hot chain. The non-hot chains are simulated chains.

At 2302, the hybrid computer receives a request to for a parallel tempering result. In some examples request includes an objective function for implementation on an analog processor, such as, a problem Hamiltonian, $H_P$; a temperature ladder, including a split temperature and a target temperature; a request for one or more hot chains; and the like. In some examples, the request includes an objective function, a search space, a termination condition, and the like.

The sampling device initializes a set of chains where one chain is associated with each temperature in the ladder. The split temperature is a made a hot chain. A hot chain is partially or fully populated with samples drawn from the analog processor. In some examples, further chains are made hot chains. In some examples, the digital computer receives one hot chain. In some examples, the hot chain is at the top of the temperature ladder. In some examples the hot chain is with a fewer rungs of the temperature ladder. In some examples, the digital computer receives two or more hot chains at different temperatures.

At 2302, the hybrid computer initializes the first state of each replica, $s_0$. In some examples, the initial state is all down spins. Other examples have all up spins. In some the examples, the spins are selected at random.

At 2304, the hybrid computer requests a set of samples from an analog processor implementing the objective function. In some examples, the request is fulfilled according to method 1100. In some examples, the hybrid computer directs the analog processor to use a new gauge transformation for each sample in the set of samples. In some examples, the request is asynchronous. A queue of zero or more samples is allowed to build but the hybrid computer continues in method 2300.

At 2306, the hybrid computer begins, or continues, an iterative loop, such as a "while" loop, over the entries in the chains. Each chain has a first, a second, a third, entry, and so on. In some examples, the termination condition for the loop is chain completeness. If the chain is not complete, the loop continues. In some examples, chain completeness is a measure based on chain length. In some examples, chain completeness is a measure based on an aggregate value of the chain. In some examples, the condition for the loop is time based.

At 2308, the hybrid computer begins, or continues, an iterative loop, such as a "while" loop, over the chains. The termination condition for the loop is the reach the end of the plurality of chains initialized by the hybrid processor.

At 2310, the hybrid computer determines whether the instant chain is a hot chain. If 2310—Yes, the hybrid computer checks if hardware sample is available and further acts are executed in method 2400. In method 2400, the hybrid computer builds up the chain with samples from the analog processor. If 2310—No, then at 2312, the hybrid computer performs a sweep over the spins in the instant state. Spin flips are proposed and probabilistically accepted. For example, at 2314, the hybrid computer performs Metropolis-Hastings sweep. The hybrid computer iterates over all the spins. For each spin, a flip is considered and accepted with probability proportional to an exponential term in the energy difference such as exp $[\Delta E/k_B T]$.

At 2318, the hybrid computer checks for exit of the iterative loop started at 2308. For example, the hybrid computer determines whether there are more chains for which the current position the chain needs updating. If the loop is not complete, processing continues at 2308. If the loop is complete, processing continues at 2316.

At 2318, the hybrid computer begins, or continues, an iterative loop, such as a "while" loop, over pairs of chains. In some examples, the pairs of chains are neighboring pairs of chains in the temperature ladder. The hybrid computer swaps pairs of chains to associate lower energy with cooler chain or swapping probabilistically. That is, a given entry in the warmer Markov chain and a corresponding entry in the cooler Markov are swapped for two reasons. One, the entry for the warmer Markov chain has lower energy than corresponding entry in the cooler Markov chain. Two, the entries are swapped according to a probability function in an update rule like Metropolis-Hastings.

In some examples, the probability function is proportional to an exponential of a product. The product includes an energy difference between a first state associated with a first chain and a second state associated with a second chain. The product includes a difference between a first inverse temperature associated with a first chain and a second inverse temperature associated with a second chain. An example of a probability function is:

$$P \propto e^{(E_j - E_i)(\beta_j - \beta_i)} \qquad (26)$$

where $E_j$ is the energy of the first state in a first chain, j, and $E_i$ is the energy of the second state in a second chain, i. In some examples, if a random number between zero and one is greater than the probability function the states are swapped. In this way, states from higher temperatures and are mixed with states from lower temperatures. In this way, states from hot chains are mixed with states from simulated chains.

In some examples, not shown, the hybrid computer returns the chains. In some examples, hybrid computer returns a portion of the chains. For example, the terminal portion is returned as the initial portion is excluded to allow for what is conventionally called a chain burn in. In some examples, the chain associated with the lowest temperature, or a portion thereof, is returned.

Figure 24:
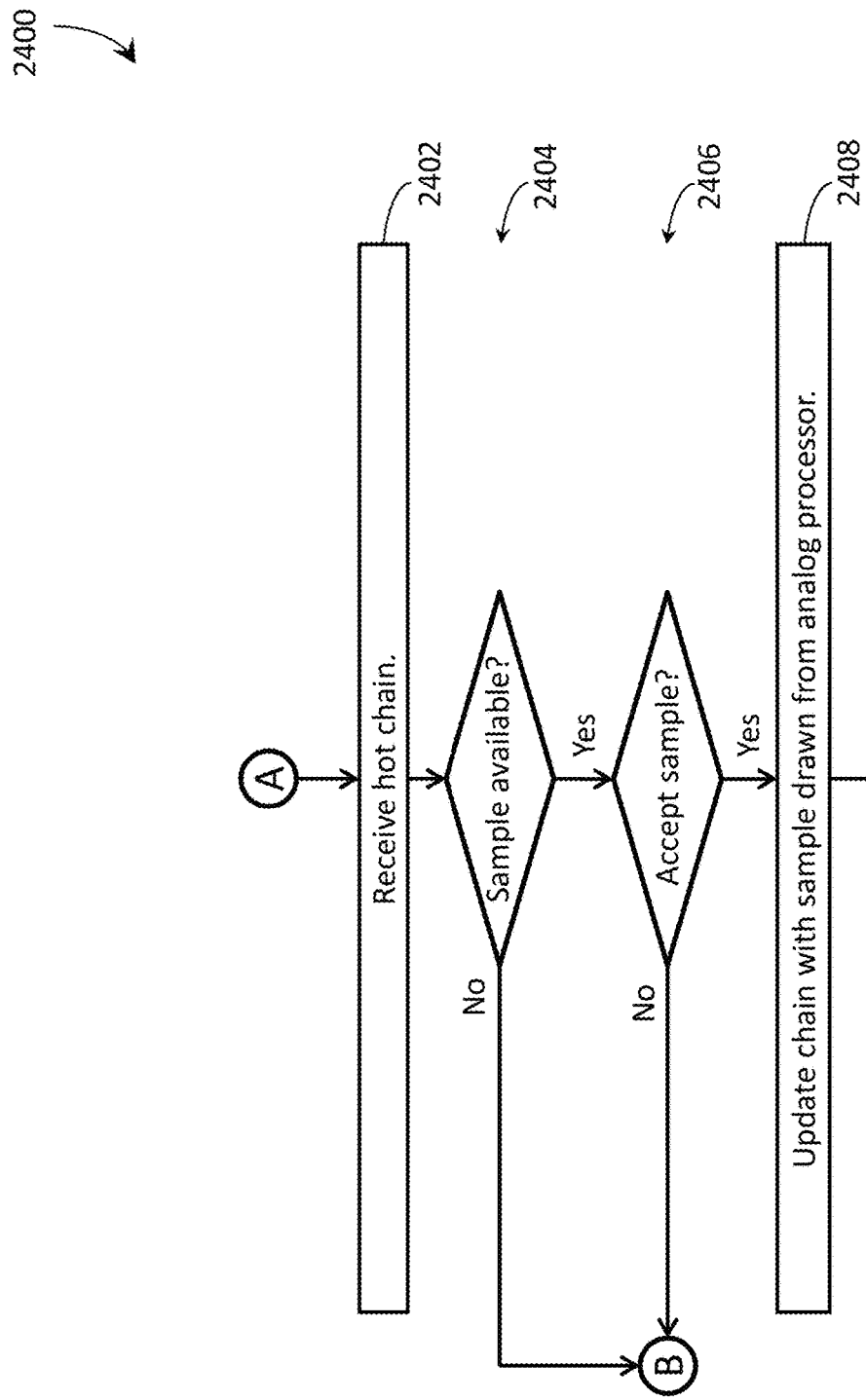
FIG. 24 is a flow-diagram showing a method that forms part of the method shown in FIG. 23, in accordance with the presently described systems, devices, articles, and methods.
Figure 25:
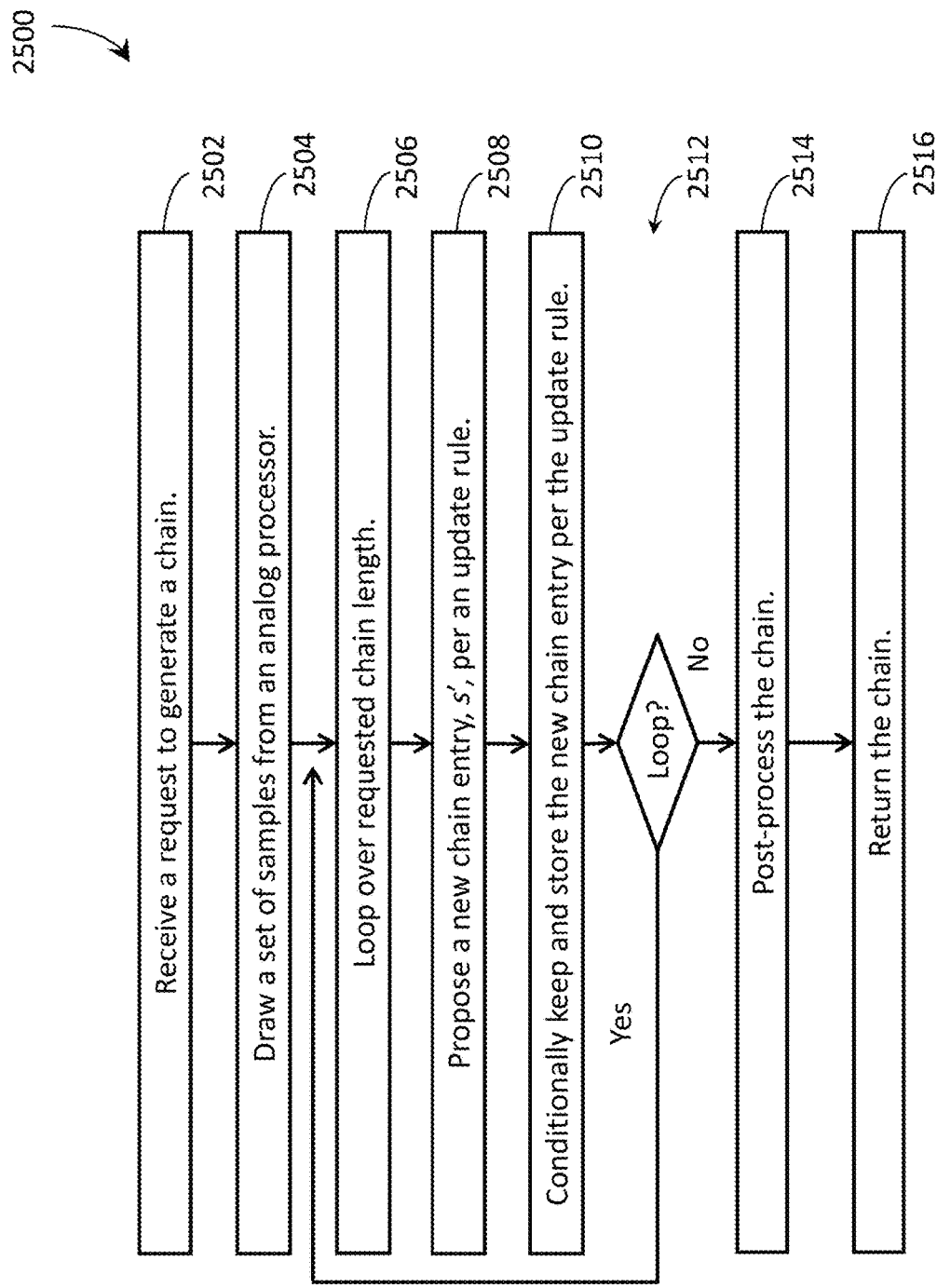
FIG. 25 is a flow-diagram showing a method to build a Markov chain seeded by one or more samples drawn from an analog processor in accordance with the presently described systems, devices, articles, and methods.

FIG. 24 shows a method 2400 executable by circuitry to use samples drawn from an analog process to augment a digital computer implemented version of parallel tempering. In some examples, one or more of these acts are performed by or via one or more circuits, for instance one or more hardware processors. In some examples, a sampling device including a hybrid computer performs the acts in method 2400.

At 2402, the hybrid computer device receives a request to a build chain including samples from an analog processor. At 2402, the hybrid computer checks to see if a sample from the analog processor available. For example, is there a sample in the queue created with the asynchronous call to the analog processor at act 2304 of method 2300. The hybrid computer draws a sample from the analog processor in accordance with methods 100-900, 1100, 1200, or the like. If 2404— Yes, processing continues at act 2406. If 2406—No, that is a hardware sample is not available, then the hybrid computer performs simulated annealing on the instant state at act 2312.

At 2406, in some examples, the hybrid computer replaces the instant state with a sample draw from the analog processor probabilistically. For example, this determination can be made by tossing of a weighted coin. This allows the hybrid computer to tune the rate at which samples drawn from the analog processor are consumed. If 2406—Yes, the sample from the hardware is accepted, the hybrid computer replaces the instant state with the sample drawn from the analog processor. If 2406—No, then the hybrid computer performs simulated annealing on the instant state at 2312. Processing continues at 2314 in method 2300.

FIG. 25 shows a method 2500 executable by circuitry to use samples drawn from an analog processor by a digital computer in the generation of a Markov chain. In some examples, one or more of these acts are performed by or via one or more circuits, for instance one or more hardware processors. In some examples, a sampling device including a hybrid computer performs the acts in method 2500.

At 2502, a hybrid computer receives a request to produce one or more Markov chains. In some examples, a hybrid computer receives a set of parameters informing the sampling process. In some examples, the set of parameters include an objective function, a chain length, and additional parameters like annealing time. In some examples, the objective function is a problem Hamiltonian defined in terms of a set of local bias values and a set of coupling values. In some examples, the hybrid computer receives the specification of an update rule. In some examples, one or more of the received parameters was previously received and a selection on the parameters to use is received, a parameter is used by default, or the like.

At 2504, the hybrid computer draws a set of samples from the analog processor. In some examples, the set includes one sample. In some examples, the set includes many samples. The analog processor implementing the objective function provides the sample. The hybrid computer draws a sample from the analog processor in accordance with methods 100-900, 1100, 1200, or the like. This sample is a seed value to a Monte Carlo Markov chain generation process.

At 2506, the hybrid computer begins, or continues, an iterative loop, such as a "while" loop, to create the requested chain. The loop is defined in acts 2506-2512. In the initial iteration through the current state of the chain is the sample form the analog processor. In further iterations, the state is the state arrived at in act 2510 of the last iteration.

At 2508, the hybrid computer proposes a new proposal state s', for the chain. Example methods of proposing a new proposal state include: Gibbs sweeping, Metropolis method, locally tree like updates, and the like. Example methods of proposing a new proposal state include ensemble methods including Parallel Tempering like as described in methods 2300 and 2400.

At 2510, the hybrid computer determines if the new proposal state s', is to be accepted. In some examples, this includes applying a probabilistic update rule. In some examples, this includes determining if the resulting chain would have detailed balance. If accepted, the new proposal state s' is stored as the current state.

In some examples, the proposing of a new state and the accepting of the new state is done in one act. In some examples, the proposing of a new state and the accepting of the new state is done in several acts. For example, in Gibbs sweeping proposals for new states are made one spin at a time. Each proposal is probabilistically accepted.

At 2512, the hybrid computer determines if a further iteration of the loop is needed. For example, hybrid computer determines if the chain is long enough? In some examples, a chain of 50 entries useful. If the processing is to continue with a further iteration the hybrid computer continues the method at 2506. If no further iterations are needed then processing continues at act 2514.

At 2514, the hybrid computer optionally post-processes the chain. In some examples, the hybrid computer trims the chain. In some examples, the hybrid computer sub-samples the chain. In some examples, the hybrid computer assigns weights to the entries in the chain or to chains.

In some examples, the hybrid computer trims the chain. In some examples, the hybrid computer discards a first portion of the chain to account for burn in. For example, a chain of length longer than 50 entries could be trimmed to 50. In some problems chain burn in is of the order of 10,000 entries.

In some examples, the hybrid computer sub-samples the chain. Chain entries may be correlated with each other. By taking only every mth entry this correlations can be addressed. In some examples, the distance between chain entries m exceeds a correlation length for the chain. A correlation length can be determined by computing (or estimating) the autocorrelation of the Markov chain. The chain generated in method 2500 would be suitably lengthened to allow for eventual sub-sampling. For example, if the chain is to be 50 entries long the chain generated at the end of the iterations would be n 50*m plus the burn-in length. The benefits of increasing the sub-sampling distance m vary with problem instance.

In some examples, the hybrid computer assigns weights to the entries in the chain. A Markov chain can include entries that include a tuple: weight and probability. In some examples, a weight can be assigned to accomplish the same effect as chain trimming. The hybrid computer weights early entries in the chain less preferentially as later entries. In some examples, a weight is assigned to a chain and thus the entries in the chain. The hybrid computer, using ensemble techniques to generate a series of chains weights each chain. One weighting scheme is to weight the entries in the chain of the lowest temperature more as chains of higher temperature. In some examples, the hybrid computer weights entries in a Markov chain in accordance with Importance Sampling described herein.

At 2516, the hybrid computer returns the chain.

FIG. 26 shows a method 2600 executable by circuitry to collect a plurality of samples drawn from an analog processor and sub-selecting a sub-set of the same. In some examples, one or more of these acts are performed by or via one or more circuits, for instance one or more hardware processors. In some examples, a hybrid computer acting as a sampling device performs the method 2600. In some examples, the hybrid computer includes both an analog processor and at least one processor-based device communicatively coupled to one another. The analog processor comprises a plurality of qubits, and a plurality of coupling devices, wherein each coupling device provides controllable communicative coupling between two of the plurality of qubits. The hybrid computer includes a programming subsystem, an evolution subsystem, a readout subsystem for interactions between the analog processor and at least one processor-based device. An example of hybrid computer is shown in FIG. 10.

At 2602, a hybrid computer receives an objective function, and a set of parameters. In some examples, the objective function is a problem Hamiltonian defined in terms of a set of local bias values and a set of coupling values. In some examples, the set of parameters includes a number of samples to draw and a number of sub-samples to select from the number of samples. In some examples, one or more of the received parameters has been previously received and a selection of the parameters to use is received, a parameter is used by default, or the like.

At 2604, the hybrid computer draws a plurality of samples from an analog processor implementing the objective function. The hybrid computer draws a plurality of samples from the analog processor in accordance with methods 100-900, 1100, 1200, or the like. In some examples, hybrid computer orders the plurality of samples by energy value. Energy value being a proxy for quality of solution, allows the hybrid computer to process the samples in the plurality of samples in order of quality.

At 2606, the hybrid computer post-processes the samples to correct for infeasible solutions. In this optional act, the hybrid computer examines the plurality of samples and applies the constraints inherently within the objective function. For example, a sample could encode a state in which a hard constraint found in the objective function is violated. Such a sample would not be a solution and could be corrected or rejected in at act 2606. For example, if the constraints are encoded in a matrix, C, and a solution in a vector s. Then, infeasible solutions have the form:

$$s^T C s \neq 0 \quad (27)$$

At 2608, the hybrid computer sub-selects a sub-set of samples from the plurality of samples. The hybrid computer determines a sub-set of the samples based on distances between the samples. In some examples, the hybrid computer selects the sub-set of samples such that each sample in the sub-set of samples is diverse. That is, each sample is separated from the other samples in the sub-set of samples. A diverse set of also is useful for seeding searches to a changed version of the problem. A diverse set of also is useful for creating a model of the solution space. In some examples, the hybrid computer selects the sub-set of samples such that each sample in the sub-set of samples is close to the other samples in the sub-set of samples. That is, each sample is the sub-set is proximate to, or clustered with, the other samples in the sub-set. A cluster of samples is useful for presenting robust solutions to a problem. The hybrid computer given an optimum, and nearby solutions, to a first problem can use these nearby solutions to find one or more solutions to a second problem related to the first problem.

In some examples, the hybrid computer selects the sub-set of samples such that each sample in the sub-set of samples is diverse. In some embodiments, the hybrid computer receives a target sub-set size (cardinality), k. The cardinality may be selected based on how the sub-set will be used. For example, if the sub-set is to be loaded on a mobile platform, such as a satellite, the sub-set cardinality can be selected based on the storage capacity of the satellite. If the sub-set is to be distributed in a network the cardinality can be selected based on the transmission capacity of the network. In some examples, the cardinality is 10. In some examples, the cardinality is 100. In some examples, the cardinality is about a hundredth of the number of samples drawn. The hybrid computer receives the plurality of samples S. The hybrid computer forms an initial null sub-set. Then, in some examples, until a termination condition is reached, a search is made for samples that are different from each other. In some examples, the termination condition is selected from a condition such as until a cardinality for the sub-set is reached, the time allotted is reached, either, and the like. In some examples, a target cardinality is used to define the sub-set.

In some examples, a string distance measure defines the sub-set. The string distance measure is a function that produces a non-negative value based on the input of two strings. The measure is minimum value when the strings are the same. Often the value of the measure is invariant in reversal of the order of the inputs. Often the measure obeys the triangle inequality. Examples of a string distance measure include: Hamming distance, weighted Hamming distance, and Jaccard distance (based on n-grams). Hamming distance is a sum of a unit value over places two strings differ. A weighted Hamming distance is a weighted sum. Examples of a Jaccard distance include measures based on n-grams, for example, bi-grams, tri-grams, and 8-grams. In some examples, the coefficient is proportional to the difference between a first number of n-grams found in both a first string and a second string and a second number of n-grams in either the first string and the second string, and inversely proportional to the first number of n-grams found in both the first string and the second string. In some examples, the string distance measure is expressed as $\delta(s,t)$ where s and t are strings.

Expressed as pseudocode, an example of act 2606 may be described as follows:

```
0. Receive, k, S
1. Initialize B ← { }
2. While k < ||B|| do
    a. Find s ∈ S to maximize Σ_{e∈B} δ(s, e)
    b. B ← s ∩ B
3. Return B
```

Here the set B is the sub-set of samples and termination is based on cardinality.

In some examples ideally, the sub-set of samples is maximally diverse and maximally sparse set. In some embodiments, the hybrid computer varies act 2606 to improve the diversity and sparsity. In some embodiments, the sub-set of samples is diverse. The definition of diversity varies with the string similarity measure. In some embodiments, the sub-set of samples is diverse and sparse. In some examples, the cardinality of sub-set sets the sparsity. In some examples, the sparsity is defined by a ratio of the cardinality of sub-set to a cardinality of another set, such as, the cardinality of the plurality of samples. The samples in the sub-set of samples need not be global optima to the objective function.

In some examples, the hybrid computer selects the sub-set of samples such that each sample in the sub-set of samples is close to the other samples in the sub-set of samples. That is, for a cluster a sample within the cluster is closer to other samples within the cluster than to samples outside of the cluster. In some examples, the hybrid computer analyses the sub-set of samples with a cluster analysis technique suitable for strings. In some examples, the hybrid computer uses a hierarchical agglomerative clustering technique. In some examples, the hybrid computer uses single linkage clustering. In some examples, the hybrid computer users single linkage clustering.

Expressed as pseudocode, an example of act 2606 may be described as follows:

```
0. Receive, S, k
1. Initialize cluster count l ← ||S||, and tree B a tree with a leaf node
   for each sample in S
2. While l > 1 do
    a. Join the closest two clusters to create new cluster
    b. Insert a new node in tree B to reflect new cluster
    c. Decrement cluster count l
```

3. Start at a minimum energy solution and traverse up tree B until sub-tree B' of size k ≈ ||B'|| is found
4. Return B'

Here the sampling device receives a plurality of samples S, and a target cardinality k for a sub-set of solution B'. The initial value of the tree includes all data points as individual cluster. Next, the closest clusters are joined together making a cluster of clusters, and new nodes in the tree. The measure of closest is based on a distance measure, such as, defined above. In single linkage clustering, the distance between clusters is the distance between the two closest points for the pair of clusters. In complete linkage clustering, the distance between clusters is the distance between the respective centroids for the pair of clusters. After line 2b the tree B contains all the solution in one hierarchical cluster. At line 3, a sub-tree B' of desired cardinality is selected. The sub-tree is enlarged by selecting node for the sub-tree form the nodes in the tree. As such, the size of the sub-tree cannot be strictly enforced. At 2606, hybrid computer can produce one or more clusters. When the sub-set of samples is a cluster the sub-set of samples is a robust set of solutions to the problem encoded in the objective function.

At 2608, the hybrid computer returns the sub-set of samples. In some examples, the sub-set is sparse. In some examples, the sub-set is diverse. In some examples, the sub-set is a set of clusters.

FIG. 27 shows a method 2700 executable by circuitry that uses sub-set of samples of plurality of samples drawn from an analog processor. In some examples, one or more of these acts are performed by or via one or more circuits, for instance one or more hardware processors. In some examples, a digital computer including a digital processor performs the acts in method 2700.

At 2702, a computer receives the sub-set of samples, and a changed version of the objective function. In some examples, the computer receives a request to find a solution to the changed version of the objective function. In some examples, the computer receives a request to find one or more optima to the changed version of the objective function. In some examples, speed of solution is favored over quality of the solution. The optima may be local optima.

At 2704, the computer checks the sub-set of samples to determine if one or more samples in the sub-set is a feasible solution to the changed version of the objective function. If the sub-set of the samples are ordered by energy, then the first sample in the sub-set of samples that is a solution to the changed version of the objective function will likely be the solution of the highest quality. In some example, the computer sorts the sub-set of samples by order of increasing energy and checks for feasible solutions.

Act 2704 includes a check for solutions to the changed version of the objective function, when speed of solution is important an exhaustive search is infeasible, a call to an analog processor is infeasible, the objective function contains errors, or the like. In some examples, samples within the sub-set are robust against small changes in the parameters that define the objective function. In some examples, the objective function can contain random errors. That is, the parameters of the objective function are imprecisely defined. In some examples, the objective function can contain systemic errors. That is, the objective function is a lacking from a modelling perspective. However, it can be valuable to get a solution on a truncated model encoded in the objective function following method 2600 and then check if it is a solution a more complete model. In some examples, the situation defining the objective function has changed and there is no time for an exhaustive search for an optima, a call to an analog processor is infeasible, or the like.

At 2706, the computer optionally searches for a solution to the changed version of the objective function using the samples in the sub-set of samples as seed values to a local search method. Examples of a local search method include: simulated annealing, generic search, and tabu search. The improved solutions are one or more optima.

At 2708, the computer returns the one or more solutions to the changed version of the objective function. If present, the computer returns the one or more optima to the changed version of the objective function.

The method 2700 is useful for making use a sub-set of the samples that are proximate to each other. Alternative methods are useful for using based on the samples that are distant to each other. Such a sub-set of samples can be used to generate one or more Monte Carlo Markov Chain using the sub-set of samples as seed values. An example of a method to generate a Monte Carlo Markov Chain is given in FIG. 25.

Methods 2600 and 2700 can be employed in many practical applications. One application is scheduling observation satellites. In some examples, one or more of these acts scheduling observation satellites are performed by or via one or more circuits, for instance one or more processors. In some examples, a hybrid computer performs these acts.

As an example, consider a two dimensional space with targets distributed on it. Above this is a set of satellite paths. Typically, non-geosynchronous satellites have a roughly sinusoidal ground track. In some examples, a line approximates a ground track. In some examples, the ground tracks for a plurality of satellites are approximated by a plurality of parallel, or near parallel, lines. Each satellite has a swath width (area photographed for a given orientation), and is capable of taking photographs in directions such as vertical, on path forward, on path reverse, and off path oblique. Vertical includes straight down, and oblique images including low angle oblique (that is, no horizon in image). Tilting of the satellite changes the direction but the changing of a direction has a cost and takes time. The constant velocity of the satellite means this time translates into a distance travelled along the ground track. Thus, a set of spatial constraints can be constructed.

In scheduling the acquisition of images at least two conflicts occur. In a first type of conflict, there is a resource under commitment when one satellite needs to photograph two targets but is unable. For example, to do so involves turning the satellite faster than possible. In a first type of conflict there is a resource over commitment when two satellites can photograph the same target. In this model their no benefit to acquiring two images of the same target.

In some examples, the hybrid computer creates a conflict graph. A node in the conflict graph is a satellite target pair. Only those targets that fall within the potential ground swath of the satellite are included and thus the model can be truncated. The value for the node is the profit of acquiring an image from the satellite. In some examples, this is minus one. The pairwise coupling between nodes of a shared target and different satellite reflects a penalty for both acquiring an image of the target. In some examples, this is plus two. The pairwise coupling between nodes of one satellite and two different targets reflects a penalty for not acquiring an image of both targets. In some examples, this penalty is plus two. Such a conflict graph is after embedding a problem Hamiltonian suitable for embedding on an analog processor. Such a conflict graph specifies an objective function. In some examples, the hybrid computer draws samples from the objective function implemented on an analog processor in accordance to, for example, method 1100. The read out from the analog processor is a string. The indices of the string correspond to satellite target pairs and the values prescribe acquisition of an image of the respective target by the respective satellite or not. In some examples, the image is replaced or augmented with other telemetry.

An objective function is developed to penalize both conflicts and reward the acquisition of an image. A sampling device draws a series of samples from this objective function. Sample schedules are drawn. These samples are used aim the satellites. These samples can be sub-sampled and used per methods 2600, and 2600.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet including U.S. provisional patent application Ser. No. 61/912,385 filed on Dec. 5, 2013, and U.S. patent application Ser. No. 14/561, 086 filed on Dec. 4, 2014 are incorporated herein by reference, in their entirety. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computational system comprising:
    at least one analog processor comprising:
        a plurality of qubits;
        a plurality of coupling devices, wherein each coupling device provides controllable communicative coupling between a respective pair of the plurality of qubits;
    at least one processor-based device communicatively coupled to the at least one analog processor; and
    at least one non-transitory computer-readable storage medium that stores processor-executable instructions, which when executed causes at least one processor-based device to:
    receive a sample from a function implemented on the at least one analog processor;
    run a simulated annealing according to a backwards annealing schedule, the backwards annealing schedule comprising a starting condition, at least one intermediate condition, and a stopping condition, the backwards annealing schedule comprising a variable that defines a reverse annealing evolution and a rule for incrementing the variable along a series between the starting condition and the stopping condition and including the at least one intermediate condition, wherein the simulated annealing starts at the sample and generates a history of states of the simulated annealing as the variable is incremented, the history of states comprising at least one state corresponding to the intermediate condition of the backwards annealing schedule; and
    return the history of states of the simulated annealing.

2. The computational system of claim 1 further comprising a readout subsystem responsive to a state of each of the qubits in the plurality of qubits to generate a first sample.

3. The computational system of claim 1 wherein, when executed, the processor-executable instructions further cause the at least one processor-based device to:
    provide the backwards annealing schedule, the sample, and the function to a simulated annealer to run the simulated annealing.

4. The computational system of claim 3 wherein the backwards annealing schedule is an accelerated backwards annealing schedule.

5. The computational system of claim 3 wherein, when executed, the processor-executable instructions further cause the at least one processor-based device to:
    record the history of states of the simulated annealing.

6. The computational system of claim 1 wherein, when executed, the processor-executable instructions cause the at least one processor-based device to:
    compute a weight for the sample from the history of states of the simulated annealing.

7. The computational system of claim 6 wherein, when executed, the processor-executable instructions further cause the at least one processor-based device to:
    compute the weight as proportional to a product over a plurality of states in the history of states of the simulated annealing, each term of the product includes an exponent of a multiplication of: a difference between an inverse temperature at a first state in the history of states of the simulated annealing and an inverse temperature at a second state in the history of states of the simulated annealing, and an energy at the second state in the history of states of the simulated annealing.

8. The computational system of claim 6 wherein, when executed, the processor-executable instructions further cause the at least one processor-based device to:
    apply the weight to the sample in importance sampling.

9. The computational system of claim 6 wherein, when executed, the processor-executable instructions further cause the at least one processor-based device to:
    record the weight.

10. The computational system of claim 6 wherein, when executed, the processor-executable instructions further cause the at least one processor-based device to:
    return the weight.

11. The computational system of claim 1 wherein the starting condition, the at least one intermediate condition, and the stopping condition comprise an initial temperature, at least one intermediate temperature, and a final temperature, respectively.

12. A method of operation in a sampling device that comprises both an analog processor and at least one processor-based device communicatively coupled to one another, the analog processor comprising a plurality of qubits, and a plurality of coupling devices, wherein each coupling device provides controllable communicative coupling between a respective pair of the plurality of qubits, the method comprising:
  receiving a sample from a function implemented on the analog processor;
  running a simulated annealing in accordance with a backwards annealing schedule, the backwards annealing schedule comprising a starting condition, at least one intermediate condition, and a stopping condition, the backwards annealing schedule comprising a variable that defines a reverse annealing evolution and a rule for incrementing the variable along a series between the starting condition and the stopping condition and including the at least one intermediate condition, wherein the simulated annealing starts at the sample and generates a history of states of the simulated annealing as the variable is incremented, the history of states comprising at least one state corresponding to the intermediate condition of the backwards annealing schedule; and
  returning the history of states of the simulated annealing.

13. The method of claim 12 further comprising:
providing the backwards annealing schedule, the sample, and the function to a simulated annealer to run the simulated annealing.

14. The method of claim 13 further comprising:
including an accelerated backwards annealing schedule in the backwards annealing schedule.

15. The method of claim 12 further comprising:
computing a weight for the sample from the history of states of the simulated annealing.

16. The method of claim 15 further comprising:
computing the weight as proportional to a product over a plurality of states in the history of states of the simulated annealing, each term of the product includes an exponent of a multiplication of: a difference between an inverse temperature at a first state in the history of states of the simulated annealing and an inverse temperature at a second state in the history of states of the simulated annealing, and an energy at the second state in the history of states of the simulated annealing.

17. The method of claim 15 further comprising:
applying the weight to the sample in importance sampling.

18. The method of claim 15 further comprising:
recording the weight.

19. The method of claim 15 further comprising:
returning the weight.

20. The method of claim 15 further comprising:
recording the history of states of the simulated annealing.

21. The method of claim 12 wherein receiving the sample from the function implemented on an analog processor further comprises:
fixing a first qubit in the plurality of qubits to a known state.

22. The method of claim 12 wherein running a simulated annealing in accordance with a backwards annealing schedule, the backwards annealing schedule comprising a starting condition, at least one intermediate condition, and a stopping condition comprises running a simulated annealing in accordance with a backwards annealing schedule, the backwards annealing schedule comprising an initial temperature, at least one intermediate temperature, and a final temperature, respectively.

23. A non-transitory computer-readable storage medium that stores processor-executable instructions, which when executed cause at least one processor to:
  receive a sample from a function implemented on an analog processor;
  run a simulated annealing according to a backwards annealing schedule, the backwards annealing schedule comprising a starting condition, at least one intermediate condition, and a stopping condition, the backwards annealing schedule comprising a variable that defines a reverse annealing evolution and a rule for incrementing the variable along a series between the starting condition and the stopping condition and including the at least one intermediate condition, wherein the simulated annealing starts at the sample and generates a history of states of the simulated annealing as the variable is incremented, the history of states comprising at least one state corresponding to the intermediate condition of the backwards annealing schedule; and
  return the history of states of the simulated annealing.

24. The computer-readable storage medium of claim 23 wherein the processor-executable instructions when executed further cause the at least one processor to:
provide the backwards annealing schedule, the sample, and the function to a simulated annealer to run the simulated annealing.

25. The computer-readable storage medium of claim 24 wherein the backwards annealing schedule is an accelerated backwards annealing schedule.

26. The computer-readable storage medium of claim 24 wherein the processor-executable instructions when executed further cause the at least one processor to run backwards simulated annealing on the sample includes instruction to:
record the history of states of the simulated annealing.

27. The computer-readable storage medium of claim 23 wherein the processor-executable instructions when executed further cause the at least one processor to:
compute a weight for the sample from the history of states of the simulated annealing.

28. The computer-readable storage medium of claim 27 wherein the processor-executable instructions when executed further cause the at least one processor to compute a weight for the sample from the history of states of the simulated annealing includes instructions to:
compute the weight as proportional to a product over a plurality of states in the history of states of the simulated annealing, each term of the product includes an exponent of a multiplication of: a difference between an inverse temperature at a first state in the history of states of the simulated annealing and an inverse temperature at a second state in the history of states of the simulated annealing, and an energy at the second state in the history of states of the simulated annealing.

29. The computer-readable storage medium of claim 27 wherein the processor-executable instructions when executed further cause the at least one processor to:
apply the weight to the sample in importance sampling.

30. The computer-readable storage medium of claim 27 wherein the processor-executable instructions when executed further cause the at least one processor to:
record the weight.

31. The computer-readable storage medium of claim 27 wherein the processor-executable instructions when executed further cause the at least one processor to:
return the weight.

32. The computer-readable storage medium of claim 23 wherein the starting condition, the at least one intermediate condition, and the stopping condition comprise an initial temperature, at least one intermediate temperature, and a final temperature, respectively.

\* \* \* \* \*

UNITED STATES PATENT AND TRADEMARK OFFICE
CERTIFICATE OF CORRECTION

PATENT NO. : 11,238,131 B2
APPLICATION NO. : 15/399461
DATED : February 1, 2022
INVENTOR(S) : Firas Hamze et al.

It is certified that error appears in the above-identified patent and that said Letters Patent is hereby corrected as shown below:

In the Specification

Column 27, Line 60:

" $\frac{\pi(y)\prod_{m=1}^{M}\hat{q}_m(x_m)}{\pi(x)\prod_{m=1}^{M}\hat{q}_m(y_m)}$ " should read, -- $\frac{\pi(y)\prod_{m=1}^{M}\hat{q}_m(x_m)}{\pi(x)\prod_{m=1}^{M}\hat{q}_m(y_m)}$ --.

Column 45, Line 21:

" $w \propto \lceil i=1^n e^{(\beta_{i-1}-\beta_1)E(si)}$ " should read, -- $w \propto \prod_{i=1}^{n} e^{(\beta_{i-1}-\beta_i)E(s_i)}$ --.

Signed and Sealed this
Fourteenth Day of March, 2023

Katherine Kelly Vidal
*Director of the United States Patent and Trademark Office*